United States Patent
Huang et al.

(10) Patent No.: US 11,617,199 B2
(45) Date of Patent: Mar. 28, 2023

(54) METHOD AND APPARATUS OF INDICATING TIME DELAY IN A WIRELESS COMMUNICATION SYSTEM

(71) Applicant: ASUSTek Computer Inc., Taipei (TW)

(72) Inventors: Chun-Wei Huang, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/342,882

(22) Filed: Jun. 9, 2021

(65) Prior Publication Data

US 2021/0400714 A1    Dec. 23, 2021

Related U.S. Application Data

(60) Provisional application No. 63/047,621, filed on Jul. 2, 2020, provisional application No. 63/045,671, filed
(Continued)

(51) Int. Cl.
*H04W 72/14* (2009.01)
*H04L 1/1812* (2023.01)
(Continued)

(52) U.S. Cl.
CPC .......... *H04W 72/14* (2013.01); *H04L 1/1819* (2013.01); *H04L 1/1896* (2013.01); *H04W 72/044* (2013.01); *H04W 72/1268* (2013.01)

(58) Field of Classification Search
CPC ............. H04W 72/14; H04W 72/1268; H04W 72/044; H04L 1/1896; H04L 1/1819
See application file for complete search history.

(56) References Cited

U.S. PATENT DOCUMENTS 9,288,028 B2 *   3/2016  Yang .................... H04L 5/0055
2019/0246391 A1 *  8/2019  Zhang ............... H04W 72/0413
(Continued)

FOREIGN PATENT DOCUMENTS

CN    110958085 A    4/2020
WO    2020067815 A1   4/2020

OTHER PUBLICATIONS

Moderator (vivo), "Feature lead summary on NRU configured grant enhancement", 3GPP TSG RAN WG1 #102-e, R1-200xxxx, Agenda Item: 7.2.2.2.4, Document for: Discussion and Decision, e-Meeting, Aug. 17-28, 2020.
(Continued)

*Primary Examiner* — Parth Patel
(74) *Attorney, Agent, or Firm* — Cooper Legal Group LLC

(57) ABSTRACT

In an example, a User Equipment (UE) operates with shared spectrum channel access on a carrier and/or a cell. The UE receives a configuration for configuring configured grants for uplink transmission in a bandwidth part (BWP). The configured grants include a first configured grant and a second configured grant. The UE configures a first minimum Downlink Feedback Indication (DFI) time delay for the first configured grant according to the configuration. The first minimum DFI time delay is for validation of Hybrid Automatic Repeat Request (HARQ) information in response to one or more first uplink transmissions. The UE configures a second minimum DFI time delay for the second configured grant according to the configuration. The second minimum DFI time delay is for validation of HARQ information in response to one or more second uplink transmissions. The UE does not expect the second minimum DFI time delay to have a different value than the first minimum DFI time delay.

16 Claims, 22 Drawing Sheets

Related U.S. Application Data on Jun. 29, 2020, provisional application No. 63/042,818, filed on Jun. 23, 2020.

(51) Int. Cl.
*H04L 1/1867* (2023.01)
*H04W 72/044* (2023.01)
*H04W 72/1268* (2023.01)

(56) References Cited

U.S. PATENT DOCUMENTS

| | | | | |
|---|---|---|---|---|
| 2019/0342911 | A1* | 11/2019 | Talarico | H04W 80/02 |
| 2019/0349965 | A1* | 11/2019 | Chakraborty | H04L 5/0055 |
| 2020/0154469 | A1 | 5/2020 | Chin et al. | |
| 2020/0313807 | A1* | 10/2020 | Salem | H04W 72/14 |
| 2021/0044391 | A1* | 2/2021 | Lunttila | H04W 72/14 |
| 2021/0050947 | A1* | 2/2021 | Tsai | H04L 1/1896 |
| 2021/0092789 | A1* | 3/2021 | Basu Mallick | H04W 76/18 |
| 2021/0099258 | A1* | 4/2021 | Bhattad | H04L 1/1664 |
| 2021/0099348 | A1* | 4/2021 | Bhattad | H04W 72/0446 |
| 2021/0298049 | A1* | 9/2021 | Myung | H04W 72/14 |
| 2021/0298075 | A1* | 9/2021 | Talarico | H04W 74/00 |
| 2021/0345342 | A1* | 11/2021 | Sakhnini | H04L 5/0051 |
| 2021/0400714 | A1* | 12/2021 | Huang | H04L 1/1864 |
| 2022/0014314 | A1* | 1/2022 | Wang | H04L 1/08 |
| 2022/0052790 | A1* | 2/2022 | Lei | H04L 1/1812 |
| 2022/0085924 | A1* | 3/2022 | Talarico | H04L 1/1854 |
| 2022/0094480 | A1* | 3/2022 | Huang | H04L 1/1812 |
| 2022/0116152 | A1* | 4/2022 | Iyer | H04L 1/1896 |
| 2022/0272741 | A1* | 8/2022 | Wu | H04W 72/14 |
| 2022/0304059 | A1* | 9/2022 | Lei | H04W 74/0816 |

OTHER PUBLICATIONS

Ericsson (Rapporteur), Samsung, OPPO, vivo, Huawei, HiSilicon, R2, "Miscellaneous corrections for NR IIoT", 3GPP TSG-RAN WG2 Meeting #111-e, R2-200xxxx, Change Request, 38.331 CR 1747, Rev. 1, Ver. 16.1.0, Work Item Code RN_IIOT, Electronic Meeting, Aug. 17-28, 2020.

"Feature Lead Summary on NRU Configured Grant Enhancement", Feb. 2020, Source: vivo, 3GPP TSG RAN WG1 #100, R1-2000800, 7 pgs.

Corresponding European Patent Application No. 21178422.8, Extended European Search Report dated Nov. 16, 2021.

3rd Generation Partnership Project, Technical Specification Group Radio Access Network, NR, Radio Resource Control (RRC) protocol specification, 3GPP TS 38.331, V16.0.0, Release 16, Mar. 2020.

Corresponding Office Action for Korean Patent Application No. 10-2021-0074995 dated Oct. 7, 2022, 10 pages.

Huawei, HiSilicon: "[H227] TP for the Description of CG Configuration", 3GPP TSG-RAN WG2 Meeting #109bis-e, R2-2003639, Electronic, Apr. 20-May 1, 2020, 8 pages LG Electronics: "Discussion on Configured Grant for NR-U", 3GPP TSG RAN WG1 Meetig #99, R1-1912392, Reno, USA, November 185h-22st, 2019, 9 pages.

* cited by examiner

1100

| Row 1 | Timing | 1 | 2 | 3 | 4 | 5 | 6 | 7 | 9 | 10 |
|---|---|---|---|---|---|---|---|---|---|---|
| Row 2 | | UL HarqID=1 on CG1 | | DL DFI Invalid | | DL DFI Valid | | | DL DFI Valid | |
| Row 3 | | UL HarqID=2 on CG1 | | DL DFI Invalid | | 5-1>3 DL DFI Valid | | | DL DFI Valid | |
| Row 4 | | UL HarqID=2 on CG2 | | DL DFI Invalid | | 5-1<6 DL DFI Invalid | | | DL DFI valid | |
| Row 5 | | UL HarqID=4 on CG2 | | DL DFI Invalid | | DL DFI Invalid | | | DL DFI valid | |
| Row 6 | CG1: HarqID=1,2,3  Delay_Value=3<br>CG2: HarqID=2,3,4,  Delay_Value=6 | | | | | | | | | |

FIG. 11

*dg-minDFIDelay-r16:*
*for configuring minimum DFI time delay for DG scheduled PUSCH*

1500

| Row 1 | Timing | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Row 2 | | UL HarqID=2 on CG1 (new) | | DL DFI Valid (NACK for HarqID=2) | | UL HarqID=2 on CG2 (ReTX) | | | Dynamic grant HarqID=2 (ReTx) | | | UL HarqID=2 on scheduled resource (ReTx) | | DL DFI valid | |
| Row 3 | | CG1: HarqID=1,2,3  Delay_Value=2 (minimum DFI time delay_1)  CG2: HarqID=2,3,4, Delay_Value=4 (minimum DFI time delay_2)  DG, Delay_Value=1 (minimum DFI time delay_dg)  C-RNTI, Delay_Value=3 (minimum DFI time delay_c)  CS-RNTI, Delay_Value=2 (minimum DFI time delay_cs) | | | | | | | | | | | | | |

| | Timing | 1 | .. | 6 | 7 | 8 | 9 | 10 | 11 | 12 | 13 | 14 | 15 | 16 | 17 |
|---|---|---|---|---|---|---|---|---|---|---|---|---|---|---|---|
| Row 1 | | | | | | | | | | | | | | | |
| Row 2 | | CG1 for HarqID=2 (new) | | ACK for HP2 | | | CG2 for HarqID=3 | | | Dynamic grant HarqID=2 (new) | | | UL HarqID=2 on scheduled resource (ReTx) | | DL DFI valid |
| Row 3 | CG1: HarqID=1,2,3 Delay_Value=2 (minimum DFI time delay_1)<br>CG2: HarqID=2,3,4, Delay_Value=4 (minimum DFI time delay_2)<br>DG, Delay_Value=1 (minimum DFI time delay_dg) for HarqID 1~4<br>DG, Delay_Value=5 (minimum DFI time delay_dg2) for HarqID 5~16 | | | | | | | | | | | | | | |

FIG. 16

|  | HP(s) | *hpg-minDFIDelay-r16* |
|---|---|---|
| Entry 1 (HPG1) | 1~4 | 1 |
| Entry 2 (HPG2) | 5~8 | 2 |
| .. |  |  |
| Entry X (HPGX) | ~16 | 3 |

METHOD AND APPARATUS OF INDICATING TIME DELAY IN A WIRELESS COMMUNICATION SYSTEM

CROSS-REFERENCE TO RELATED APPLICATIONS

The present application claims the benefit of U.S. Provisional Patent Application Ser. No. 63/042,818 filed on Jun. 23, 2020, the entire disclosure of which is incorporated herein in its entirety by reference. The present application also claims the benefit of U.S. Provisional Patent Application Ser. No. 63/045,671 filed on Jun. 29, 2020, the entire disclosure of which is incorporated herein in its entirety by reference. The present application also claims the benefit of U.S. Provisional Patent Application Ser. No. 63/047,621 filed on Jul. 2, 2020, the entire disclosure of which is incorporated herein in its entirety by reference.

FIELD

This disclosure generally relates to wireless communication networks, and more particularly, to a method and apparatus for indicating time delay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE) operating with shared spectrum channel access on a carrier and/or a cell, the UE receives, from a base station, a configuration for configuring a plurality of configured grants for uplink transmission in a bandwidth part (BWP) of the carrier and/or the cell. The plurality of configured grants comprises a first configured grant and a second configured grant. The UE configures, according to the configuration, a first minimum Downlink Feedback Indication (DFI) time delay for the first configured grant, wherein the first minimum DFI time delay is for validation of Hybrid Automatic Repeat Request (HARQ) information in response to one or more first uplink transmissions. The UE configures, according to the configuration, a second minimum DFI time delay for the second configured grant, wherein the second minimum DFI time delay is for validation of HARQ information in response to one or more second uplink transmissions, and wherein the UE does not expect the second minimum DFI time delay to have a different value than the first minimum DFI time delay.

In an example from the perspective of a base station operating with shared spectrum channel access on a carrier and/or a cell, the base station configures a UE with a plurality of configured grants for uplink transmission in a BWP of the carrier and/or the cell, wherein the plurality of configured grants comprises a first configured grant and a second configured grant. The base station configures the UE with a first minimum DFI time delay for the first configured grant, wherein the first minimum DFI time delay is for validation of HARQ information in response to one or more first uplink transmissions. The base station configures the UE with a second minimum DFI time delay for the second configured grant, wherein the second minimum DFI time delay is for validation of HARQ information in response to one or more second uplink transmissions, and wherein the base station is not allowed to configure the second minimum DFI time delay to have a different value than the first minimum DFI time delay.

In an example from the perspective of a base station operating with shared spectrum channel access on a carrier and/or a cell, the base station configures a UE with a plurality of configured grants for uplink transmission in a BWP of the carrier and/or the cell, wherein the plurality of configured grants comprises a first configured grant and a second configured grant. The base station configures the UE with a first minimum Downlink Feedback Indication (DFI) time delay for the first configured grant. The base station configures the UE with a second minimum DFI time delay for the second configured grant, wherein the base station is not allowed to configure the second minimum DFI time delay to have a different value than the first minimum DFI time delay. The base station transmits a dynamic grant to the UE, wherein the dynamic grant schedules a second resource for retransmission of a Transport Block (TB). The base station receives a second uplink transmission on the second resource from the UE. The base station transmits a second Physical Downlink Control Channel (PDCCH) to the UE, wherein the second PDCCH comprises and/or indicates a second DFI, and wherein the second DFI comprises and/or provides a valid Hybrid Automatic Repeat Request (HARD) information in response to the second uplink transmission based on an interval between the second PDCCH and the second resource being larger than or equal to the first minimum DFI time delay or based on the interval being larger than or equal to the second minimum DFI time delay.

BRIEF DESCRIPTION OF THE DRAWINGS

FIG. 11 is a table associated with an exemplary scenario associated with HARQ information and/or minimum Downlink Feedback Indication (DFI) time delay according to one exemplary embodiment.

FIG. 15 is a table associated with an exemplary scenario associated with HARQ information and/or minimum DFI time delay according to one exemplary embodiment.

FIG. 16 is a table associated with an exemplary scenario associated with HARQ information and/or minimum DFI time delay according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: Final Report of 3GPP TSG RAN WG1 #90bis v1.0.0 (Prague, Czech Rep, 9-13 Oct. 2017); RP-193196; 3GPP TS 38.212 V16.1.0 (2020-03), "3GPP TSG RAN; NR Physical channels and modulation (Release 16)"; 3GPP TS 38.214 V16.1.0 (2020-03), "3GPP TSG RAN; NR Physical channels and modulation (Release 16)"; Draft 3GPP TS 38.321 V16.0.0 (2020-03), "3GPP TSG RAN; NR Medium Access Control (MAC) protocol specification (Release 16)"; R1-1909942, Final Report of 3GPP TSG RAN WG1 #98 v1.0.0 (Prague, Czech Rep, 26-30 Aug. 2019); R1-1908468, Samsung; R1-2005144, Samsung; 3GPP TS 38.331 V16.0.0 (2020-03), "3GPP TSG RAN; NR Radio Resource Control (RRC) protocol specification (Release 16)". The standards and documents listed above are hereby expressly incorporated by reference in their entirety.

Figure 1:
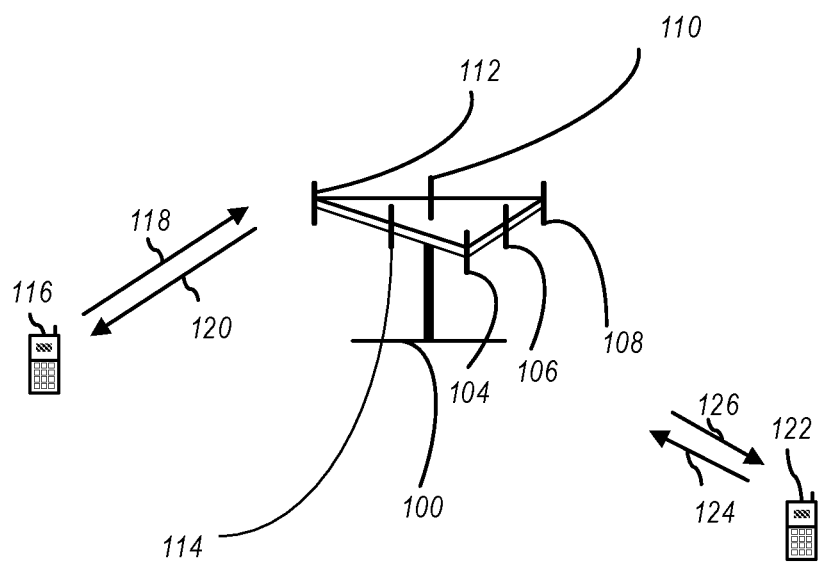
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
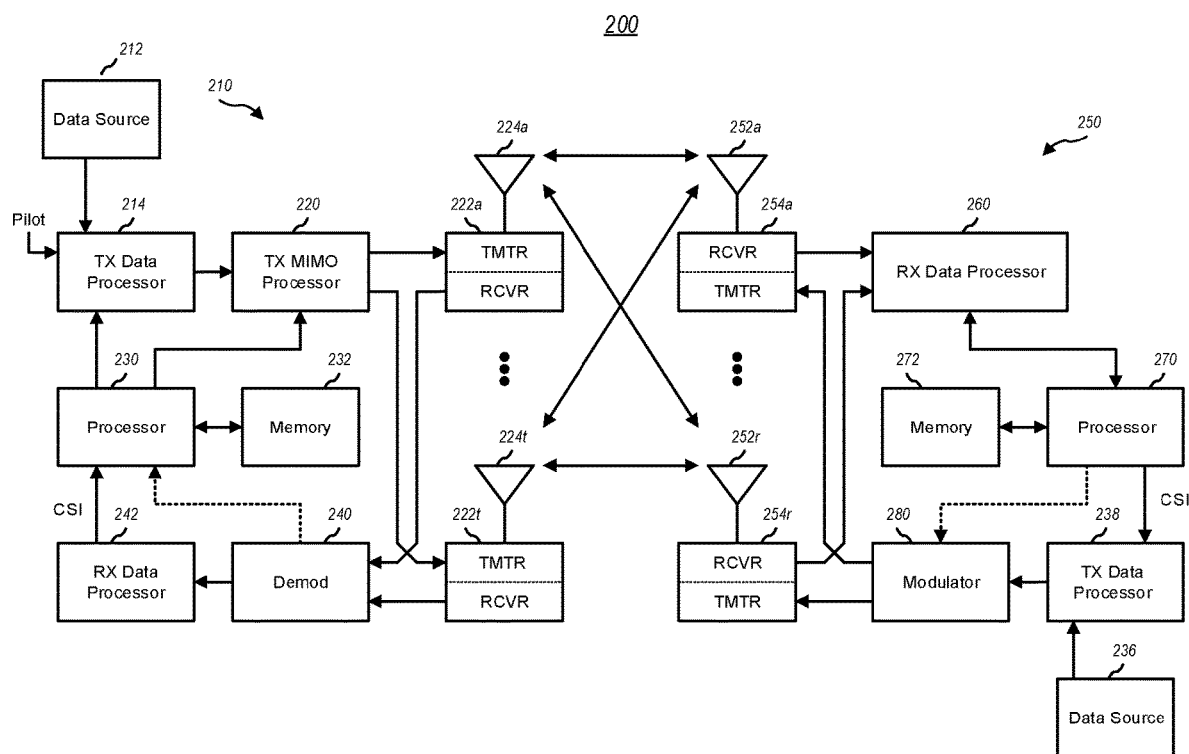
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
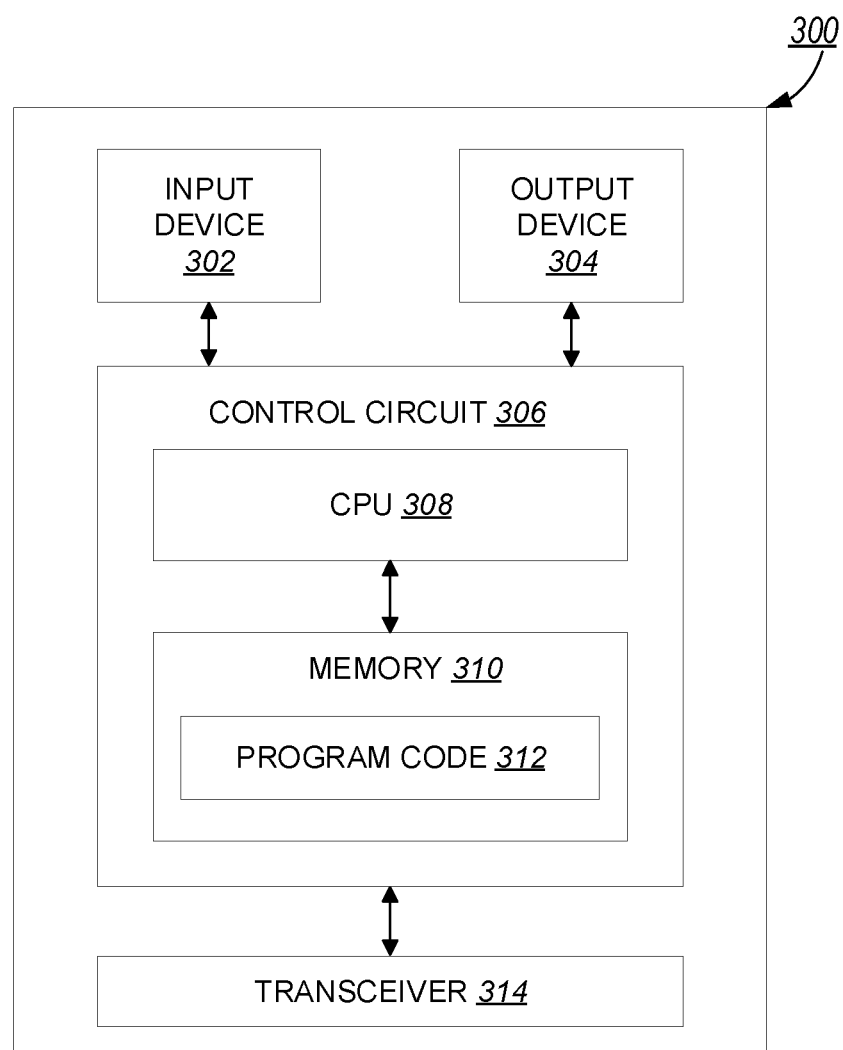
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
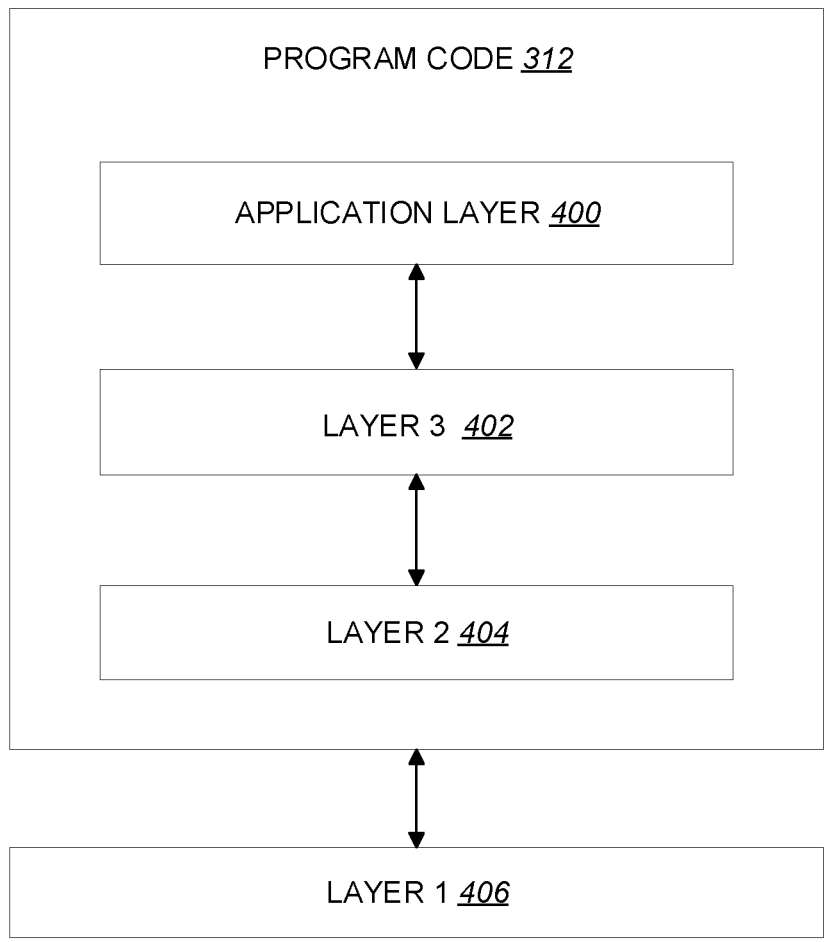
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Details of AUL-DFI (Autonomous-Downlink Feedback Indication (DFI)) in FeLAA (Further enhanced Licensed Assisted Access LAA) in LTE are provided in Final Report of 3GPP TSG RAN WG1 #90bis v1.0.0, portions of which are quoted below:

Agreement:
  Only Asynchronous HARQ is supported for AUL
Agreement:
  Asynchronous AUL HARQ feedback and retransmissions are supported for AUL transmissions.
    Timing relationship between AUL transmission and corresponding UL HARQ feedback is not fixed
    Timing relationship between UL HARQ feedback and corresponding retransmission is not fixed.

NOTE: UE does not expect HARQ feedback earlier than 4 subframes after the corresponding AUL transmission Agreement:
AUL downlink feedback information ("AUL-DFI") is specified to carry at least AUL HARQ feedback
Bitmap with one HARQ-ACK-bit for each AUL-configured HARQ process per TB (FFS: whether spatial bundling is used)
The HARQ feedback includes pending feedback for several uplink transmissions from the same UE.
RV are not included in the AUL-DFI
Align size of DFI with e.g. DCI 0A, or DCI 1C (FFS)
Support transmission of AUL-DFI on unlicensed cell as well as any other scheduling cell
AUL-DFI shall contain HARQ-ACK feedback for SUL transmissions using AUL-enabled HARQ IDs
AUL is not allowed for SUL retransmission
AUL-DFI includes a field indicating TPC for PUSCH (2 bits), applicable for both AUL and SUL transmissions
e.g. applied similarly as TPC in DCI 3/3A in terms of timing
FFS: RNTI for AUL-DFI Agreement:
Any HARQ process that is transmitted by SUL is not eligible for AUL retransmissions
Applies to SUL first transmissions as well as for scheduled retransmissions of an earlier AUL transmissions of the same TB
UE may only use such a HARQ process for AUL if the corresponding AUL-DFI indicated ACK Agreement:
Confirm the working assumption that both scheduled and autonomous retransmission are supported for AUL transmissions.
Scheduled retransmission is triggered by:
Reception of UL grant indicating same HARQ process ID, same TBS, and NDI non-toggled.
FFS: the UE behaviour in case of TBS mismatch
FFS: timing relationship between SUL retransmission grant and AUL-DFI
UE may autonomously retransmit after:
Reception of NACK feedback via the AUL-DFI for explicit AUL HARQ feedback
No indication is received from eNB (neither rescheduling UL grant nor AUL-DFI) for X subframes since the transmission of a given HARQ process
FFS: value of X
FFS: whether X is fixed or configurable
Note: X is not related to CWS update procedure Agreement:
UE determines the HARQ process ID, NDI and RV for Autonomous UL transmissions.
FFS RV sequence followed by the UE Agreement:
New UCI for AUL operation:
includes at least: HARQ ID, new data indicator, and redundancy version.
FFS: CRC attachment and scrambling
FFS: indication of UE specific ID
is transmitted together with every PUSCH in AUL transmission.

In NR-Unlicensed (NR-U) status report, RP-193196 specifies 3GPP progress for NR-U from multiple working groups. Portions of RP-193196 are quoted below:

Agreement:
DFI is transmitted using PDCCH scrambled with CS-RNTI
DFI size is similar to UL DCI size
Size is aligned with UL grant DCI format 0_1 size
To distinguish DCI for activation/deactivation CG transmission and DFI, a 1 bit flag (explicit indication) is used, when type 1 and/or type 2 CG PUSCH is configured
Content of DFI includes
UL/DL flag
CIF in the case of cross carrier scheduled is configured
1 bit flag
HARQ Bitmap
TPC command—2 bits
For type 1 configured grant, UE assumes DFI is only present when CG is configured.
For type 2 configured grant, UE assumes DFI is only present when CG is configured, and UE is in activated state for configured grant transmissions Agreement:
When the UE is configured with repK>1, repetition of a TB is mapped within a configuration in the case when an UE is configured with multiple active configurations
The UE repeats the TB in the earliest consecutive transmission occasion candidates within the same configuration instead of consecutive slots
The UE may drop repetition transmissions that fall into a subsequent configured period.
The UE terminates the repetitions if an explicit feedback indicating ACK in the DFI is received for the HARQ process.

Agreement:
Definition of the minimum duration, D, in the case of slot aggregation/CG repetition
For the case of CG repetitions, the minimum duration D is calculated from the ending symbol of each PUSCH of the K repetitions to the starting symbol of the DFI carrying HARQ-ACK for the associated HARQ process ID
For the case of slot aggregation for scheduled UL transmission, the minimum duration, D, refers to the time between ending symbol of the PUSCH in the first slot of aggregated slots to the starting symbol of the DFI carrying HARQ-ACK for the associated HARQ process ID
For ACK, the minimum duration, D, from the ending symbol of the first PUSCH of the TB repetitions to the starting symbol of the DFI
For NACK, the minimum duration, D, from the ending symbol of the last available PUSCH of the TB repetitions to the starting symbol of the DFI Agreements of CG:

1 The multiple configured grants of a BWP can be explicitly configured to share a common pool of HARQ processes. If HARQ processes are shared the same CG timer value has to be configured.
2 The processes with TB pending for retransmission shall be prioritized over the processes for new transmissions as already agreed for single CG case.

| Agreements of CG: |
|---|
| 3 Retransmissions can be done on different CG resources as long as they are with the same TBS with the same HARQ process |
| 4 cg-RetransmissionTimer is always configured for NR-U |
| 5 For a HARQ process, the associated CGT timer is only started when the TB using this HARQ process is initially transmitted, and set to the timer value according to the CG configuration used. |
| 6 The cg-RetransmissionTimer for the HARQ process is started and restarted for every transmission attempt of the TB when LBT succeeds, using the timer value according to the CG configuration which is used for the transmission. |

Details of DFI (e.g., configured grant (CG)-DFI) related field in a Downlink Control Information (DCI) are provided in 3GPP TS 38.212 V16.1.0 (2020-03), parts of which are quoted below:

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats—1 bit
  The value of this bit field is always set to 0, indicating an UL DCI format Carrier indicator—0 or 3 bits, as defined in Clause 10.1 of [5, TS38.213].

DFI flag—0 or 1 bit
  1 bit if the UE is configured to monitor DCI format 0_1 with CRC scrambled by CS-RNTI and for operation in a cell with shared spectrum channel access. For a DCI format 0_1 with CRC scrambled by CS-RNTI, the bit value of 0 indicates activating type 2 CG transmission and the bit value of 1 indicates CG-DFI. For a DCI format 0_1 with CRC scrambled by C-RNTI/SP-CSI-RNTI/MCS-C-RNTI and for operation in a cell with shared spectrum channel access, the bit is reserved.
  0 bit otherwise;

If DCI format 0_1 is used for indicating CG-DFI, all the remaining fields are set as follows:

HARQ-ACK bitmap—16 bits, where the order of the bitmap to HARQ process index mapping is such that HARQ process indices are mapped in ascending order from MSB to LSB of the bitmap. For each bit of the bitmap, value 1 indicates ACK, and value 0 indicates NACK.

TPC command for scheduled PUSCH—2 bits as defined in Clause 7.1.1 of [5, TS38.213]

All the remaining bits in format 0_1 are set to zero.

Otherwise, all the remaining fields are set as follows:

UL/SUL indicator—0 bit for UEs not configured with supplementary Uplink in ServingCellConfig in the cell or UEs configured with supplementary Uplink in ServingCellConfig in the cell but only one carrier in the cell is configured for PUSCH transmission; otherwise, 1 bit as defined in Table 7.3.1.1.1-1.

Bandwidth part indicator—0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
  $n_{BWP}=n_{BWP,RRC}+1$ if $n_{BWP,RRC} \leq 3$, in which case the bandwidth part indicator is equivalent to the ascending order of the higher layer parameter BWP-Id;
  otherwise $n_{BWP}=n_{BWP,RRC}$, in which case the bandwidth part indicator is defined in Table 7.3.1.1.2-1;

If a UE does not support active BWP change via DCI, the UE ignores this bit field.

Frequency domain resource assignment—number of bits determined by the following, where $N_{RB}^{UL,BWP}$ is the size of the active UL bandwidth part:

If higher layer parameter useInterlacePUSCH-Dedicated-r16 is not configured
  $N_{RBG}$ bits if only resource allocation type 0 is configured, where $N_{RBG}$ is defined in Clause 6.1.2.2.1 of [6, TS 38.214],
  $\lceil \log_2(N_{RB}^{UL,BWP}(N_{RB}^{UL,BWP}+1)/2) \rceil$ bits if only resource allocation type 1 is configured, or max ($\lceil \log_2(N_{RB}^{UL,BWP}(N_{RB}^{UL,BWP}+1)/2) \rceil$, $N_{RBG}$)+1 bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Clause 6.1.2.2.1 of [6, TS 38.214].

For resource allocation type 1, the $\lceil \log_2(N_{RB}^{UL,BWP}(N_{RB}^{UL,BWP}+1)/2) \rceil$ LSBs provide the resource allocation as follows:

For PUSCH hopping with resource allocation type 1:
  $N_{UL\_hop}$ MSB bits are used to indicate the frequency offset according to Clause 6.3 of [6, TS 38.214], where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values
  $\lceil \log_2(N_{RB}^{UL,BWP}(N_{RB}^{UL,BWP}+1)/2) \rceil - N_{UL\_hop}$ bits provides the frequency domain resource allocation according to Clause 6.1.2.2.2 of [6, TS 38.214]

For non-PUSCH hopping with resource allocation type 1:

$\lceil \log_2(N_{RB}^{UL,BWP}(N_{RB}^{UL,BWP}+1)/2) \rceil$ bits provides the frequency domain resource allocation according to Clause 6.1.2.2 of [6, TS 38.214]

If the higher layer parameter useInterlacePUSCH-Dedicated-r16 is configured

5+Y bits provide the frequency domain resource allocation according to Clause 6.1.2.2.3 of [6, TS 38.214] if the subcarrier spacing for the active UL bandwidth part is 30 kHz. The 5 MSBs provide the interlace allocation and the Y LSBs provide the RB set allocation.

6+Y bits provide the frequency domain resource allocation according to Clause 6.1.2.2.3 of [6, TS 38.214] if the subcarrier spacing for the active UL bandwidth part is 15 kHz. The 6 MSBs provide the interlace allocation and the Y LSBs provide the RB set allocation.

The value of Y is determined by $$\left\lceil \log_2\left(\frac{N(N+1)}{2}\right) \right\rceil$$

where N is the number of RB sets contained in the BWP as defined in clause x of [x].

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment—0, 1, 2, 3, 4, 5, or 6 bits

Frequency hopping flag—0 or 1 bit:

Modulation and coding scheme—5 bits as defined in Clause 6.1.4.1 of [6, TS 38.214]

New data indicator—1 bit if the number of scheduled PUSCH indicated by the Time domain resource assignment field is 1; otherwise 2, 3, 4, 5, 6, 7 or 8 bits determined based on the maximum number of schedulable PUSCH among all entries in the higher layer parameter pusch-TimeDomainAllocationList-r16, where each bit corresponds to one scheduled PUSCH as defined in clause 6.1.4 in [6, TS 38.214].

Redundancy version—number of bits determined by the following:

2 bits as defined in Table 7.3.1.1.1-2 if the number of scheduled PUSCH indicated by the Time domain resource assignment field is 1;

otherwise 2, 3, 4, 5, 6, 7 or 8 bits determined by the maximum number of schedulable PUSCHs among all entries in the higher layer parameter pusch-TimeDomainAllocationList-r16, where each bit corresponds to one scheduled PUSCH as defined in clause 6.1.4 in [6, TS 38.214] and redundancy version is determined according to Table 7.3.1.1.2-34.

HARQ process number—4 bits $1^{st}$ downlink assignment index—1, 2 or 4 bits:

....

$2^{nd}$ downlink assignment index—0, 2 or 4 bits:

....

Details of Physical Uplink Shared Channel (PUSCH) transmission in unlicensed cell are provided in 3GPP TS 38.214 V16.1.0 (2020-03), parts of which are quoted below:

If a UE receives an ACK for a given HARQ process in CG-DFI in a PDCCH ending in symbol i to terminate a transport block repetition in a PUSCH transmission on a given serving cell with the same HARQ process after symbol i, the UE is expected to terminate the repetition of the transport block in a PUSCH transmission starting from a symbol j if the gap between the end of PDCCH of symbol i and the start of the PUSCH transmission in symbol j is equal to or more than N2 symbols. The value N2 in symbols is determined according to the UE processing capability defined in Clause 6.4, and N2 and the symbol duration are based on the minimum of the subcarrier spacing corresponding to the PUSCH and the subcarrier spacing of the PDCCH indicating CG-DFI.

....

6.1.2.3 Resource Allocation for Uplink Transmission with Configured Grant

When PUSCH resource allocation is semi-statically configured by higher layer parameter configuredGrantConfig in BWP-UplinkDedicated information element, and the PUSCH transmission corresponding to a configured grant, the following higher layer parameters are applied in the transmission:

For Type 1 PUSCH transmissions with a configured grant, the following parameters are given in configuredGrantConfig unless mentioned otherwise:

For the determination of the PUSCH repetition type, if the higher layer parameter PUSCHRepTypeIndicator-ForType1Configuredgrant is configured and set to 'pusch-RepTypeB', PUSCH repetition type B is applied; otherwise, PUSCH repetition type A is applied;

For PUSCH repetition type A, the selection of the time domain resource allocation table follows the rules for DCI format 0_0 on UE specific search space, as defined in Clause 6.1.2.1.1.

....

The higher layer parameter timeDomainAllocation value m provides a row index m+1 pointing to the determined time domain resource allocation table, where the start symbol and length are determined following the procedure defined in Clause 6.1.2.1;

Frequency domain resource allocation is determined by the N LSB bits in the higher layer parameter frequencyDomainAllocation, forming a bit sequence $f_{17}, \ldots, f_1, f_0$, where $f_0$ is the LSB, according to the procedure in Clause 6.1.2.2 and N is determined as the size of frequency domain resource assignment field in DCI format 0_1 for a given resource allocation type indicated by resourceAllocation, except if useInterlacePUSCH-Dedicated is set to 'enabled', in which case uplink type 2 resource allocation is used wherein the UE interprets the LSB bits in the higher layer parameter frequencyDomainAllocation as for the frequency domain resource assignment field of DCI 0_1 according to the procedure in Clause 6.1.2.2.3;

The $I_{MCS}$ is provided by higher layer parameter mcsAndTBS;

. . . .

For Type 2 PUSCH transmissions with a configured grant:
the resource allocation follows the higher layer configuration according to [10, TS 38.321], and UL grant received on the DCI.
The PUSCH repetition type and the time domain resource allocation table are determined by the PUSCH repetition type and the time domain resource allocation table associated with the UL grant received on the DCI, respectively, as defined in Clause 6.1.2.1.

For PUSCH transmissions with a Type 1 or Type 2 configured grant, the number of (nominal) repetitions K to be applied to the transmitted transport block is provided by the indexed row in the time domain resource allocation table if numberofrepetitions is present in the table; otherwise K is provided by the higher layer configured parameters repK. The UE shall not transmit anything on the resources configured by configuredGrantConfig if the higher layers did not deliver a transport block to transmit on the resources allocated for uplink transmission without grant.

A set of allowed periodicities P are defined in [12, TS 38.331]. The higher layer parameter cg-nrofSlots-r16, provides the number of consecutive slots allocated within a configured grant period. The higher layer parameter cg-nrofPUSCH-InSlot-r16 provides the number of consecutive PUSCH allocations within a slot, where the first PUSCH allocation follows the higher layer parameter timeDomainAllocation, and the remaining PUSCH allocations have the same length and PUSCH mapping type, and are appended following the previous allocations without any gaps. The same combination of start symbol and length and PUSCH mapping type repeats over the consecutively allocated slots.

. . . .

6.1.2.3.1 Transport Block Repetition for Uplink Transmissions of PUSCH Repetition Type A with a Configured Grant The procedures described in this clause apply to PUSCH transmissions of PUSCH repetition Type A with a Type 1 or Type 2 configured grant.

The higher layer parameter repK-R V defines the redundancy version pattern to be applied to the repetitions. If the parameter repK-RV is not provided in the configuredGrant-Config, the redundancy version for uplink transmissions with a configured grant shall be set to 0. Otherwise, for the nth transmission occasion among K repetitions, n=1, 2, . . . , K, it is associated with $(mod(n-1,4)+1)^{th}$ value in the configured RV sequence. If a configured grant configuration is configured with Configuredgrantconfig-StartingfromRVO set to 'off', the initial transmission of a transport block may only start at the first transmission occasion of the K repetitions. Otherwise, the initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K≥8.

For any RV sequence, the repetitions shall be terminated after transmitting K repetitions, or at the last transmission occasion among the K repetitions within the period P, or from the starting symbol of the repetition that overlaps with a PUSCH with the same HARQ process scheduled by DCI format 0_0, 0_1 or 0_2, whichever is reached first. In addition, the UE shall terminate the repetition of a transport block in a PUSCH transmission if the UE receives a DCI format 0_1 with DFI flag provided and set to '1', and if in this DCI the UE detects ACK for the HARQ process corresponding to that transport block.

The UE is not expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE does not transmit the PUSCH in the transmission occasion.

For both Type 1 and Type 2 PUSCH transmissions with a configured grant, when K>1, the UE shall repeat the TB across the K consecutive slots applying the same symbol allocation in each slot, except if the UE is provided with higher layer parameters cg-nrofSlots-r16 and cg-nrof-PUSCH-InSlot-r16, in which case the UE repeats the TB in the repK earliest consecutive transmission occasion candidates within the same configuration. A Type 1 or Type 2 PUSCH transmission with a configured grant in a slot is omitted according to the conditions in Clause 11.1 of [6, TS38.213].

Details of Medium Access Control (MAC) protocol specification in NR are provided in Draft 3GPP TS 38.321 v16.0.0, parts of which are quoted below:

If a HARQ process receives downlink feedback information, the HARQ process shall:

1> stop the cg-RetransmissionTimer, if running;

1> if acknowledgement is indicated:

2> stop the configuredGrantTimer, if running.

If the configuredGrantTimer expires for a HARQ process, the HARQ process shall:

1> stop the cg-RetransmissionTimer, if running.

In 3GPP RAN1 #98 meeting, an agreement is made for CG and DFI in NR-U, and the agreement is quoted below from R1-1909942:

Agreement:

For DFI design for configured grants, support at least the following

DFI including at least TB level HARQ-ACK bitmap for all UL HARQ processes

Note: Total number of HARQ processes is as defined in Rel-15
FFS: CBG level HARQ-ACK feedback, if supported
  RRC configured minimum duration, D, from the ending symbol of the PUSCH to the starting symbol of the DFI carrying HARQ-ACK for that PUSCH
    Note: UE assumes HARQ-ACK is valid only for PUSCH transmissions ending before n-D, where n is the time corresponding to the beginning of the start symbol of the DFI.
    FFS: the definition of minimum duration for the case of slot aggregation
    UE blind decoding complexity shall not be increased due to DFI size
Parts of R1-1908468 are quoted below:
R1-1908468, Samsung
In the SI phase, it was identified to be beneficial to consider HARQ-ACK feedback operation of FeLAA as a baseline. Specifically, configured grant UE can select the HARQ process ID from a configured set of HARQ IDs and gNB can transmit HARQ-ACK feedback with DFI at least for the HARQ processes configured for configured grant. In FeLAA AUL, DFI indicates HARQ-ACK feedback based on HARQ-ACK bitmap for all HARQ process IDs including scheduled PUSCH and AUL PUSCH. Similarly, for NR-U configured grant, it is beneficial to consider bitmap based HARQ-ACK feedback including scheduled PUSCH in order to update contention window size for scheduled PUSCH. However, it should be carefully discussed whether or not to allow retransmission of scheduled PUSCH on configured grant resource by DFI.
Proposal 4: NR-U Configured Grant should Support Bitmap Based HARQ-ACK Feedback with DFI. HARQ ACK Feedback for Scheduled PUSCH can be Included in DFI.
  Parts of R1-2005144 are quoted below:
A UE can be configured a number of search space sets to monitor PDCCH for detecting a DCI format 0_1 with a DFI flag field and CRC scrambled with a CS-RNTI provided by cs-RNTI. The UE determines that the DCI format provides HARQ-ACK information for PUSCH transmissions when a DFI flag field value is set to '1', if a PUSCH transmission is configured by ConfiguredGrantConfig.
The HARQ-ACK information corresponds to transport blocks in PUSCH transmissions for all HARQ processes for a serving cell of a PDCCH reception that provides DCI format 0_1 or, if DCI format 0_1 includes a carrier indicator field, for a serving cell indicated by a value of the carrier indicator field.

For a PUSCH transmission configured by ConfiguredGrantConfig, HARQ-ACK information for a transport block of a corresponding HARQ process number is valid if a first symbol of the PDCCH reception is after a last symbol of the PUSCH transmission, or of any repetition of the PUSCH transmission, by a number of symbols provided by cg-minDFIDelay-r16.
For an initial transmission by a UE of a transport block in a PUSCH configured by ConfiguredGrantConfig, if the UE receives a CG-DFI that provides HARQ-ACK information for the transport block, the UE assumes that the transport block was correctly decoded if the HARQ-ACK information value is ACK; otherwise, the UE assumes that the transport block was not correctly decoded.
For a PUSCH transmission scheduled by a DCI format, HARQ-ACK information for a transport block of a corresponding HARQ process number is valid if a first symbol of the PDCCH reception is after a last symbol of the PUSCH transmission by a number of symbols provided by cg-minDFIDelay-r16 or, if the PUSCH transmission is over multiple slots,
  after a last symbol of the PUSCH transmission in a first slot from the multiple slots by a number of symbols provided by cg-minDFIDelay-r16, if a value of the HARQ-ACK information is ACK.
  after a last symbol of the PUSCH transmission in a last slot from the multiple slots by a number of symbols provided by cg-minDFIDelay-r16, if a value of the HARQ-ACK information is NACK.
Parts of 3GPP TS 38.331 V16.0.0 (2020-03) are quoted below:
  BWP-UplinkDedicated
The IE BWP-UplinkDedicated is used to configure the dedicated (UE specific) parameters of an uplink BWP.

BWP-UplinkDedicated Information Element

```
-- ASN1START
-- TAG-BWP-UPLINKDEDICATED-START
BWP-UplinkDedicated ::=         SEQUENCE {
  pucch-Config                  SetupRelease { PUCCH-Config }
OPTIONAL,   -- Need M
  pusch-Config                  SetupRelease { PUSCH-Config }
OPTIONAL,   -- Need M
  configuredGrantConfig         SetupRelease {
ConfiguredGrantConfig }         OPTIONAL,   -- Need M
  ...
}
-- TAG-BWP-UPLINKDEDICATED-STOP
-- ASN1STOP
```

BWP-UplinkDedicated field descriptions

...
configuredGrantConfig
A Configured-Grant of type1 or type2. It may be configured for UL or SUL but in case of type1 not for both at a time. Except for reconfiguration with sync, the NW does not reconfigure configuredGrantConfig when there is an active configured uplink grant Type 2 (see TS 38.321 [3]). However, the NW may release the configuredGrantConfig at any time.
configuredGrantConfigList
A list of multiple configured grant configurations for one BWP. Except for reconfiguration with sync, the NW does not reconfigure a Type 2 configured grant configuration when it is active (see TS 38.321 [3]). However, the NW may release a configured grant configuration at any time.

ConfiguredGrantConfig

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

ConfiguredGrantConfig Information Element

```
-- ASN1START
-- TAG-CONFIGUREDGRANTCONFIG-START
ConfiguredGrantConfig ::=                SEQUENCE {
    ...
    nrofHARQ-Processes                   INTEGER (1..16),
    repK                                 ENUMERATED {n1, n2, n4, n8},
    repK-RV                              ENUMERATED {s1-0231, s2-0303, s3-0000}   OPTIONAL,   --Need R
    periodicity                          ENUMERATED {
                                             sym2, sym7, sym1x14,
        sym2x14, sym4x14, sym5x14, sym8x14, sym10x14, sym16x14, sym20x14,
                                             sym32x14, sym40x14,
        sym64x14, sym80x14, sym128x14, sym160x14, sym256x14, sym320x14, sym512x14,
                                             sym640x14, sym1024x14,
        sym1280x14, sym2560x14, sym5120x14,
                                             sym6, sym1x12,
        sym2x12, sym4x12, sym5x12, sym8x12, sym10x12, sym16x12, sym20x12, sym32x12,
                                             sym40x12, sym64x12,
        sym80x12, sym128x12, sym160x12, sym256x12, sym320x12, sym512x12, sym640x12,
                                             sym1280x12, sym2560x12
    },
    configuredGrantTimer                 INTEGER (1..64)       OPTIONAL,   -- Need R
    rrc-ConfiguredUplinkGrant            SEQUENCE {
        timeDomainOffset                 INTEGER (0..5119),
        timeDomainAllocation             INTEGER (0..15),
        frequencyDomainAllocation        BIT STRING (SIZE(18)),
        ...,
    [[
    cg-RetransmissionTimer-r16           INTEGER (1..64)       OPTIONAL,   -- Need R
    cg-minDFI-Delay-r16                  INTEGER (1..ffsValue) OPTIONAL,   -- Need R Upper limit 7 FFS
    cg-nrofPUSCH-InSlot-r16              INTEGER (1..ffsValue) OPTIONAL,   -- Need R
    cg-nrofSlots-r16                     INTEGER (1..ffsValue) OPTIONAL,   -- Need R
    ...
    harq-ProcID-Offset-r16               INTEGER (0..15)       OPTIONAL,   -- Need M
    harq-ProcID-Offset2-r16              INTEGER (0..15)       OPTIONAL,   -- Need M
    configuredGrantConfigIndex-r16
    ConfiguredGrantConfigIndex-r16                             OPTIONAL, -- Need M
    configuredGrantConfigIndexMAC-r16
    ConfiguredGrantConfigIndexMAC-r16                          OPTIONAL, -- Need M
    periodicityExt-r16                   INTEGER (1..5120)     OPTIONAL,   -- Need M
    startingFromRV0-r16                  ENUMERATED {on, off}  OPTIONAL,   -- Need M
    phy-PriorityIndex-r16                ENUMERATED {p0, p1}   OPTIONAL,   -- Need M
    autonomousReTx-r16                   ENUMERATED {enabled}  OPTIONAL    -- Cond LCH-BasedPrioritization
    ]]
}
...
-- TAG-CONFIGUREDGRANTCONFIG-STOP
-- ASN1STOP
```

| ConfiguredGrantConfig field descriptions |
| --- | autonomousReTx
If this field is present, the Configured Grant configuration is configured with autonomous retransmission, see TS 38.321 [3].
Editor's Note: The name autonomousReTx need to be confirmed.
. . .
cg-minDFIDelay
Indicates the minimum duration (in unit of symbols) from the ending symbol of the CG-PUSCH to the starting symbol of the DFI carrying HARQ-ACK for that PUSCH. UE assumes HARQ-ACK is valid only for PUSCH transmissions ending before n-cg-DFIDelay-r16, where n is the time corresponding to the beginning of the start symbol of the DFI (see TS 38.213 [13], clause 10.3) . . .
cg-nrofPUSCH-InSlot
Indicates the number of consecutive PUSCH configured to CG within a slot where the SLIV indicating the first PUSCH and additional PUSCH appended with the same length (see TS 38.214 [19], clause 6.1.2.3).
cg-nrofSlots
Indicates the number of allocated slots in a configured grant periodicity following the time instance of configured grant offset (see TS 38.214 [19], clause 6.1.2.3).
cg-RetransmissionTimer
Indicates the initial value of the configured retransmission timer (see TS 38.321 [3]) in multiples of periodicity. The value of cg-RetransmissionTimer is always less than the value of configuredGrantTimer. This IE is always configured for configured grants on operation with shared spectrum channel access.
. . .
configuredGrantConfigIndex
Indicates the index of the Configured Grant configurations within the BWP.
configuredGrantConfigIndexMAC
Indicates the index of the Configured Grant configurations within the MAC entity.
configuredGrantTimer
Indicates the initial value of the configured grant timer (see TS 38.321 [3]) in multiples of periodicity. When cg-RetransmissonTimer is configured, if HARQ processes are shared among different configured grants on the same BWP, configuredGrantTimer is set to the same value for all of configurations on this BWP.
frequencyDomainAllocation
Indicates the frequency domain resource allocation, see TS 38.214 [19], clause 6.1.2, and TS 38.212 [17], clause 7.3.1).
. . .
harq-ProcID-Offset
For operation with shared spectrum channel access, this configures the range of HARQ process IDs which can be used for this configured grant where the UE can select a HARQ process ID within [harq-procID-offset, . . . , (harq-procID-offset + nrofHARQ-Processes-1)].
harq-ProcID-Offset2
Indicates the offset used in deriving the HARQ process IDs, see TS 38.321 [3], clause 5.4.1.
. . .
nrofHARQ-Processes
The number of HARQ processes configured. It applies for both Type 1 and Type 2. See TS 38.321 [3], clause 5.4.1.
. . .
periodicity
Periodicity for UL transmission without UL grant for type 1 and type 2 (see TS 38.321 [3], clause 5.8.2).
The following periodicities are supported depending on the configured subcarrier spacing [symbols]:
15 kHz: 2, 7, n * 14, where n = {1, 2, 4, 5, 8, 10, 16, 20, 32, 40, 64, 80, 128, 160, 320, 640}
30 kHz: 2, 7, n * 14, where n = {1, 2, 4, 5, 8, 10, 16, 20, 32, 40, 64, 80, 128, 160, 256, 320, 640, 1280}
60 kHz with normal CP 2, 7, n * 14, where n = {1, 2, 4, 5, 8, 10, 16, 20, 32, 40, 64, 80, 128, 160, 256, 320, 512, 640, 1280, 2560}
60 kHz with ECP: 2, 6, n * 12, where n = {1, 2, 4, 5, 8, 10, 16, 20, 32, 40, 64, 80, 128, 160, 256, 320, 512, 640, 1280, 2560}
120 kHz: 2, 7, n * 14, where n = {1, 2, 4, 5, 8, 10, 16, 20, 32, 40, 64, 80, 128, 160, 256, 320, 512, 640, 1024, 1280, 2560, 5120}
periodicityExt
This field is used to calculate the periodicity for UL transmission without UL grant for type 1 and type 2 (see TS 38.321 [3], clause 5, 8.2). If this field is present, the field periodicity is ignored.
The following periodicites are supported depending on the configured subcarrier spacing [symbols]:
15 kHz: periodicityExt * 14, where periodicityExt has a value between 1 and 640.
30 kHz: periodicityExt * 14, where periodicityExt has a value between 1 and 1280.
60 kHz with normal CP: periodicityExt * 14, where periodicityExt has a value between 1 and 2560.

| ConfiguredGrantConfig field descriptions |
|---|
| 60 kHz with ECP: periodicityExt * 12, where periodicityExt has a value between 1 and 2560.<br>120 kHz: periodicityExt * 14, where periodicityExt has a value<br>between 1 and 5120.<br>. . .<br>repK-RV<br>The redundancy version (RV) sequence to use. See TS 38.214 [19], clause 6.1.2. The network<br>configures this field if repetitions are used, i.e., if repK is set to n2, n4 or n8. Otherwise, the field<br>is absent.<br>repK<br>The number of repetitions of K.<br>resourceAllocation<br>Configuration of resource allocation type 0 and resource allocation type 1. For Type 1 UL data<br>transmission without grant, resourceAllocation should be resourceAllocationType0 or<br>resourceAllocationType1.<br>rrc-ConfiguredUplinkGrant<br>Configuration for "configured grant" transmission with fully RRC-configured UL grant (Type1). If<br>this field is absent the UE uses UL grant configured by DCI addressed to CS-RNTI (Type2).<br>Type 1 configured grant may be configured for UL or SUL, but not for both simultaneously.<br>. . .<br>startingFromRV0<br>This field is used to determine the initial transmission occasion of a transport block for a given<br>RV sequence, see TS 38.214 [19], clause 6.1.2.3.1.<br>timeDomainAllocation<br>Indicates a combination of start symbol and length and PUSCH mapping type, see TS 38.214<br>[19], clause 6.1.2 and TS 38.212 [17], clause 7.3.1.<br>timeDomainOffset<br>Offset related to the reference SFN indicated by timeReferenceSFN, see TS 38.321 [3], clause<br>5.8.2. If the field timeReferenceSFN is not present, the reference SFN is 0.<br>timeReferenceSFN<br>Indicates SFN used for determination of the offset of a resource in time domain. The UE uses<br>the closest SFN with the indicated number preceding the reception of the configured grant<br>configuration, see TS 38.321 [3], clause 5.8.2. |

In LTE (e.g., LTE License-Assisted Access (LAA), LTE enhanced License-Assisted Access (eLAA) and/or LTE further enhanced License-Assisted Access (FeLAA)), HARQ-ACK (Hybrid Automatic Repeat Request (HARQ)-Acknowledgement (ACK)) feedback (e.g., explicit HARQ-ACK feedback), such as Downlink Feedback Indication (DFI) (e.g., autonomous DFI (AUL-DFI)), is introduced for autonomous uplink transmission (e.g., autonomous uplink retransmission). HARQ-ACK feedback (e.g., AUL-DFI) may be a bit-map comprising 16 bits carried by Physical Downlink Control Channel (PDCCH). In some examples, each bit in the bit-map is associated with a HARQ process (HP) for an unlicensed cell. In some examples, in response to a UE receiving an AUL-DFI indicative of Negative Acknowledgement (NACK) for one or more HARQ processes associated with one or more configured grants (CGs) for an unlicensed cell, the UE may perform autonomous retransmission associated with the one or more HARQ processes.

DFI is also introduced in NR-Unlicensed (NR-U). Different from LTE (e.g., LTE LAA, LTE eLAA and/or LTE FeLAA), in NR-U, a validation time, a processing time, a round trip time and/or a minimum DFI time delay (e.g., cg-minDFIDelay-r16) for network to process Physical Uplink Shared Channel (PUSCH) and generate a corresponding DFI may be defined from an ending symbol of the PUSCH to a starting symbol of PDCCH carrying the DFI. For example, if an interval between an ending symbol of PUSCH associated with HARQ process i (e.g., a HARQ process with a HARQ process number/ID corresponding to i) to a starting symbol of PDCCH carrying DFI is smaller than cg-minDFIDelay-r16, the DFI associated with HARQ process i is not valid (and/or the UE and/or a network may determine that the DFI does not comprise a valid HARQ information associated with HARQ process i based on the interval being smaller than cg-minDFIDelay-r16). The term "HARQ process number/ID" may correspond to a HARQ process number and/or a HARQ process identity (ID) of a HARQ process. In some examples, if the interval is smaller than cg-minDFIDelay-r16, the UE may not perform retransmission associated with HARQ process i (and/or the UE may not use the DFI to determine whether or not to perform retransmission associated with HARQ process i) and/or the UE may not consider that a transmission (e.g., PUSCH transmission) associated with HARQ process i is successfully received by network (and/or the UE may not use the DFI to determine whether or not the transmission associated with HARQ process i is successfully received by the network). The validation time (e.g., cg-minDFIDelay-r16) may be associated with a configured grant configuration (e.g., each configured grant configuration) and/or may be determined based on a configured grant configuration.

Figure 5:
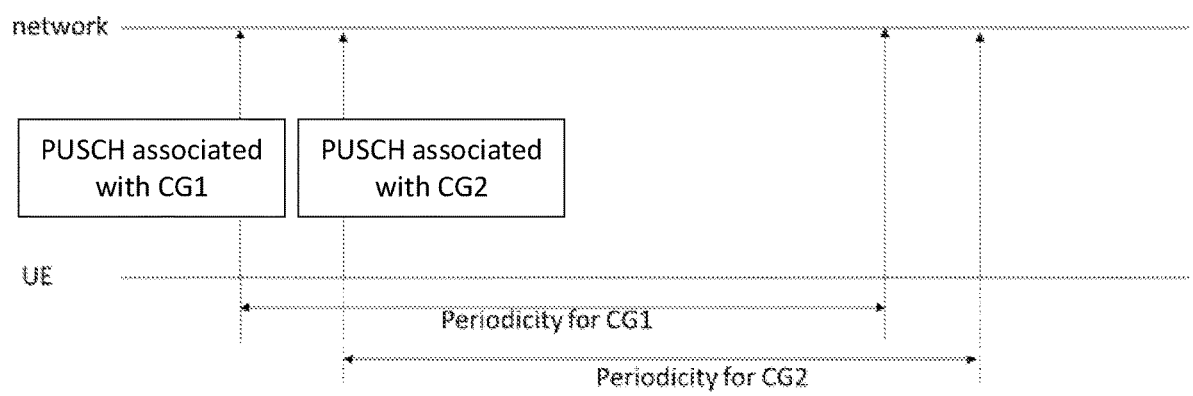
FIG. 5 is a diagram illustrating an exemplary scenario associated with configured grant resource configuration and/or allocation in time domain according to one exemplary embodiment.
Figure 6:
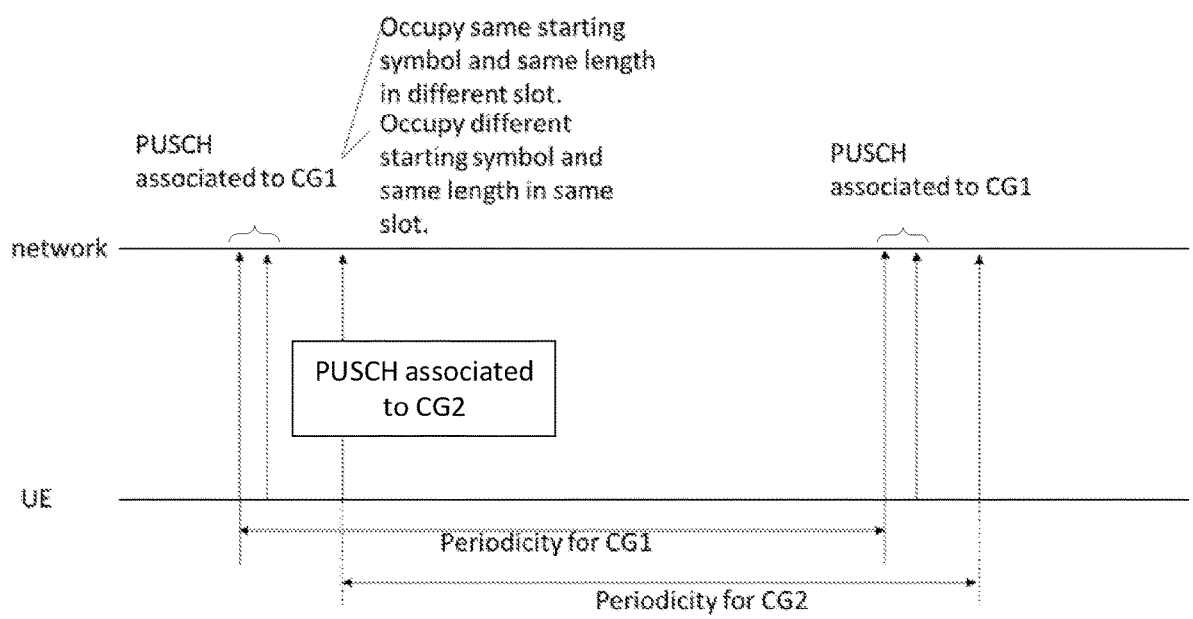
FIG. 6 is a diagram illustrating an exemplary scenario associated with configured grant resource configuration and/or allocation in time domain according to one exemplary embodiment.

Alternatively and/or additionally, multiple configured grant configurations for a UE (in an uplink BWP, for example) is introduced. In some examples, such as in accordance with progress of RAN2, HARQ processes (amounting to a number of HARQ processes, for example) may be shared by the multiple configured grant configurations. In an example in which HARQ process number/IDs {1,2,3} are shared for CG1 and CG2, latency may be reduced if a first transmission (e.g., initial transmission) of a Transport Block (TB) is performed via a CG1 PUSCH resource and a second transmission (e.g., a retransmission) of the TB is performed via CG2 (e.g., the latency may be reduced since the UE is not required to wait for a next CG1 PUSCH resource to perform the second transmission). Such configured grant (CG) resource configuration and/or allocation in time domain may be illustrated in FIG. 5. For example, in FIG. 5, a PUSCH resource associated with CG2 is between two (consecutive and/or periodic) PUSCH resources associated with CG1 (wherein a time period between the two PUSCH resources associated with CG1 may correspond to a periodicity for CG1 as shown in FIG. 5). In some examples, such as shown in FIG. 6, for a periodic occasion associated with a configured grant, there may be two PUSCH occasions (e.g., two consecutive PUSCH occasions). FIG. 6 illustrates configured grant (CG) resource configuration and/or allocation in time domain, wherein for each periodic occasion associated with CG1, there are two consecutive PUSCH occasions. In some examples, the two consecutive PUSCH occasions may be back-to-back (e.g., a starting symbol of a later PUSCH occasion of the two consecutive PUSCHs may be a next symbol after an ending symbol of an earlier PUSCH occasion of the two consecutive PUSCH occasions). Alternatively and/or additionally, the two consecutive PUSCH occasions may have the same starting symbols and/or the same lengths in different slots (e.g., different consecutive slots). In an example, a starting symbol of an earlier PUSCH occasion of the two consecutive PUSCH occasions may be a 5th symbol of a first slot and a starting symbol of a later PUSCH occasion of the two consecutive PUSCH occasions may be a 5th symbol of a second slot, wherein the second slot may be after the first slot (e.g., the second slot may be a next slot after the first slot). Alternatively and/or additionally, a length of the earlier PUSCH occasion may be the same as a length of the later PUSCH occasion.

Figure 7:
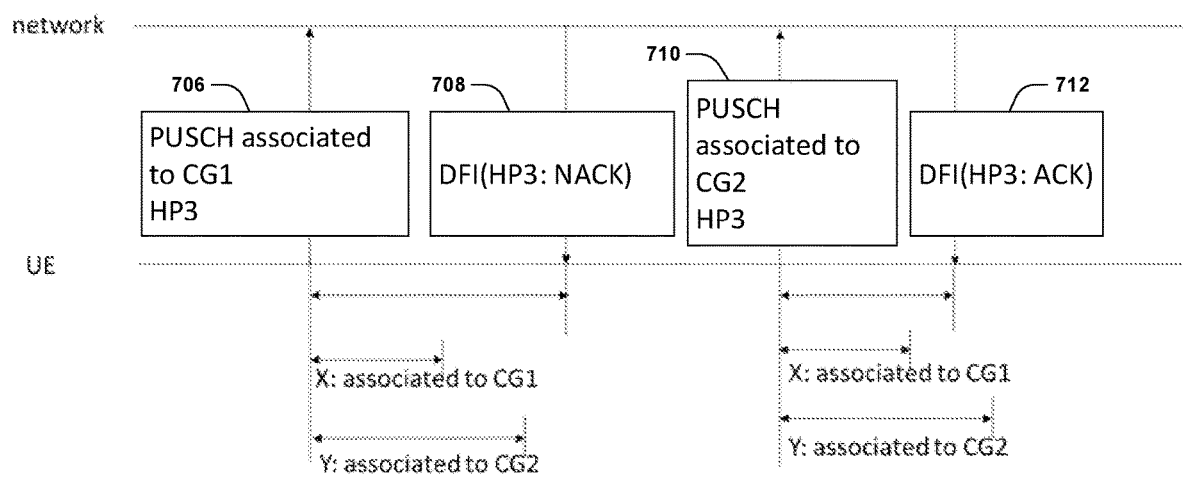
FIG. 7 is a diagram illustrating an exemplary scenario associated with configured grant resource configuration and/or allocation in time domain according to one exemplary embodiment.
Figure 8:
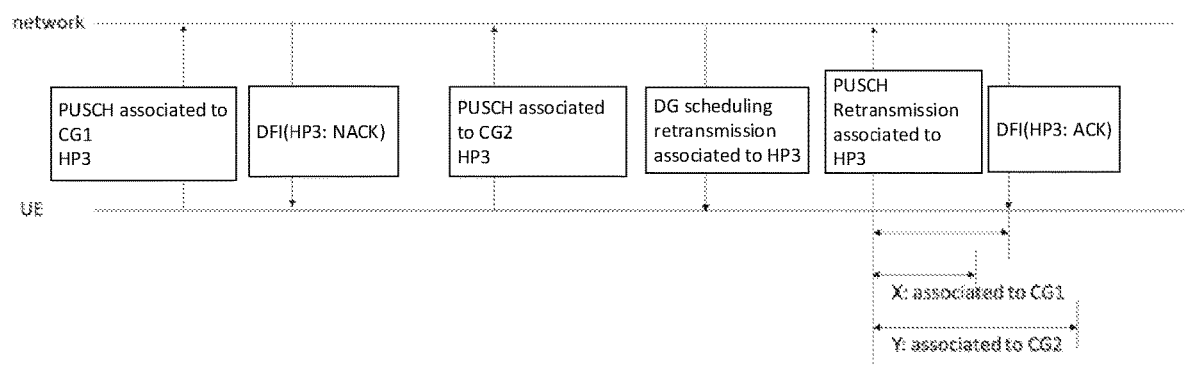
FIG. 8 is a diagram illustrating an exemplary scenario associated with configured grant resource configuration and/or allocation in time domain according to one exemplary embodiment.

However, different configured grants may have different validation time configured values (such as due to validation time (e.g., cg-minDFIDelay-r16) being associated with each configured grant). In an example shown in FIG. 7, for a TB, a UE may transmit a first PUSCH 706 associated with CG1 and a second PUSCH 710 associated with CG2. The first PUSCH 706 and the second PUSCH 710 may be transmitted via HARQ process 3 (HP3). In the example, if a first validation time of CG1 is configured as X and a second validation time of CG2 is configured as Y (where Y is different than X), for a first DFI 708 (e.g., NACK as shown in FIG. 7), an interval between the first PUSCH 706 and a PDCCH carrying the first DFI 708 may be larger than a validation time (e.g., a largest validation time, such as the second validation time Y). However, for a second DFI 712 (e.g., ACK as shown in FIG. 7), an interval between the second PUSCH 710 and a PDCCH carrying the second DFI 712 is between the first validation time X and the second validation time Y. It is unclear how a UE can determine whether or not a received DFI associated with HP3, such as the second DFI 710, is valid. As shown in FIG. 8, a similar issue (in which a UE may not be able to determine whether or not a received DFI is valid, for example) may occur for a dynamic grant scheduling retransmission associated with HP3 (such as due to HP3 being shared by CG1 and CG2, and/or due to both CG1 and CG2 being configured with HP3). In the example shown in FIG. 8, an interval between a PUSCH retransmission associated with HP3 scheduled by dynamic grant (DG) and a PDCCH carrying the second DFI is larger than the first validation time X and smaller than the second validation time Y, and thus, whether or not the second DFI is valid may be unclear to the UE.

One or more devices, systems and/or techniques are provided herein to solve and/or address above issues (such as where a UE may not be able to determine whether or not a received DFI is valid).

First Concept

In the first concept, there may be a restriction and/or a limitation for configuration (by a network (NW), for example) for configured grant in unlicensed spectrum and/or for operation in a cell with shared spectrum channel access.

In some examples, for one or more HARQ process numbers/IDs configured (and/or shared) for configured grants, a validation time for each configured grant configuration may be the same. In some examples, the network is not allowed (and/or is not configured) to configure (and/or is prevented from configuring and/or prohibited from configuring) different validation times for configured grants of a set of configured grants (e.g., a set of one or more configured grants). For example, the network may configure the same validation time for each configured grant of the set of configured grants. For a configured grant not belonging to the set of configured grants, the network may configure a validation time that is different than a validation time configured for the set of configured grants. In an example in which the set of configured grants comprise a first configured grant configuration and a second configured grant configuration, a UE may not expect to receive the first configured grant configuration with a different validation time value than a validation time value of the second configured grant configuration. In some examples, a configured grant configuration may be associated with a set of HARQ process numbers/IDs (e.g., a set of one or more HARQ process numbers/IDs). In an example, each configured grant configuration (provided by the network, for example) may be associated with one set of HARQ process numbers, respectively. In some examples, when a UE performs uplink transmission via a configured grant configuration, the UE may select a HARQ process number/ID (for the uplink transmission, for example) among a set of HARQ process numbers/IDs associated with the configured grant configuration. In some examples, the set of configured grants comprises a first configured grant (associated with the first configured grant configuration, for example) and a second configured grant (associated with the second configured grant configuration, for example), wherein a set of HARQ process numbers/IDs of the first configured grant configuration and a set of HARQ process numbers/IDs of the second configured grant configuration comprise at least one same HARQ process number/ID.

In an example, CG1 may be configured with HARQ process numbers/IDs {1~3} (HARQ process numbers/IDs 1 through 3), CG2 may be configured with HARQ process numbers/IDs {3~5}, and CG3 may be configured with HARQ process numbers/IDs {6~7}. The set of configured grants may comprise CG1 and CG2 (and may not comprise CG3). In this example, for CG1 and CG2, the network is not allowed (and/or is not configured) to configure validation time for CG1 and for CG2 with different values (e.g., the network may configure CG1 and CG2 to have the same validation time). For CG3, the network may configure validation time for CG3 with a value different than validation time for CG1 or CG2.

In another example, CG1 may be configured with HARQ process numbers/IDs {1~3}, CG2 may be configured with HARQ process numbers/IDs {2~4}, and CG3 may be configured with HARQ process numbers/IDs {3~5}. In this example, the network may not be allowed (and/or may not be configured) to configure different validation times for CG1, CG2 and CG3 (e.g., the network may configure CG1, CG2 and CG3 to have the same validation time).

In another example, CG1 and CG2 are configured with HARQ process numbers/IDs {1~3}, and CG3 and CG4 are configured with HARQ process numbers/IDs {4~6}. In this example, the network may not be allowed (and/or may not be configured) to configure CG1 and CG2 with different validation times (e.g., the network may configure CG1 and CG2 to have the same validation time), and the network may not be allowed (and/or may not be configured) to configure CG3 and CG4 with different validation times (e.g., the network may configure CG3 and CG4 to have the same validation time). Alternatively and/or additionally, the network may configure a first validation time for CG1 and CG2 and may configure a second validation time for CG3 and CG4, wherein the first validation time is the same as or different than the second validation time.

Alternatively and/or additionally, a validation time (e.g., a single validation time) may be configured for one or more uplink transmissions on an unlicensed carrier and/or cell (e.g., all uplink transmissions on the unlicensed carrier and/or cell). The one or more uplink transmissions may be scheduled by one or more dynamic grants and/or one or more configured grants. Alternatively and/or additionally, the one or more uplink transmissions may be associated with one or more configured grants. For example, a parameter (e.g., a validation time parameter that comprises and/or configures validation time) may be per unlicensed carrier and/or cell and/or may not be per configured grant. In some examples, configured grants (e.g., different configured grants) in a same BWP on the unlicensed cell/carrier or in different BWPs on the unlicensed cell/carrier may be associated with the validation time (e.g., the single validation time) for the unlicensed cell/carrier.

Alternatively and/or additionally, a validation time (e.g., a single validation time) may be configured for one or more uplink transmissions on a BWP on the unlicensed carrier and/or cell (e.g., all uplink transmissions on the BWP on the unlicensed carrier and/or cell).

Alternatively and/or additionally, a validation time (e.g., only one validation time) or a parameter for configuring a validation time (e.g., only one parameter for configuring a validation time) may be configured per BWP or per LBT bandwidth on the unlicensed carrier and/or cell. For example, parameter (e.g., a validation time parameter that comprises and/or configures validation time) may not be per configured grant. Configured grants (e.g., different configured grants) in a BWP may be associated with the validation time for the BWP.

Alternatively and/or additionally, a validation time (e.g., a single validation time) may be configured for HARQ process numbers/IDs associated with one or more configured grants for the unlicensed carrier and/or cell (e.g., the HARQ process numbers/IDs may comprise all HARQ process numbers/IDs associated with one or more configured grants for the unlicensed carrier and/or cell and/or may comprise HARQ process numbers/IDs amounting to a number of HARQ process numbers/IDs).

Figure 9:
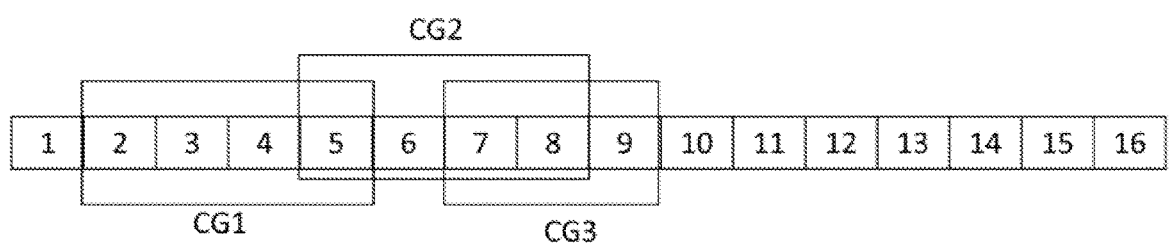
FIG. 9 is a diagram illustrating an exemplary configuration of configured grants and/or Hybrid Automatic Repeat Request (HARQ) processes associated with the configured grants according to one exemplary embodiment.

In an example shown in FIG. 9, a UE is configured with a plurality of configured grants on a BWP on an unlicensed carrier and/or cell. The plurality of configured grants comprise CG1~CG3 (configured grants 1 through 3), and/or one or more other configured grants in addition to CG1, CG2 and CG3). CG1 is with HARQ processes {2~5}, CG2 is with HARQ processes {5~8}, and CG3 is with HARQ processes {7~9}.

In some examples, a minimum DFI time delay may be configured to the UE for each carrier, for each cell or for each BWP on the unlicensed cell. Alternatively and/or additionally, a minimum DFI time delay may be configured to the UE for each LBT bandwidth on the unlicensed cell.

In some examples, each configured grant may be configured with a minimum DFI time delay, respectively (e.g., CG1 may be configured with minimum DFI time delay_1, CG2 may be configured with minimum DFI time delay_2 and/or CG3 may be configured with minimum DFI time delay_3). In some examples, a network is not allowed (and/or is not configured) to configure minimum DFI time delays, for CG1, CG2 and CG3, that have different values (e.g., the minimum DFI time delays for CG1, CG2 and CG3 may be the same). For example, minimum DFI time delay_1=minimum DFI time delay_2=minimum DFI time delay_3.

In some examples, at least one configured grant among CG1, CG2 and CG3 is configured with a minimum DFI time delay. In an example, CG1 is configured with a minimum DFI time delay (e.g., minimum DFI time delay_1). CG2 and CG3 may not be configured with a minimum DFI time delay (e.g., a parameter for configuring and/or setting a minimum DFI time delay for CG2 and CG3 may be absent). Minimum DFI time delays for CG2 and CG3 may be determined based on minimum DFI time delay_1 (for CG1).

In some examples, at least one configured grant among CG1, CG2 and CG3 is configured with a minimum DFI time delay. In an example, each configured grant of CG1 and CG3 is configured with minimum DFI time delay, respectively (e.g., CG1 is configured with minimum DFI time delay_1 and/or CG3 is configured with minimum DFI time delay_3). The network may not be allowed (and/or may not be configured) to configure minimum DFI time delays, for CG1 and CG3, that are different values. For example, the network may configure the minimum DFI time delay_1 for CG1 and the minimum DFI time delay_3 for CG3 such that the minimum DFI time delay_1 is equal to the minimum DFI time delay_3. The network and/or the UE may determine minimum DFI time delay for CG2 based on the minimum DFI time delay_1 for CG1 or the minimum DFI time delay_3 for CG3 (e.g., the minimum DFI time delay for CG2 may be the same as the minimum DFI time delay_1 for CG1 and the minimum DFI time delay_3 for CG3). Alternatively and/or additionally, the network and/or the UE may determine minimum DFI time delay for CG2 based on a smallest time delay value or largest time delay value among the minimum DFI time delay_1 and the minimum DFI time delay_3 (e.g., the minimum DFI time delay for CG2 may be the same as the smallest time delay value or the largest time delay value among the minimum DFI time delay_1 for CG1 and the minimum DFI time delay_3 for CG3).

In some examples, each configured grant may be configured with a minimum DFI time delay, respectively (e.g., CG1 may be configured with minimum DFI time delay_1, CG2 may be configured with minimum DFI time delay_2 and/or CG3 may be configured with minimum DFI time delay_3). For HARQ process number/ID {5} (with which CG1 and CG2 are configured), the UE and/or the network may determine a minimum DFI time delay based on a smallest time delay value or a largest time delay value among the minimum DFI time delay_1 and the minimum DFI time delay_2. For HARQ process numbers/IDs {7, 8} (with which CG2 and CG3 are configured), the UE and/or the network may determine a minimum DFI time delay based on a smallest time delay value or a largest time delay value among the minimum DFI time delay_2 and the minimum DFI time delay_3. For HARQ process numbers/IDs {2, 3, 4} (with which CG1 is configured), the UE and/or the network may determine a minimum DFI time delay based on CG1 (e.g., the minimum DFI time delay may be determined to be the minimum DFI time delay_1). For HARQ process number/ID {6} (with which CG2 is configured), the UE and/or the network may determine a minimum DFI time delay based on CG2 (e.g., the minimum DFI time delay may be determined to be the minimum DFI time delay_2). For HARQ process number/ID {9} (with which CG3 is configured), the UE and/or the network may determine a minimum DFI time delay based on CG3 (e.g., the minimum DFI time delay may be determined to be minimum DFI time delay_3).

Figure 10:
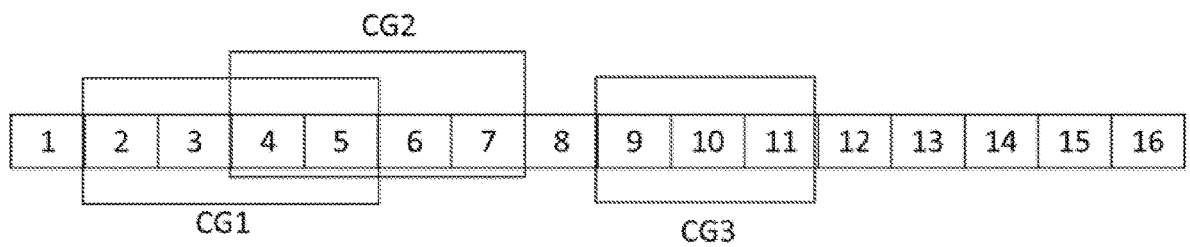
FIG. 10 is a diagram illustrating an exemplary configuration of configured grants and/or HARQ processes associated with the configured grants according to one exemplary embodiment.

In some examples, for a shared HARQ process number/ID for a first configured grant and a second configured grant, the network may not configure a configured grant (e.g., one configured grant), among the first configured grant and the second configured grant, with a minimum DFI time delay. In some examples, the network and/or the UE may determine a minimum DFI time delay for a configured grant that is not explicitly configured based on a configured grant that is explicitly configured. In an example shown in FIG. 10, CG1 and CG2 have shared HARQ process numbers/IDs {4, 5}. The network configures the UE with CG1 with a minimum DFI time delay for CG1 (e.g., minimum DFI time delay_1). The network configures the UE with CG2 without configuring and/or setting (e.g., without explicitly configuring and/or setting) a minimum DFI time delay for CG2. The network and/or the UE determines a minimum DFI time delay for CG2 based on the minimum DFI time delay_1.

In some examples, a network operates with shared spectrum channel access on a carrier and/or a cell. Alternatively and/or additionally, the network may perform communication in an unlicensed carrier and/or cell (e.g., the carrier and/or the cell on which the network operates with shared spectrum channel access may be an unlicensed carrier and/or cell). The network performing communication in the unlicensed carrier and/or cell means and/or implies that the network cannot (and/or is not able to) always control the unlicensed carrier and/or cell as a licensed carrier and/or cell. The network configures a UE with a plurality of configured grants for one or more uplink transmissions on the carrier and/or the cell. The plurality of configured grants comprises a first configured grant and a second configured grant (and/or one or more other configured grants in addition to the first configured grant and the second configured grant). The network may configure the UE with a parameter (e.g., one parameter) for configuring and/or setting a minimum DFI time delay for each configured grant of the plurality of configured grants (e.g., for each configured grant of the plurality of configured grants, the network may configure the UE with a parameter, such as one parameter, for configuring and/or setting a minimum DFI time delay for the configured grant). Alternatively and/or additionally, the network may configure the UE with a set of HARQ process numbers/IDs (e.g., one set of HARQ process numbers/IDs) for each configured grant of the plurality of configured grants, wherein the set of HARQ process numbers/IDs comprises one or more HARQ process numbers/IDs (e.g., for each configured grant of the plurality of configured grants, the network may configure the UE with a set of HARQ process numbers/IDs, such as one set of HARQ process numbers/IDs). The network configures the UE with parameters (for configuring and/or setting a minimum DFI time delay) for the first configured grant and the second configured grant (e.g., the parameters may comprise a first parameter for configuring and/or setting a minimum DFI time delay for the first configured grant and/or a second parameter for configuring and/or setting a minimum DFI time delay for the second configured grant). If a HARQ process number/ID (e.g., any HARQ process number/ID) is shared by the first configured grant and the second configured grant, the network configures the parameters to have the same value for the first configured grant and the second configured grant. In some examples, the network is not allowed (and/or is not configured) to configure (and/or is prevented from configuring and/or prohibited from configuring) the parameters to have different values for the first configured grant and the second configured grant if a HARQ process number/ID (e.g., any HARQ process number/ID) is shared by the first configured grant and the second configured grant.

In some examples, a network operates with shared spectrum channel access on a carrier and/or a cell. Alternatively and/or additionally, the network may perform communication in an unlicensed carrier and/or cell (e.g., the carrier and/or the cell on which the network operates with shared spectrum channel access may be an unlicensed carrier and/or cell). The network performing communication in the unlicensed carrier and/or cell means and/or implies that the network cannot (and/or is not able to) always control the unlicensed carrier and/or cell as a licensed carrier and/or cell. The network configures a UE with a first plurality of configured grants for one or more uplink transmissions on a first BWP on the carrier and/or the cell. The network configures the UE with a second plurality of configured grants for one or more uplink transmissions on a second BWP on the unlicensed carrier and/or cell. The network may configure the UE with a parameter (e.g., one parameter) for configuring and/or setting a minimum DFI time delay for each BWP of a plurality of BWPs comprising the first BWP and the second BWP (e.g., for each BWP of the plurality of BWPs, the network may configure the UE with a parameter, such as one parameter, for configuring and/or setting a minimum DFI time delay for the BWP, such as setting a minimum DFI time delay for configured grants on the BWP). Alternatively and/or additionally, the network may configure the UE with a set of HARQ process numbers/IDs (e.g., one set of HARQ process numbers/IDs) for each configured grant on each BWP of the plurality of BWPs (e.g., each configured grant of a plurality of configured grants comprising the first plurality of configured grants and/or the second plurality of configured grants), wherein the set of HARQ process numbers/IDs comprises one or more HARQ process numbers/IDs (e.g., for each configured grant of the plurality of configured grants, the network may configure the UE with a set of HARQ process numbers/IDs, such as one set of HARQ process numbers/IDs). One or more HARQ process number/IDs are shared among different configured grants on a BWP.

In some examples, a network operates with shared spectrum channel access on a carrier and/or a cell. Alternatively and/or additionally, the network may perform communication in an unlicensed carrier and/or cell (e.g., the carrier and/or the cell on which the network operates with shared spectrum channel access may be an unlicensed carrier and/or cell). The network performing communication in the unlicensed carrier and/or cell means and/or implies that the network cannot (and/or is not able to) always control the unlicensed carrier and/or cell as a licensed carrier and/or cell. The network configures a UE with a plurality of configured grants for one or more uplink transmissions on the carrier and/or the cell. The plurality of configured grants comprises a first configured grant and a second configured grant (and/or one or more other configured grants in addition to the first configured grant and the second configured grant). The network may configure the UE with a set of HARQ process numbers/IDs (e.g., one set of HARQ process numbers/IDs) for each configured grant of the plurality of configured grants, wherein the set of HARQ process numbers/IDs comprises one or more HARQ process numbers/

IDs (e.g., for each configured grant of the plurality of configured grants, the network may configure the UE with a set of HARQ process numbers/IDs, such as one set of HARQ process numbers/IDs). Alternatively and/or additionally, if a HARQ process number/ID (e.g., any HARQ process number/ID) is shared by the first configured grant and the second configured grant, the network may configure a parameter (e.g., one parameter) that is applicable to the first configured grant and the second configured grant. The parameter is used for configuring and/or setting a first minimum DFI time delay for the first configured grant and the second configured grant. In an example, the plurality of configured grants comprises a third configured grant, wherein the third configured grant does not have a shared HARQ process number/ID with the first configured grant and does not have a shared HARQ process number/ID with the second configured grant. The network may configure the UE with a parameter (e.g., one parameter) for configuring and/or setting a second minimum DFI time delay for the third configured grant. The second minimum DFI time delay for the third configured grant may be different from the first minimum DFI time delay for the first configured grant and the second configured grant (since the third configured grant does not have a shared HARQ process number/ID with the first configured grant and does not have a shared HARQ process number/ID with the second configured grant, for example).

In some examples, a UE operates with shared spectrum channel access on a carrier and/or a cell. The UE receives a configuration (e.g., a configuration generated and/or transmitted by a network) for configuring the UE with a plurality of configured grants for one or more uplink transmissions on the carrier and/or the cell (e.g., the configuration may configure the UE with the plurality of configured grants). The plurality of configured grants comprises a first configured grant and a second configured grant (and/or one or more other configured grants in addition to the first configured grant and the second configured grant). In some examples, the configuration configures the UE with a parameter (e.g., one parameter) for configuring and/or setting a minimum DFI time delay for each configured grant of the plurality of configured grants (e.g., for each configured grant of the plurality of configured grants, the configuration may configure the UE with a parameter, such as one parameter, for configuring and/or setting a minimum DFI time delay for the configured grant). Alternatively and/or additionally, the configuration configures the UE with a set of HARQ process numbers/IDs (e.g., one set of HARQ process numbers/IDs) for each configured grant of the plurality of configured grants, wherein the set of HARQ process numbers/IDs comprises one or more HARQ process numbers/IDs (e.g., for each configured grant of the plurality of configured grants, the configuration may configure the UE with a set of HARQ process numbers/IDs, such as one set of HARQ process numbers/IDs). In some examples, if a HARQ process number/ID is shared by the first configured grant and the second configured grant, the UE determines a minimum DFI time delay (for a shared HARQ process number/ID that is shared by the first configured grant and the second configured grant) based on a smallest time delay value, a largest time delay value or an average time delay value of minimum DFI time delays indicated by parameters (of the configuration) of the first configured grant and second configured grant. For a dynamic grant scheduling retransmission of a configured grant transmission (e.g., DCI scrambled by CS-RNTI (Configured Scheduling Radio Network Temporary Identifier (RNTI)), NDI not toggled, same HARQ process, and/or same TB), the UE determines a minimum DFI time delay for the dynamic grant based on a most recent configured grant in time domain and/or a most recently used and/or transmitted configured grant in time domain for a TB. If the second configured grant is a most recently used and/or transmitted configured grant for a TB, a minimum DFI time delay associated with the second configured grant is determined for the UE to validate HARQ information in DFI.

In some examples, a network operates with shared spectrum channel access on a carrier and/or a cell. Alternatively and/or additionally, the network may perform communication in an unlicensed carrier and/or cell (e.g., the carrier and/or the cell on which the network operates with shared spectrum channel access may be an unlicensed carrier and/or cell). The network performing communication in the unlicensed carrier and/or cell means and/or implies that the network cannot (and/or is not able to) always control the unlicensed carrier and/or cell as a licensed carrier and/or cell. The network configures a UE with a plurality of configured grants for one or more uplink transmissions on the carrier and/or the cell. Each configured grant of the plurality of configured grants comprises a parameter (e.g., one parameter) for configuring a minimum DFI time delay. The network may not be allowed (and/or may not be configured) to configure parameters (e.g., parameters for configuring minimum DFI time delays) with different values (e.g., different minimum DFI time delays) for configured grants of a set of configured grants (e.g., a set of configured grants of the plurality of configured grants, wherein a HARQ process number/ID is shared by configured grants of the set of configured grants).

In some examples, a UE operates with shared spectrum channel access on a carrier and/or a cell. The UE is configured, by a network, with a plurality of configured grants for one or more uplink transmissions on the carrier and/or the cell. Each configured grant of the plurality of configured grants comprises a parameter (e.g., one parameter) for configuring a minimum DFI time delay. The UE does not expect to be configured with parameters (e.g., parameters for configuring minimum DFI time delays) with different values (e.g., different minimum DFI time delays) for configured grants of a set of configured grants (e.g., a set of configured grants of the plurality of configured grants, wherein a HARQ process number/ID is shared by configured grants of the set of configured grants).

In some examples, a network operates with shared spectrum channel access on a carrier and/or a cell. Alternatively and/or additionally, the network may perform communication in an unlicensed carrier and/or cell (e.g., the carrier and/or the cell on which the network operates with shared spectrum channel access may be an unlicensed carrier and/or cell). The network performing communication in the unlicensed carrier and/or cell means and/or implies that the network cannot (and/or is not able to) always control the unlicensed carrier and/or cell as a licensed carrier and/or cell. The network configures a UE with a plurality of configured grants for one or more uplink transmissions on the carrier and/or the cell. The plurality of configured grants comprises a first configured grant and a second configured grant with at least one shared HARQ process number/ID (e.g., a HARQ process number/ID that is shared by the first configured grant and the second configured grant). The first configured grant is configured using and/or is associated with a parameter for setting a minimum DFI time delay for the first configured grant (and/or the second configured grant). The second configured grant is not configured using and/or is not associated with a parameter for setting a minimum DFI time delay for the second configured grant. For example, a minimum DFI time delay for the second configured grant may be determined based on the parameter associated with the first configured grant (e.g., the parameter for setting the minimum DFI time delay for the first configured grant).

In some examples, a UE operates with shared spectrum channel access on a carrier and/or a cell. The UE is configured, by a network, with a plurality of configured grants for one or more uplink transmissions on the carrier or the cell. The plurality of configured grants comprises a first configured grant and a second configured grant with at least one shared HARQ process number/ID (e.g., a HARQ process number/ID that is shared by the first configured grant and the second configured grant). The first configured grant is configured using and/or is associated with a parameter for setting a minimum DFI time delay for the first configured grant (and/or the second configured grant). The second configured grant is not configured using and/or is not associated with a parameter for setting a minimum DFI time delay for the second configured grant. For example, a minimum DFI time delay for the second configured grant may be determined based on the parameter associated with the first configured grant (e.g., the parameter for setting the minimum DFI time delay for the first configured grant).

In some examples, the network configures the UE with a same minimum DFI time delay for the first configured grant and the second configured grant without setting a parameter (e.g., one parameter) associated with the second configured grant. In some examples, there is no parameter for setting the minimum DFI time delay for the second configured grant. In some examples, the UE determines a minimum DFI time delay for the second configured grant based on the parameter associated with the first configured grant. In some examples, the minimum DFI time delay for the second configured grant is the same as the minimum DFI time delay for the first configured grant.

In some examples, the network configures the UE with one or more HARQ process numbers/IDs for the plurality of configured grants. Alternatively and/or additionally, the UE is configured by the network with the one or more HARQ process numbers/IDs for the plurality of configured grants. In some examples, the one or more HARQ process numbers/IDs are common for the plurality of configured grants. For each configured grant of the plurality of configured grants, the network configures the UE with a set of HARQ process numbers/IDs (e.g., one set of HARQ process numbers/IDs); and/or the UE is configured by the network with a set of HARQ process numbers/IDs (e.g., one set of HARQ process numbers/IDs) for each configured grant of the plurality of configured grants. A set of configured grants may comprise any two configured grants (and/or more than two configured grants) among the plurality of configured grants. Configured grants of the set of configured grants are associated with at least one same HARQ process number/ID (e.g., each set of HARQ process numbers/IDs associated with the configured grants of the set of configured grants may comprise at least one same HARQ process number/ID). The plurality of configured grants comprises a first configured grant and a second configured grant. The first configured grant is associated with a first set of HARQ process numbers, and/or the second configured grant is associated with a second set of HARQ process numbers/IDs. In an example, the set of configured grants comprises the first configured grant and the second configured grant if both the first set of HARQ process numbers/IDs and the second set of HARQ process numbers/IDs comprise at least one same HARQ process number/ID. The set of configured grants is among and/or included in the plurality of configured grants. For a third configured grant (of the plurality of configured grants, for example) which is not included in the set of configured grants, the network may (and/or may be allowed to) configure a parameter (e.g., a parameter for setting a minimum DFI time delay of the third configured grant) to have a value different than a minimum DFI time delay of the first configured grant and the second configured grant. A third set of HARQ process numbers/IDs associated with the third configured grant may not comprise a HARQ process number/ID (e.g., any HARQ process number/ID) of the first set of HARQ process numbers/IDs and may not comprise a HARQ process number/ID (e.g., any HARQ process number/ID) of the second set of HARQ process numbers/IDs (e.g., no HARQ process number/ID in the third set of HARQ process numbers/IDs overlaps with any HARQ process number/ID associated with the set of configured grant). For a different set of configured grants (e.g., the different set of configured grants may comprise configured grants, of the plurality of configured grants, other than the set of configured grants), the network configures the UE such that parameters for configured grants of the set of configured grants are the same (e.g., the parameters for the configured grants of the set of configured grants indicate the same minimum DFI time delay) and parameters for any two (or more than two) configured grants of the different set of configured grants are the same or different (e.g., the parameters for the configured grants of the different set of configured grants indicate the same minimum DFI time delay or different minimum DFI time delays).

The network transmits one or more signals for configuring the plurality of configured grants and/or the UE receives the one or more signals for configuring the plurality of configured grants. The network receives a first uplink transmission on a first resource and/or the network receives a second uplink transmission on a second resource. Alternatively and/or additionally, the UE transmits the first uplink transmission on the first resource and/or the UE transmits the second uplink transmission on the second resource. The first uplink transmission and/or the second uplink transmission are transmitted by (and/or received from) the same UE. In some examples, the first uplink transmission and/or the second uplink transmission deliver and/or carry the same TB. The first uplink transmission and the second uplink transmission are with a same HARQ process number/ID. In some examples, the first uplink transmission is earlier than the second uplink transmission in time domain. Alternatively and/or additionally, the first uplink transmission may be an initial transmission of the TB and the second uplink transmission may be a retransmission of the TB. The network may transmit a first PDCCH in a first slot and/or a second PDCCH in a second slot. Alternatively and/or additionally, the UE may receive the first PDCCH in the first slot and/or the second PDCCH in the second slot. The first slot and/or the first PDCCH is after and/or later than the first uplink transmission in time domain and/or the second slot and/or the second PDCCH is after and/or later than the second uplink transmission in time domain. The first PDCCH comprises and/or indicates a first DFI and/or the second PDCCH comprises and/or indicates a second DFI. The first uplink transmission and/or the first resource is associated with and/or is determined based on the first configured grant. The second uplink transmission and/or the second resource is associated with and/or is determined based on the second configured grant. Alternatively and/or additionally, the second uplink transmission and/or the second resource may be associated with and/or may be determined based on (and/or may be scheduled by) a second dynamic grant (e.g., a dynamic scheduling grant). The first DFI and/or the second DFI may comprise and/or provide one or more bits indicative of no HARQ information or indicative of one or more HARQ information. A number of bits of the one or more bits may be 16 bits. Alternatively and/or additionally, the number of bits of the one or more bits may be equal to an amount of (and/or a number of) HARQ process numbers/IDs for the carrier and/or for the cell. Alternatively and/or additionally, the number of bits of the one or more bits may be equal to an amount of (e.g., a number of) HARQ process numbers/IDs that may be used for uplink transmission associated with a configured grant on the carrier and/or on the cell.

In some examples, the network determines whether or not the first DFI comprises and/or provides HARQ information in response to the first uplink transmission based on a first interval (e.g., an interval, such as a time length and/or a distance, between the first DFI and the first resource), and based on a first minimum DFI time delay, wherein the first minimum DFI time delay is associated with a parameter (for setting the first minimum DFI time delay, for example) and/or is associated with the first configured grant and/or the second configured grant. In some examples, the network determines whether or not the second DFI comprises and/or provides HARQ information in response to the second uplink transmission based on a second interval (e.g., an interval, such as a time length and/or a distance, between the second DFI and the second resource), and based on a second minimum DFI time delay, wherein the second minimum DFI time delay is associated with a parameter (for setting the second minimum DFI time delay, for example) and/or is associated with the first configured grant and/or the second configured grant. In an example, the second minimum DFI time delay is the same as the first minimum DFI time delay if the first configured grant and the second configured grant are included in the set of configured grants and/or if the first configured grant and the second configured grant share a same HARQ process number/ID.

In some examples, the UE determines whether or not the first DFI comprises and/or provides HARQ information in response to the first uplink transmission based on the first interval and the first minimum DFI time delay. In some examples, the UE determines whether or not the second DFI comprises and/or provides HARQ information in response to the second uplink transmission based on the second interval and the second minimum DFI time delay.

In some examples, the UE determines whether or not the first DFI comprises and/or provides a valid HARQ information in response to the first uplink transmission based on the first interval and the first minimum DFI time delay. In some examples, the UE determines whether or not the second DFI comprises and/or provides a valid HARQ information in response to the second uplink transmission based on the second interval and the second minimum DFI time delay.

In some examples, the first interval is between an initial symbol of the first PDCCH (e.g., a beginning symbol boundary of the initial symbol of the first PDCCH) and a last symbol (e.g., ending symbol) of the first resource (e.g., an ending symbol boundary of the last symbol of the first resource).

In some examples, the second interval is between an initial symbol of the second PDCCH (e.g., a beginning symbol boundary of the initial symbol of the second PDCCH) and a last symbol (e.g., ending symbol) of the second resource (e.g., an ending symbol boundary of the last symbol of the second resource).

In some examples, if the first interval is smaller than the first minimum DFI time delay, the first DFI is not indicative of HARQ information in response to the first uplink transmission and/or the first resource.

In some examples, if the second interval is smaller than the second minimum DFI time delay, the second DFI is not indicative of HARQ information in response to the second uplink transmission and/or the second resource.

In some examples, if the first interval is larger than or equal to the first minimum DFI time delay, the first DFI is indicative of HARQ information in response to the first uplink transmission and/or the first resource (and/or the first DFI is indicative of other information in addition to the HARQ information).

In some examples, if the second interval is larger than or equal to the second minimum DFI time delay, the second DFI is indicative of HARQ information in response to the second uplink transmission and/or the second resource (and/or the second DFI is indicative of other information in addition to the HARQ information).

In some examples, the network configures one or more parameters to have a same value (e.g., a same time delay value such as a same minimum DFI time delay) for each configured grant of the set of configured grants (e.g., the network may configure the one or more parameters to have the same value to avoid ambiguity for validating DFI of a value of a time interval between different values for different configured grants).

In some examples, the network is allowed to (e.g., the network is only allowed to) perform transmission and/or access part of the carrier or the whole carrier for an occupancy time once and/or after the network performs channel access successfully on a LBT bandwidth on the carrier (e.g., the network is allowed to perform transmission and/or access part of the carrier or the whole carrier during the occupancy time, wherein the occupancy time starts once and/or after the network performs channel access successfully on a LBT bandwidth on the carrier).

In some examples, the UE is allowed to (e.g., the UE is only allowed to) perform transmission and/or access part of the carrier or the whole carrier for an occupancy time once and/or after the UE performs channel access successfully on a LBT bandwidth on the carrier and/or the UE is indicated by the network with a shared occupancy time (e.g., the UE receives an indication of the shared occupancy time from the network).

In some examples, a network operates with shared spectrum channel access on a carrier and/or a cell. Alternatively and/or additionally, the network may perform communication in an unlicensed carrier and/or cell (e.g., the carrier and/or the cell on which the network operates with shared spectrum channel access may be an unlicensed carrier and/or cell). The network performing communication in the unlicensed carrier and/or cell means and/or implies that the network cannot (and/or is not able to) always control the unlicensed carrier and/or cell as a licensed carrier and/or cell. The network configures a UE with a plurality of configured grants for one or more uplink transmissions on the carrier and/or the cell. The network configures the UE with a parameter (e.g., one parameter) applicable to a type of uplink transmission (e.g., a specific type and/or specific kind of uplink transmission) on the carrier and/or the cell. For example, the parameter may be applicable to one or more uplink transmissions, on the carrier and/or the cell, corresponding to the type of uplink transmission. The parameter may be used for configuring a minimum DFI time delay.

In some examples, a UE operates with shared spectrum channel access on a carrier and/or the cell. The UE is configured, by a network, with a plurality of configured grants for one or more uplink transmissions on the carrier and/or the cell. The UE is configured, by the network, with a parameter (e.g., one parameter) applicable to a type of uplink transmission on the carrier. For example, the parameter may be applicable to one or more uplink transmissions, on the carrier, corresponding to the type of uplink transmission. The parameter may be used for configuring a minimum DFI time delay.

In some examples, the network configures the UE with one or more HARQ process numbers/IDs for the plurality of configured grants. Alternatively and/or additionally, the UE is configured by the network with the one or more HARQ process numbers/IDs for the plurality of configured grants. In some examples, the one or more uplink transmissions corresponding to the type of uplink transmission may be and/or may comprise one or more uplink transmissions scheduled by one or more uplink grants (e.g., any type of uplink grant, dynamic grant and/or configured grant). Alternatively and/or additionally, the one or more uplink transmissions corresponding to the type of uplink transmission may be and/or may comprise one or more uplink transmissions scheduled by one or more configured grants among the plurality of configured grants. Alternatively and/or additionally, the one or more uplink transmissions corresponding to the type of uplink transmission may be and/or may comprise one or more uplink transmissions with a HARQ process number, wherein the HARQ process number/ID is included in the one or more HARQ process numbers/IDs for the plurality of configured grants. In some examples, regardless of one or more uplink transmission on the carrier scheduled by dynamic grant or configured grant, the parameter is applicable to the type of uplink transmission (e.g., the parameter may be applicable to one or more uplink transmissions, on the carrier, corresponding to the type of uplink transmission). In some examples, the parameter is applicable to (e.g., only applicable to) one or more uplink transmissions, corresponding to the type of uplink transmission, associated with one, some and/or all configured grants of the plurality of configured grants. In some examples, the one or more HARQ process numbers/IDs are common for the plurality of configured grants.

The network transmits one or more signals for configuring the plurality of configured grants and/or the UE receives the one or more signals for configuring the plurality of configured grants. The network receives a first uplink transmission on a first resource and/or the network receives a second uplink transmission on a second resource. Alternatively and/or additionally, the UE transmits the first uplink transmission on the first resource and/or the UE transmits the second uplink transmission on the second resource. The first uplink transmission and/or the second uplink transmission are transmitted by (and/or received from) the same UE. In some examples, the first uplink transmission and/or the second uplink transmission deliver and/or carry the same TB. The first uplink transmission and the second uplink transmission are with a same HARQ process number/ID. In some examples, the first uplink transmission is earlier than the second uplink transmission in time domain. Alternatively and/or additionally, the first uplink transmission may be an initial transmission of the TB and the second uplink transmission may be a retransmission of the TB. The network may transmit a first PDCCH in a first slot and/or a second PDCCH in a second slot. Alternatively and/or additionally, the UE may receive the first PDCCH in the first slot and/or the second PDCCH in the second slot. The first slot and/or the first PDCCH is after and/or later than the first uplink transmission in time domain and/or the second slot and/or the second PDCCH is after and/or later than the second uplink transmission in time domain. The first PDCCH comprises and/or indicates a first DFI and/or the second PDCCH comprises and/or indicates a second DFI. The first uplink transmission and/or the first resource is associated with and/or is determined based on a first configured grant. The second uplink transmission and/or the second resource is associated with and/or is determined based on a second configured grant. Alternatively and/or additionally, the second uplink transmission and/or the second resource may be associated with and/or may be determined based on (and/or may be scheduled by) a second dynamic grant (e.g., a dynamic scheduling grant). The first uplink transmission and/or the second uplink transmission may correspond to the type of uplink transmission (e.g., one or more uplink transmissions corresponding to the type of uplink transmission may comprise the first uplink transmission and/or the second uplink transmission). For example, the parameter may be applicable to the first uplink transmission and/or the second uplink transmission. The first DFI and/or the second DFI may comprise and/or provide one or more bits indicative of no HARQ information or indicative of one or more HARQ information. A number of bits of the one or more bits may be 16 bits. Alternatively and/or additionally, the number of bits of the one or more bits may be equal to an amount of (and/or a number of) HARQ process numbers/IDs for the carrier and/or for the cell. Alternatively and/or additionally, the number of bits of the one or more bits may be equal to an amount of (and/or a number of) HARQ process numbers/IDs that may be used for uplink transmission associated with a configured grant on the carrier and/or on the cell.

In some examples, the network determines whether or not the first DFI comprises and/or provides HARQ information in response to the first uplink transmission based on a first interval (e.g., an interval, such as a time length and/or a distance, between the first DFI and the first resource), and based on a minimum DFI time delay associated with the parameter (applicable to the one or more uplink transmissions corresponding to the type of uplink transmission). In some examples, the network determines whether or not the second DFI comprises and/or provides HARQ information in response to the second uplink transmission based on a second interval (e.g., an interval, such as a time length and/or a distance, between the second DFI and the second resource), and based on the minimum DFI time delay associated with the parameter.

In some examples, the UE determines whether or not the first DFI comprises and/or provides HARQ information in response to the first uplink transmission based on the first interval and the minimum DFI time delay associated with the parameter. In some examples, the UE determines whether or not the second DFI comprises and/or provides HARQ information in response to the second uplink transmission based on the second interval and the minimum DFI time delay associated with the parameter.

In some examples, the UE determines whether or not the first DFI comprises and/or provides a valid HARQ information in response to the first uplink transmission based on the first interval and the minimum DFI time delay associated with the parameter. In some examples, the UE determines whether or not the second DFI comprises and/or provides a valid HARQ information in response to the second uplink transmission based on the second interval and the minimum DFI time delay associated with the parameter.

In some examples, the first interval is between an initial symbol of the first PDCCH (e.g., a beginning symbol boundary of the initial symbol of the first PDCCH) and a last symbol (e.g., ending symbol) of the first resource (e.g., an ending symbol boundary of the last symbol of the first resource).

In some examples, the second interval is between an initial symbol of the second PDCCH (e.g., a beginning symbol boundary of the initial symbol of the second PDCCH) and a last symbol (e.g., ending symbol) of the second resource (e.g., an ending symbol boundary of the last symbol of the second resource).

In some examples, if the first interval is smaller than the minimum DFI time delay associated with the parameter, the first DFI is not indicative of HARQ information in response to the first uplink transmission and/or the first resource.

In some examples, if the second interval is smaller than the minimum DFI time delay associated with the parameter, the second DFI is not indicative of HARQ information in response to the second uplink transmission and/or the second resource.

In some examples, if the first interval is larger than or equal to the minimum DFI time delay associated with the parameter, the first DFI is indicative of HARQ information in response to the first uplink transmission and/or the first resource (and/or the first DFI is indicative of other information in addition to the HARQ information).

In some examples, if the second interval is larger than or equal to the minimum DFI time delay associated with the parameter, the second DFI is indicative of HARQ information in response to the second uplink transmission and/or the second resource (and/or the second DFI is indicative of other information in addition to the HARQ information).

In some examples, the network may not be allowed (and/or may not be configured) to configure more than one parameter for the plurality of configured grants and/or for each configured grant among the plurality of configured grants (such as to avoid ambiguity for validating DFI with different values for different configured grants).

In some examples, the UE may not expect to be configured with more than one parameter for the plurality of configured grants and/or for each configured grant among the plurality of configured grants (such as to avoid ambiguity for validating DFI with different values for different configured grants).

In some examples, the network is allowed to (e.g., the network is only allowed to) perform transmission and/or access part of the carrier or the whole carrier for an occupancy time once and/or after the network performs channel access successfully on a LBT bandwidth on the carrier (e.g., the network is allowed to perform transmission and/or access part of the carrier or the whole carrier during the occupancy time, wherein the occupancy time starts once and/or after the network performs channel access successfully on a LBT bandwidth on the carrier).

In some examples, the UE is allowed to (e.g., the UE is only allowed to) perform transmission and/or access part of the carrier or the whole carrier for an occupancy time once and/or after the UE performs channel access successfully on a LBT bandwidth on the carrier and the UE is indicated by the network with a shared occupancy time (e.g., the UE receives an indication of the shared occupancy time from the network).

In some examples, a network operates with shared spectrum channel access on a carrier and/or a cell. Alternatively and/or additionally, the network may perform communication in an unlicensed carrier and/or cell (e.g., the carrier and/or the cell on which the network operates with shared spectrum channel access may be an unlicensed carrier and/or cell). The network performing communication in the unlicensed carrier and/or cell means and/or implies that the network cannot (and/or is not able to) always control the unlicensed carrier and/or cell as a licensed carrier and/or cell. The network configures a UE with a plurality of configured grants for one or more uplink transmissions on the carrier and/or the cell. In some examples, each configured grant of the plurality of configured grants is configured and/or associated with a parameter for setting a minimum DFI time delay for the configured grant. The network configures a UE with a second configured grant for one or more uplink transmissions on the carrier. At least one HARQ process number/ID for the second configured grant is shared with one or more first configured grants in the plurality of configured grants (e.g., the at least one HARQ process number/ID may be the same as at least one HARQ process number/ID for each configured grant of the one or more first configured grants). The second configured grant is not configured with and/or is not associated with (and/or is without) a parameter for setting a minimum DFI time delay for the second configured grant. In some examples, the minimum DFI time delay for the second configured grant is determined to be a smallest value of one or more minimum DFI time delays for the one or more first configured grants or a largest value of the one or more minimum DFI time delays (and/or the minimum DFI time delay for the second configured grant is determined to be the same value as the one or more minimum DFI time delays). Alternatively and/or additionally, the minimum DFI time delay for the second configured grant is determined to be a smallest value of one or more minimum DFI time delays for the plurality of configured grants or a largest value of the one or more minimum DFI time delays (and/or the minimum DFI time delay for the second configured grant is determined to be the same value as the one or more minimum DFI time delays).

In some examples, a UE operates with shared spectrum channel access on a carrier and/or a cell. The UE is configured, by a network, with a plurality of configured grants for one or more uplink transmissions on the carrier. In some examples, each configured grant of the plurality of configured grants is configured and/or associated with a parameter for setting a minimum DFI time delay for the configured grant. The UE is configured, by the network, with a second configured grant for one or more uplink transmissions on the carrier. At least one HARQ process number/ID for the second configured grant is shared with one or more first configured grants in the plurality of configured grants (e.g., the at least one HARQ process number/ID may be the same as at least one HARQ process number/ID for each configured grant of the one or more first configured grants). The second configured grant is not configured with and/or is not associated with (and/or is without) a parameter for setting a minimum DFI time delay for the second configured grant. In some examples, the UE determines the minimum DFI time delay for the second configured grant based on a smallest value of one or more minimum DFI time delays for the one or more first configured grants or a largest value of the one or more minimum DFI time delays (and/or the UE may determine the minimum DFI time delay for the second configured grant based on a minimum DFI time delay for the one or more first configured grants). Alternatively and/or additionally, the UE may determine the minimum DFI time delay for the second configured grant based on a smallest value of one or more minimum DFI time delays for the plurality of configured grants or a largest value of the one or more minimum DFI time delays (and/or the UE may determine the minimum DFI time delay for the second configured grant based on a minimum DFI time delay for the plurality of configured grants).

In an example, the UE is configured with CG1~CG4 in a BWP on an unlicensed carrier, wherein CG1, CG2 and CG3 are configured with one or more parameters, and the one or more parameters are indicative of minimum DFI time delay_1 associated with CG1, minimum DFI time delay_2 associated with CG2, minimum DFI time delay_3 associated with CG3. For example, CG1 is configured with a first parameter indicative of minimum DFI time delay_1, CG2 is configured with a second parameter indicative of minimum DFI time delay_2 and CG3 is configured with a third parameter indicative of minimum DFI time delay_3. In some examples, there is no parameter (associated with CG4) for configuring and/or setting minimum DFI time delay for CG4. In some examples, the minimum DFI time delay for CG4 is determined based on a smallest value or a largest value of minimum DFI time delay_1, minimum DFI time delay_2 and minimum DFI time delay_3. In some examples, CG1~CG4 comprises all CGs for the UE in the BWP. Alternatively and/or additionally, in a scenario in which each configured grant of CG1 and CG2 has at least one shared HARQ process number/ID with CG4, the minimum DFI time delay for CG4 is determined based on a smallest value or a largest value of minimum DFI time delay_1 and minimum DFI time delay_2. In an example, CG1 is configured with HARQ process numbers/IDs {1,2,3}, CG2 is configured with HARQ process numbers/IDs {4,5,6}, CG3 is configured with HARQ process numbers/IDs {7,8,9}, and CG4 is configured with HARQ process numbers/IDs {2,3, 4}. In some examples, a value of minimum DIF time delay_1 and a value of the minimum DFI time delay_2 may be the same (since CG1 and CG4 are with shared HARQ process numbers/IDs {2, 3} and CG2 and CG4 are with shared HARQ process number/ID {4}).

In some examples, the network configures the UE with a same minimum DFI time delay for the one or more first configured grants. In some examples, the network configures the UE with one or more HARQ process numbers/IDs for the plurality of configured grants and/or the second configured grant. Alternatively and/or additionally, the UE is configured by the network with the one or more HARQ process numbers/IDs for the plurality of configured grants and/or the second configured grant. In some examples, the one or more HARQ process numbers/IDs are common for the plurality of configured grants and/or the second configured grant. For each configured grant of the plurality of configured grants, the network configures the UE with a set of HARQ process numbers/IDs (e.g., one set of HARQ process numbers/IDs); and/or the UE is configured by the network with a set of HARQ process numbers/IDs (e.g., one set of HARQ process numbers/IDs) for each configured grant of the plurality of configured grants. The one or more first configured grants are associated with one or more first sets of HARQ process numbers, and/or the second configured grant is associated with a second set of HARQ process numbers/IDs.

The network transmits one or more signals for configuring the plurality of configured grants and/or the second configured grant. Alternatively and/or additionally, the UE receives the one or more signals for configuring the plurality of configured grants and/or the second configured grant. The network receives a first uplink transmission on a first resource and/or the network receives a second uplink transmission on a second resource. Alternatively and/or additionally, the UE transmits the first uplink transmission on the first resource and/or the UE transmits the second uplink transmission on the second resource. The first uplink transmission and/or the second uplink transmission are transmitted by (and/or received from) the same UE. In some examples, the first uplink transmission and/or the second uplink transmission deliver and/or carry the same TB. The first uplink transmission and the second uplink transmission are with a same HARQ process number/ID. In some examples, the first uplink transmission is earlier than the second uplink transmission in time domain. Alternatively and/or additionally, the first uplink transmission may be an initial transmission of the TB and the second uplink transmission may be a retransmission of the TB. The network may transmit a first PDCCH in a first slot and/or a second PDCCH in a second slot. Alternatively and/or additionally, the UE may receive the first PDCCH in the first slot and/or the second PDCCH in the second slot. The first slot and/or the first PDCCH is after and/or later than the first uplink transmission in time domain and/or the second slot and/or the second PDCCH is after and/or later than the second uplink transmission in time domain. The first PDCCH comprises and/or indicates a first DFI and/or the second PDCCH comprises and/or indicates a second DFI. The first uplink transmission and/or the first resource is associated with and/or is determined based on a first configured grant (of the one or more first configured grants, for example). The second uplink transmission and/or the second resource is associated with and/or is determined based on the second configured grant. Alternatively and/or additionally, the second uplink transmission and/or the second resource may be associated with and/or may be determined based on (and/or may be scheduled by) a second dynamic grant (e.g., a dynamic scheduling grant). The first DFI and/or the second DFI may comprise and/or provide one or more bits indicative of no HARQ information or indicative of one or more HARQ information. A number of bits of the one or more bits may be 16 bits. Alternatively and/or additionally, the number of bits of the one or more bits may be equal to an amount of (and/or a number of) HARQ process numbers/IDs for the carrier or for the cell. Alternatively and/or additionally, the number of bits of the one or more bits may be equal to an amount of (and/or a number of) HARQ process numbers/IDs that may be used for uplink transmission associated with a configured grant on the carrier or on the cell.

In some examples, the network determines whether or not the first DFI comprises and/or provides HARQ information in response to the first uplink transmission based on a first interval (e.g., an interval, such as a time length and/or a distance, between the first DFI and the first resource), and based on a minimum DFI time delay associated with the first configured grant. In some examples, the network determines whether or not the second DFI comprises and/or provides HARQ information in response to the second uplink transmission based on a second interval (e.g., an interval, such as a time length and/or a distance, between the second DFI and the second resource), and based on a minimum DFI time delay associated with the first configured grant and/or the second configured grant.

In some examples, the UE determines whether or not the first DFI comprises and/or provides HARQ information in response to the first uplink transmission based on the first interval and a minimum DFI time delay associated with the first configured grant. In some examples, the UE determines whether or not the second DFI comprises and/or provides HARQ information in response to the second uplink transmission based on the second interval and a minimum DFI time delay associated with the first configured grant and/or the second configured grant.

In some examples, the UE determines whether or not the first DFI comprises and/or provides a valid HARQ information in response to the first uplink transmission based on the first interval and a minimum DFI time delay associated with the first configured grant. In some examples, the UE determines whether or not the second DFI comprises and/or provides a valid HARQ information in response to the second uplink transmission based on the second interval and a minimum DFI time delay associated with the first configured grant and/or the second configured grant.

In some examples, the first interval is between an initial symbol of the first PDCCH (e.g., a beginning symbol boundary of the initial symbol of the first PDCCH) and a last symbol (e.g., ending symbol) of the first resource (e.g., an ending symbol boundary of the last symbol of the first resource).

In some examples, the second interval is between an initial symbol of the second PDCCH (e.g., a beginning symbol boundary of the initial symbol of the second PDCCH) and a last symbol (e.g., ending symbol) of the second resource (e.g., an ending symbol boundary of the last symbol of the second resource).

In some examples, if the first interval is smaller than a minimum DFI time delay associated with the first configured grant, the first DFI is not indicative of HARQ information in response to the first uplink transmission and/or the first resource. In some examples, if the first interval is larger than or equal to the minimum DFI time delay associated with the first configured grant, the first DFI is indicative of HARQ information in response to the first uplink transmission and/or the first resource (and/or the first DFI is indicative of other information in addition to the HARQ information).

In some examples, if the second interval is smaller than a minimum DFI time delay associated with the first configured grant and/or the second configured grant, the second DFI is not indicative of HARQ information in response to the second uplink transmission and/or the second resource. In some examples, if the second interval is larger than or equal to the minimum DFI time delay associated with the first configured grant and/or the second configured grant, the second DFI is indicative of HARQ information in response to the second uplink transmission and/or the second resource (and/or the second DFI is indicative of other information in addition to the HARQ information).

In some examples, the network indicates part of an occupancy time to one or more UEs such that the one or more UEs perform uplink transmission during the part of the occupancy time. In some examples, the plurality of configured grants and the second configured grant are configured in a same BWP and/or in a same LBT bandwidth on the carrier. In some examples, the plurality of configured grants comprise configured grants (e.g., all configured grants for the UE, for example) in a same BWP or in a same LBT bandwidth on the carrier.

Second Concept

In the second concept, a UE may select a configured grant configuration from among all configured grant configurations for the UE and/or from among a plurality of configured grant configurations amounting to a number of configured grant configurations. For example, the UE may select the configured grant configuration for determining a validation time (e.g., cg-minDFIDelay-r16). In some examples, the UE (or a second UE) selects a validation time (e.g., cg-minDFIDelay-r16) among one or more validation times associated with all configured grants and/or all configured grant configurations (e.g., all configured grants and/or all configured grant configurations for the UE or the second UE, for example) or a plurality of configured grant configurations amounting to a number of configured grant configurations. The validation time may be used for determining whether or not a HARQ-ACK of one or more uplink transmissions associated with one or more HARQ process numbers/IDs is valid.

In some examples, a UE selects a configured grant configuration from a plurality of configured grant configurations. In an example, the plurality of configured grant configurations may comprise all configured grant configurations for the UE. Alternatively and/or additionally, the plurality of configured grant configurations may comprise configured grant configurations (e.g., some and/or all configured grant configurations for the UE) amounting to a first number of configured grant configurations.

In some examples, the UE selects the configured grant configuration from the plurality of configured grant configurations based on configured grant identities (IDs) associated with the plurality of configured grant configurations. In an example, the UE may select the configured grant configuration based on a determination that, among the plurality of configured grant configurations, the configured grant configuration has a lowest configured grant identity (ID) or a highest configured grant ID.

Alternatively and/or additionally, the UE may select the configured grant configuration from the plurality of configured grant configurations based on validation times (e.g., cg-minDFIDelay-r16) associated with the plurality of configured grant configurations. In an example, the UE may select the configured grant configuration based on a determination that, among the plurality of configured grant configurations, the configured grant configuration has a maximum (e.g., highest) validation time (e.g., cg-minDFIDelay-r16) or a minimum (e.g., lowest) validation time (e.g., cg-minDFIDelay-r16).

Alternatively and/or additionally, the UE may select the configured grant configuration from the plurality of configured grant configurations based on one or more resources provided by one or more configured grant configurations of the plurality of configured grant configurations. In an example the UE may select the configured grant configuration based on a determination that the configured grant configuration provides a resource that is most recently used for transmission of a TB or most recently used for a HARQ process number/ID. Alternatively and/or additionally, the UE may select the configured grant configuration based on a determination that, among one or more resources associated with (e.g., provided by) the plurality of configured grant configurations, the resource associated with the configured grant configuration is a most recently (e.g., latest and/or last) used resource for transmission of a TB and/or a most recently (e.g., latest and/or last) used resource for a HARQ process number/ID. Alternatively and/or additionally, the UE may select the configured grant configuration based on a determination that the resource provided by the configured grant configuration is associated with a most recently (e.g., latest and/or last) used configured grant.

Alternatively and/or additionally, the UE may select the configured grant configuration based on a determination that, among the plurality of configured grant configurations, the configured grant configuration is included in a most recent uplink channel occupancy time (COT) and/or a most recent uplink burst.

In an example shown in FIG. 11, Row 1 of table 1100 corresponds to timing in units of at least one of slots, subframes, symbols, time, etc. In some examples, as shown in Row 6 of table 1100, a UE is configured with CG1 with HARQ processes {1, 2, 3} and CG2 with HARQ processes {2, 3, 4}. In some examples, as shown in Row 6 of table 1100, a minimum DFI time delay_1 for CG1 is configured as "3" (e.g., 3 units, such as at least one of 3 slots, 3 subframes, 3 symbols, etc.) and a minimum DFI time delay_2 for CG2 is configured as "6" (e.g., 6 units, such as at least one of 6 slots, 6 subframes, 6 symbols, etc.). In an example, as shown in Row 2 of table 1100, the UE performs an uplink transmission in timing 1, the uplink transmission is with HARQ processes {1}, and the uplink transmission is on a resource associated with CG1 (the uplink transmission is shown as "UL HarqID=1 on CG1" in Row 2 of table 1100). Timings of table 1100, such as timing 1, timing 2, timing 3, etc., may each correspond to at least one of a slot, a subframe, a symbol, a point in time, a time unit, etc. In some examples, the UE receives a PDCCH comprising a first DFI (e.g., a downlink DFI) in timing 3 (shown as "DL DFI" in Row 2 of table 1100). The UE determines the minimum DFI time delay for HARQ process {1} in the first DFI based on CG1 (e.g., the minimum DFI time delay_1 "3"). According to a most recently used CG (e.g., a last and/or latest used CG), such as CG1, the UE may determine the minimum DFI time delay for HARQ process {1} in the first DFI based on CG1 (e.g., the minimum DFI time delay_1 "3"). In some examples, since an interval between the uplink transmission in timing 1 and the first DFI in timing 3 is 2 (e.g., 2 slots, 2 subframes, 2 symbols, etc.), where the interval of 2 is smaller than the minimum DFI time delay_1 equal to 3 (e.g., 3 slots, 3 subframes, 3 symbols, etc.), the first DFI for HARQ process {1} is invalid (e.g., the first DFI is invalid with respect to indicating HARQ information associated with HARQ process {1}). In an example, the first DFI for HARQ process {1} is invalid (with respect to indicating HARQ information associated with HARQ process {1}, for example) due to the interval, corresponding to 2 slots (or 2 subframes or 2 symbols), being smaller than the minimum DFI time delay_1 corresponding to 3 slots (or 3 subframes or 3 symbols). The UE receives a PDCCH comprising a second DFI in timing 5. The UE determines the second DFI is valid (such as based on an interval between the uplink transmission in timing 1 and the second DFI in timing 5 being equal to 4 which is larger than or equal to the minimum DFI time delay_1 equal to 3).

In an example, as shown in Row 3 of the table 1100, the UE performs an uplink transmission in timing 1, the uplink transmission is with HARQ process {2}, and the uplink transmission is on a resource associated with CG1 (the uplink transmission is shown as "UL HarqID=2 on CG1" in Row 3 of table 1100). In some examples, the UE receives a PDCCH comprising a first DFI (e.g., a downlink DFI) in timing 3 (shown as "DL DFI" in Row 3 of table 1100). According to a most recently used CG (e.g., a last and/or latest used CG), such as CG1, the UE may determine the minimum DFI time delay for HARQ process {2} in the first DFI based on CG1 (e.g., the minimum DFI time delay_1 "3"). In some examples, since an interval between the uplink transmission in timing 1 and the first DFI in timing 3 is 2 (e.g., 2 slots, 2 subframes, 2 symbols, etc.), where the interval of 2 is smaller than the minimum DFI time delay_1 equal to 3 (e.g., 3 slots, 3 subframes, 3 symbols, etc.), the first DFI for HARQ process {2} is invalid. The UE receives a PDCCH comprising a second DFI in timing 5. The UE determines the second DFI is valid (such as based on an interval between the uplink transmission in timing 1 and the second DFI in timing 5 being equal to 4 which is larger than or equal to the minimum DFI time delay_1 equal to 3).

In an example, as shown in Row 4 of the table 1100, the UE performs an uplink transmission in timing 1, the uplink transmission is with HARQ process {2}, and the uplink transmission is on a resource associated with CG2 (the uplink transmission is shown as "UL HarqID=2 on CG2" in Row 4 of table 1100). In some examples, the UE receives a PDCCH comprising a first DFI (e.g., a downlink DFI) in timing 3 (shown as "DL DFI" in Row 4 of table 1100). According to a most recently used CG (e.g., a last and/or latest used CG), such as CG2, the UE may determine the minimum DFI time delay for HARQ process {2} in the first DFI based on CG2 (e.g., the minimum DFI time delay_2 "6"). In some examples, since an interval between the uplink transmission in timing 1 and the first DFI in timing 3 is 2 (e.g., 2 slots, 2 subframes, 2 symbols, etc.), where the interval of 2 is smaller than the minimum DFI time delay_2 equal to 6 (e.g., 6 slots, 6 subframes, 6 symbols, etc.), the first DFI for HARQ process {2} is invalid. The UE receives a PDCCH comprising a second DFI in timing 5. The UE determines the second DFI is valid (such as based on an interval between the uplink transmission in timing 1 and the second DFI in timing 5 being equal to 4 which is larger than or equal to the minimum DFI time delay_2 equal to 6).

In some examples, with respect to one or more of the embodiments herein (such as one or more of the embodiments discussed with respect to the second concept), a plurality of configured grant configurations (amounting to a number of configured grant configurations, for example) is associated with (e.g., comprises and/or configures) active type-2 configured grant and/or associated with type-1 configured grant. Alternatively and/or additionally, the plurality of configured grant configurations may be associated with one or more same HARQ process numbers/IDs (e.g., each configured grant of the plurality of configured grant configurations may be associated with a HARQ process number/ID of the one or more same HARQ process numbers/IDs). Alternatively and/or additionally, the plurality of configured grant configurations may be associated with resources that the UE has transmitted for a TB. In an example shown in FIG. 7, if a UE is configured with CG1~CG6, the plurality of configured grants may comprise CG1 and CG2 (e.g., only CG1 and CG2). In some examples, the plurality of configured grants may comprise CG1 and CG2 since PUSCH resources according to CG1 and CG2 are used for transmitting for a TB associated with HARQ process 3 (HP3), and/or since both CG1 and CG2 are associated with HP3, and/or since CG1 and CG2 (e.g., only CG1 and CG2 of CG1~CG6) are active configuration and/or without activation command.

In some examples, a UE operates with shared spectrum channel access on a carrier and/or a cell. The UE may be configured with a plurality of configured grants for one or more uplink transmissions on the carrier or the cell. Each configured grant of the plurality of configured grants comprises a parameter (e.g., one parameter) for configuring a minimum DFI time delay (where parameters for configuring minimum DFI time delays of configured grants of the plurality of configured grants may have different values indicating different minimum DFI time delays). In an example, the UE transmits a second uplink transmission on a second resource with a HARQ process number, x. The UE receives a second PDCCH comprising a second DFI in a second slot. The UE determines a minimum DFI time delay (for the second DFI and/or for the HARQ process number, x, for example), from among minimum DFI time delays associated with the plurality of configured grants (and/or from among the plurality of configured grants). The UE determines the minimum DFI time delay (for the second DFI and/or for the HARQ process number, x, for example) based on a rule. The UE determines whether or not the second DFI comprises and/or provides HARQ information in response to the second uplink transmission based on an interval (e.g., an interval, such as a time length and/or a distance, between the second DFI and the second resource), and based on the minimum DFI time delay (for the second DFI and/or for the HARQ process number, x, for example). In some examples, application of the rule to determine the minimum DFI time delay is based on a lowest configured grant identity (ID) or a highest configured grant identity (ID) among configured grant IDs of the plurality of the configured grants (e.g., the minimum DFI time delay may be determined and/or selected based on a determination that the minimum DFI time delay is associated with a configured grant of the plurality of configured grants that has the lowest configured grant ID or the highest configured grant ID). In some examples, application of the rule comprises selecting a configured grant with a maximum (e.g., highest) minimum DFI time delay or a minimum (e.g., lowest) minimum DFI time delay among minimum DFI time delays (e.g., cg-minDFIDelay-r16) associated with the plurality of configured grants (wherein the minimum DFI time delay may be determined and/or selected based on a determination that the selected configured grant is associated with the minimum DFI time delay, for example). Alternatively and/or additionally, application of the rule comprises determining and/or selecting the minimum DFI time delay based on a determination that the minimum DFI time delay is a maximum (e.g., highest) minimum DFI time delay or a minimum (e.g., lowest) minimum DFI time delay among minimum DFI time delays (e.g., cg-minDFIDelay-r16) associated with the plurality of configured grants. In some examples, application of the rule comprises selecting a configured grant (of the plurality of configured grants, for example) providing a resource, wherein the resource (provided by the configured grant) is most recently used for transmission of a TB or most recently used for the HARQ process number, x (wherein the minimum DFI time delay may be determined and/or selected based on a determination that the selected configured grant is associated with the minimum DFI time delay, for example). In some examples, application of the rule comprises selecting a configured grant based on a determination that, among one or more resources associated with (e.g., provided by) the plurality of configured grant configurations, a resource associated with (e.g., provided by) the configured grant is a most recently (e.g., latest and/or last) used resource for transmission of a TB and/or a most recently (e.g., latest and/or last) used resource for the HARQ process number, x.

In some examples, the UE is configured by the network with one or more HARQ process numbers/IDs for the plurality of configured grants. In some examples, the one or more HARQ process numbers/IDs are common for the plurality of configured grants. In some examples, the HARQ process number, x is included in the one or more HARQ process numbers/IDs. The UE transmits a first uplink transmission on a first resource and/or transmits a second uplink transmission on a second resource. In some examples, the first uplink transmission and/or the second uplink transmission are transmitted by the same UE. In some examples, the first uplink transmission and/or the second uplink transmission deliver and/or carry a same TB. In some examples, the first uplink transmission and the second uplink transmission are with a same HARQ process number/ID. In some examples, the first uplink transmission is earlier than the second uplink transmission in time domain. Alternatively and/or additionally, the first uplink transmission is an initial transmission of the TB and the second uplink transmission is a retransmission of the TB. The UE may receive a first PDCCH in a first slot. The first slot and/or the first PDCCH are after and/or later than the first uplink transmission in time domain. The UE may receive a second PDCCH in a second slot. The second slot and/or the second PDCCH are after and/or later than the second uplink transmission in time domain. In some examples, the first PDCCH comprises and/or indicates a first DFI. In some examples, the first uplink transmission and/or the first resource are associated with (and/or are determined based on) a first configured grant. In some examples, the second uplink transmission and/or the second resource are associated with (and/or are determined based on) a second configured grant. Alternatively and/or additionally, the second uplink transmission and/or the second resource may be associated with (and/or may be determined based on and/or may be scheduled by) a second dynamic grant (e.g., a dynamic scheduling grant). The first DFI and/or the second DFI may comprise one or more bits indicative of no HARQ information or indicative of one or more HARQ information. The UE determines a minimum DFI time delay (for the first DFI and/or for the HARQ process number, x, for example), from among minimum DFI time delays associated with the plurality of configured grants (and/or from among the plurality of configured grants). The UE determines the minimum DFI time delay (for the first DFI and/or for the HARQ process number, x, for example) based on the rule. In some examples, the UE determines whether or not the first DFI comprises and/or provides HARQ information in response to the first uplink transmission based on a first interval (e.g., an interval, such as a time length and/or a distance, between the first DFI and the first resource), and based on the minimum DFI time delay (for the first DFI and/or for the HARQ process number, x, for example). Alternatively and/or additionally, the UE may determine whether or not the first DFI comprises and/or provides a valid HARQ information in response to the first uplink transmission based on the first interval and the minimum DFI time delay (for the first DFI and/or for the HARQ process number, x, for example). Alternatively and/or additionally, the UE may determine whether or not the second DFI comprises and/or provides a valid HARQ information in response to the second uplink transmission based on a second interval (e.g., an interval, such as a time length and/or a distance, between the second DFI and the second resource), and based on a determined minimum DFI time delay (for the second DFI and/or for the HARQ process number, x, for example), such as the minimum DFI time delay for the first DFI and/or for the HARQ process number, x.

In some examples, if the first interval is smaller than the minimum DFI time delay (for the first DFI and/or for the HARQ process number, x), the first DFI may not be indicative of HARQ information in response to the first uplink transmission and/or the first resource. In some examples, if the second interval is smaller than the determined minimum DFI time delay (for the second DFI and/or for the HARQ process number, x, for example), the second DFI may not be indicative of HARQ information in response to the second uplink transmission and/or the second resource.

Third Concept

In the third concept, a HARQ process number/ID and/or a HARQ process number/ID group is associated with a minimum DFI time delay (e.g., one minimum DFI time delay). In an example, each HARQ process number/ID (of a plurality of HARQ process number/IDs, for example) and/or each HARQ process number/ID group (of a plurality of HARQ process number/ID groups, for example) is associated with a minimum DFI time delay (e.g., one minimum DFI time delay). In some examples, a HARQ process number/ID group (e.g., one HARQ process number/ID group) comprises one or more HARQ process number/IDs. In some examples, a HARQ process number/ID group (e.g., one HARQ process number/ID group) comprises a consecutive HARQ process number/ID group (and/or consecutive HARQ process number/IDs). In some examples, different HARQ process number/ID groups comprise non-overlapped HARQ process number/IDs.

In an example, a HARQ process group 1 (HPG1) comprises HARQ processes {1, 2, 3} and a HARQ process group 2 (HPG2) comprises HARQ processes {4, 5, 6}, and no overlapped HARQ process is expected (e.g., it is not expected that HPG1 and HPG2 comprise the same HARQ process and/or the same HARQ process number/ID). In the example, minimum DFI time delay_1 is configured for HPG1 and minimum DFI time delay_2 is configured for HPG2. If a UE is configured with CG1 with HARQ processes {2, 3, 4} and CG2 with HARQ processes {3, 4, 5}, uplink transmission via CG1 and/or CG2 with HARQ process {3} and/or HARQ process {4} is associated with minimum DFI time delay_1. Alternatively and/or additionally, uplink transmission via CG1 with HARQ process {2} is associated with minimum DFI time delay_1. Alternatively and/or additionally, uplink transmission via CG2 with HARQ process {5} is associated with minimum DFI time delay_2.

In another example, the UE is configured with HARQ processes {1~6} for configured grant uplink transmission (on unlicensed cell, for example). In some examples, each HARQ process of HARQ processes {1~6} is associated with (e.g., configured with) a minimum DFI time delay_i, i=1~6 (e.g., HARQ process {1} may be configured with minimum DFI time delay_1, HARQ process {2} may be configured with minimum DFI time delay_2, etc.). The UE may transmit an uplink transmission via a configured grant (e.g., one configured grant), wherein the uplink transmission is with HARQ process{3}. The minimum DFI time delay_3 may be determined (and/or used) by the UE to determine (and/or validate) whether or not a received DFI and/or PDCCH comprises and/or provides HARQ information in response to the uplink transmission.

In some examples, a network operates with shared spectrum channel access on a carrier and/or a cell. The network configures a UE with a plurality of configured grants for one or more uplink transmissions on the carrier or the cell. The plurality of configured grants comprises a first configured grant and a second configured grant (and/or one or more other configured grants in addition to the first configured grant and the second configured grant).

In some examples, the network configures a parameter (e.g., one parameter) for each HARQ process number/ID (of one or more HARQ process number/IDs of the UE). In some examples, the parameter is used for configuring and/or setting a minimum DFI time delay for each HARQ process number/ID (of the one or more HARQ process number/IDs of the UE, for example). Alternatively and/or additionally, the network may configure one or more parameters for the one or more HARQ process number/IDs of the UE, wherein each parameter of the one or more parameters is used for configuring and/or setting a minimum DFI time delay for a HARQ process number/ID of the one or more HARQ process number/IDs of the UE.

Alternatively and/or additionally, the network may configure a parameter (e.g., one parameter) for each HARQ process number/ID group (of one or more HARQ process number/ID groups of the UE). In some examples, the parameter is used for configuring and/or setting a minimum DFI time delay for each HARQ process number/ID group (of the one or more HARQ process number/ID groups of the UE, for example). Alternatively and/or additionally, the network may configure one or more parameters for the one or more HARQ process number/ID groups of the UE, wherein each parameter of the one or more parameters is used for configuring and/or setting a minimum DFI time delay for a HARQ process number/ID group of the one or more HARQ process number/ID groups of the UE.

In an example, the network receives a second uplink transmission on a second resource with a HARQ process number, x. The network transmits a second PDCCH comprising a second DFI in a second slot. In some examples, the network determines whether or not the second DFI comprises and/or provides HARQ information in response to the second uplink transmission based on an interval (e.g., an interval, such as a time length and/or a distance, between the second DFI and the second resource), and based on a minimum DFI time delay for HARQ process number, x. Alternatively and/or additionally, the network may determine whether or not the second DFI comprises and/or provides HARQ information in response to the second uplink transmission based on an interval (e.g., an interval, such as a time length and/or a distance, between the second DFI and the second resource), and based on a minimum DFI time delay for a HARQ process number/ID group comprising the HARQ process number, x.

A UE operates with shared spectrum channel access on a carrier and/or a cell. The UE is configured with (and/or receives a signal for configuring) a plurality of configured grants for one or more uplink transmissions on the carrier or the cell. The plurality of configured grants comprises a first configured grant and a second configured grant (and/or one or more other configured grants in addition to the first configured grant and the second configured grant).

In some examples, the UE is configured with (and/or receives a signal for configuring) a parameter (e.g., one parameter) for each HARQ process number/ID (of one or more HARQ process number/IDs of the UE), wherein the parameter is used for configuring and/or setting a minimum DFI time delay for each HARQ process number/ID (of the one or more HARQ process number/IDs of the UE, for example). Alternatively and/or additionally, the UE may be configured with (and/or may receive a signal for configuring) one or more parameters for the one or more HARQ process number/IDs of the UE, wherein each parameter of the one or more parameters is used for configuring and/or setting a minimum DFI time delay for a HARQ process number/ID of the one or more HARQ process number/IDs of the UE.

Alternatively and/or additionally, the UE is configured with (and/or receives a signal for configuring) a parameter (e.g., one parameter) for each HARQ process number/ID group (of one or more HARQ process number/ID groups of the UE), wherein the parameter is used for configuring and/or setting a minimum DFI time delay for each HARQ process number/ID group (of the one or more HARQ process number/ID groups of the UE, for example). Alternatively and/or additionally, the UE may be configured with (and/or may receive a signal for configuring) one or more parameters for the one or more HARQ process number/ID groups of the UE, wherein each parameter of the one or more parameters is used for configuring and/or setting a minimum DFI time delay for a HARQ process number/ID group of the one or more HARQ process number/ID groups of the UE.

In an example, the UE transmits a second uplink transmission on a second resource with a HARQ process number, x. The UE receives a second PDCCH comprising a second DFI in a second slot. In some examples, the UE determines whether or not the second DFI comprises and/or provides HARQ information in response to the second uplink transmission based on an interval (e.g., an interval, such as a time length and/or a distance, between the second DFI and the second resource), and based on a minimum DFI time delay for HARQ process number, x. Alternatively and/or additionally, the UE may determine whether or not the second DFI comprises and/or provides HARQ information in response to the second uplink transmission based on an interval (e.g., an interval, such as a time length and/or a distance, between the second DFI and the second resource), and based on a minimum DFI time delay for a HARQ process number/ID group comprising the HARQ process number, x, for example.

In some examples, the HARQ process number/ID group comprises one or more HARQ process number/IDs. In some examples, the one or more HARQ process number/IDs are associated with and/or use a parameter for the HARQ process number/group (e.g., the parameter may be used for configuring and/or setting a minimum DFI time delay for the one or more HARQ process number/IDs of the HARQ process number/ID group). In some examples, the HARQ process number/ID group comprises consecutive HARQ process number/IDs. In some examples, different HARQ process number/ID groups comprise non-overlapped HARQ process numbers/IDs (e.g., a first HARQ process number/ID group may not comprise a same HARQ process number/ID as a second HARQ process number/ID group). For example, a second HARQ process number/ID group, different than the HARQ process number/ID group, may comprise one or more second HARQ process number/IDs that do not overlap with the one or more HARQ process number/IDs.

In some examples, the UE is configured with a first HARQ process number/ID group and/or a second HARQ process number/ID group (e.g., the network may configure the UE with the first HARQ process number/ID group and/or the second HARQ process number/ID group). In some examples, a HARQ process number/ID of the first HARQ process number/ID group (e.g., a HARQ process number/ID belonging to and/or in the first HARQ process number/ID group) does not belong to and/or is not in one or more other HARQ process number/ID groups (of the UE, for example), such as the second HARQ process number/ID group.

In some examples, the UE is configured with a set of HARQ process numbers/IDs (e.g., one set of HARQ process numbers/IDs) for each configured grant of one or more configured grants (e.g., the plurality of configured grants), wherein the set of HARQ process numbers/IDs (e.g., the one set of HARQ process numbers/IDs) comprises one or more HARQ process numbers/IDs. In some examples, the network configures the UE with a set of HARQ process numbers/IDs (e.g., one set of HARQ process numbers/IDs) for each configured grant of one or more configured grants (e.g., the plurality of configured grants), wherein the set of HARQ process numbers/IDs (e.g., the one set of HARQ process numbers/IDs) comprises one or more HARQ process numbers/IDs.

In some examples, the UE is configured with a first set of HARQ process numbers/IDs for the first configured grant, and/or the UE is configured with a second set of HARQ process numbers/IDs for the second configured grant. The first set of HARQ process numbers/IDs comprises the HARQ process number, x, and/or the second set of HARQ process numbers/IDs comprises the HARQ process number, x. In some examples, the UE is configured by the network with one or more HARQ process numbers/IDs for the plurality of configured grants. In some examples, the one or more HARQ process numbers/IDs is common for the plurality of configured grants. In some examples, the HARQ process number, x is included in the one or more HARQ process numbers/IDs. The UE transmits a first uplink transmission on a first resource and/or transmits a second uplink transmission on a second resource. The first uplink transmission and/or the second uplink transmission are transmitted by the UE (e.g., the same UE). In some examples, the first uplink transmission and/or the second uplink transmission deliver and/or carry a TB (e.g., the same TB is delivered and/or carried by the first uplink transmission and the second uplink transmission). In some examples, the first uplink transmission and the second uplink transmission are with a same HARQ process number/ID. The first uplink transmission may be earlier than the second uplink transmission in time domain. Alternatively and/or additionally, the first uplink transmission may be an initial transmission of the TB and the second uplink transmission may be a retransmission of the TB. In some examples, the UE receives a first PDCCH in a first slot. Alternatively and/or additionally, the UE may receive a second PDCCH in a second slot. The first slot and/or the first PDCCH are after and/or later than the first uplink transmission in time domain. The second slot and/or the second PDCCH are after and/or later than the second uplink transmission in time domain.

In some examples, the first PDCCH comprises and/or provides a first DFI. The first uplink transmission and/or the first resource are associated with (and/or are determined based on) a first configured grant. In some examples, the second uplink transmission and/or the second resource are associated with (and/or are determined based on) a second configured grant. Alternatively and/or additionally, the second uplink transmission and/or the second resource are associated with (and/or are determined based on and/or are scheduled by) a second dynamic grant (e.g., a dynamic scheduling grant). The first DFI and/or the second DFI may comprise one or more bits indicative of no HARQ information or indicative of one or more HARQ information. A number of bits of the one or more bits may be 16 bits. Alternatively and/or additionally, the number of bits of the one or more bits may be equal to an amount of (and/or a number of) HARQ process numbers/IDs for the carrier or for the cell. Alternatively and/or additionally, the number of bits of the one or more bits may be equal to an amount of (and/or a number of) HARQ process numbers/IDs that may be used for uplink transmission associated with a configured grant on the carrier or on the cell.

In some examples, the UE determines whether or not the first DFI comprises and/or provides HARQ information in response to the first uplink transmission based on a first interval (e.g., an interval, such as a time length and/or a distance, between the first DFI and the first resource), and based on a minimum DFI time delay for HARQ process number, x. Alternatively and/or additionally, the UE may determine whether or not the first DFI comprises and/or provides HARQ information in response to the first uplink transmission based on the first interval and a minimum DFI time delay for a HARQ process number/ID group comprising the HARQ process number, x, for example. Alternatively and/or additionally, the UE may determine whether or not the first DFI comprises and/or provides HARQ information in response to the first uplink transmission based on the first interval and a minimum DFI time delay for HARQ process number, x. Alternatively and/or additionally, the UE may determine whether or not the first DFI comprises and/or provides a valid HARQ information in response to the first uplink transmission based on the first interval and a minimum DFI time delay for a HARQ process number/ID group comprising the HARQ process number, x, for example. In some examples, the first interval is between an initial symbol of the first PDCCH (e.g., a beginning symbol boundary of the initial symbol of the first PDCCH) and a last symbol (e.g., ending symbol) of the first resource (e.g., an ending symbol boundary of the last symbol of the first resource).

In some examples, the UE determines whether or not the second DFI comprises and/or provides a valid HARQ information in response to the second uplink transmission based on a second interval (e.g., an interval, such as a time length and/or a distance, between the second DFI and the second resource), and based on a minimum DFI time delay for HARQ process number, x. Alternatively and/or additionally, the UE may determine whether or not the second DFI comprises and/or provides a valid HARQ information in response to the second uplink transmission based on the second interval and a minimum DFI time delay for a HARQ process number/ID group comprising the HARQ process number, x, for example. In some examples, the second interval is between an initial symbol of the second PDCCH (e.g., a beginning symbol boundary of the initial symbol of the second PDCCH) and a last symbol (e.g., ending symbol) of the second resource (e.g., an ending symbol boundary of the last symbol of the second resource).

In some examples, if the first interval is smaller than the minimum DFI time delay for the HARQ process number, x, the first DFI is not indicative of HARQ information in response to the first uplink transmission and/or the first resource. In some examples, if the first interval is smaller than the minimum DFI time delay for a HARQ process number/ID group comprising the HARQ process number, x, the first DFI is not indicative of HARQ information in response to the first uplink transmission and/or the first resource.

In some examples, if the second interval is smaller than the minimum DFI time delay for the HARQ process number, x, the second DFI is not indicative of HARQ information in response to the second uplink transmission and/or the second resource. In some examples, if the second interval is smaller than the minimum DFI time delay for a HARQ process number/ID group comprising the HARQ process number, x, the second DFI is not indicative of HARQ information in response to the second uplink transmission and/or the second resource.

Fourth Concept

In the fourth concept, a network may operate with shared spectrum channel access on a carrier and/or a cell. The network configures a UE with a plurality of configured grants for one or more uplink transmissions on the carrier or the cell. In some examples, the network configures the UE with a parameter (e.g., one parameter), such as dg-minDFI-Delay-r16, for configuring and/or setting a first minimum DFI time delay (for one or more dynamic grant scheduled uplink transmissions). In some examples, the network configures the UE with a parameter (e.g., one parameter), such as cg-minDFI-Delay-r16, for configuring and/or setting a second minimum DFI time delay for one or more configured grant associated uplink transmissions and/or for each configured grant (e.g., the network may configure the UE with a parameter, such as cg-minDFI-Delay-r16, for each configured grant, of the plurality of configured grants, respectively).

In some examples, the network transmits a first dynamic grant to the UE, wherein the first dynamic grant schedules a first uplink transmission with a HARQ process number/ID, x. In some examples, the network receives the first uplink transmission from the UE. In some examples, the network transmits a first PDCCH comprising a first DFI. In some examples, the network determines whether or not the first DFI comprises and/or provides a valid HARQ information for the HARQ process number/ID, x in response to the first uplink transmission based on an interval (e.g., an interval, such as a time length and/or a distance, between the first DFI and the first resource), and based on a first minimum DFI time delay (e.g., a minimum DFI time delay for one or more dynamic grant scheduled uplink transmissions).

In some examples, the network receives a first uplink transmission with a HARQ process number/ID, x from the UE. In some examples, the network transmits a first PDCCH comprising a first DFI. In some examples, the network determines whether or not the first DFI comprises and/or provides a valid HARQ information for the HARQ process number/ID, x in response to the first uplink transmission based on an interval (e.g., an interval, such as a time length and/or a distance, between the first DFI and the first resource), and based on the first minimum DFI time delay.

A UE operates with shared spectrum channel access on a carrier and/or a cell. In some examples, the UE receives a signal and/or a configuration (e.g., a signal transmitted by a network and/or a configuration by the network) to configure the UE with a plurality of configured grants for one or more uplink transmissions on the carrier or the cell (e.g., the UE may be configured with the plurality of configured grants via the signal and/or the configuration). Alternatively and/or additionally, the UE may receive the signal and/or the configuration (and/or a second signal and/or a second configuration) to configure the UE with a parameter (e.g., one parameter), such as dg-minDFI-Delay-r16, for configuring and/or setting a first minimum DFI time delay (for one or more dynamic grant scheduled uplink transmissions, for example). Alternatively and/or additionally, the UE may receive the signal and/or the configuration (and/or a third signal and/or a third configuration) to configure the UE with a parameter (e.g., one parameter), such as cg-minDFI-Delay-r16, for configuring and/or setting a second minimum DFI time delay for one or more configured grant associated uplink transmissions and/or for each configured grant (e.g., the network may configure the UE with a parameter, such as cg-minDFI-Delay-r16, for each configured grant, of the plurality of configured grants, respectively). In some examples, the UE receives a first dynamic grant from the network, wherein the first dynamic grant schedules a first uplink transmission with a HARQ process number/ID, x. The UE may transmit the first uplink transmission to the network. In some examples, the UE receives a first PDCCH comprising a first DFI. The UE determines whether or not the first DFI comprises and/or provides a valid HARQ information for the HARQ process number/ID, x in response to the first uplink transmission based on an interval (e.g., an interval, such as a time length and/or a distance, between the first DFI and the first resource), and based on the first minimum DFI time delay.

In some examples, a network may operate with shared spectrum channel access on a carrier and/or a cell. The network configures a UE with a plurality of configured grants for one or more uplink transmissions on the carrier or the cell. In some examples, the network configures the UE with a parameter (e.g., one parameter), such as dg-minDFI-Delay-r16, for configuring and/or setting a first minimum DFI time delay (for one or more dynamic grant scheduled uplink transmissions). In some examples, the network configures the UE with a parameter (e.g., one parameter), such as cg-minDFI-Delay-r16, for configuring and/or setting a second minimum DFI time delay for each configured grant (of the plurality of configured grants, for example) and/or for each BWP (of a plurality of BWPs, for example), respectively. The network receives a first uplink transmission with a HARQ process number/ID, x from the UE. The network determines (and/or selects) a minimum DFI time delay based on whether or not the first uplink transmission is scheduled by a first dynamic grant. For example, the minimum DFI time delay may be the first minimum DFI time delay or the second minimum DFI time delay. For example, the network may select the first minimum DFI time delay (and/or the minimum DFI time delay determined by the network may be the first minimum DFI time delay) if the first uplink transmission is scheduled by the first dynamic grant. Alternatively and/or additionally, the network may select the second minimum DFI time delay (and/or the minimum DFI time delay determined by the network may be the second minimum DFI time delay) if the first uplink transmission is not scheduled by the first dynamic grant (and/or if the first uplink transmission is associated with a configured grant). In some examples, the network transmits a first PDCCH comprising a first DFI. In some examples, the network determines whether or not the first DFI comprises and/or provides a valid HARQ information for the HARQ process number/ID, x in response to the first uplink transmission based on an interval (e.g., an interval, such as a time length and/or a distance, between the first DFI and the first resource) and the minimum DFI time delay (determined by the network).

A UE operates with shared spectrum channel access on a carrier and/or a cell. In some examples, the UE receives a signal and/or a configuration (e.g., a signal transmitted by a network and/or a configuration by the network) to configure the UE with a plurality of configured grants for one or more uplink transmissions on the carrier or the cell (e.g., the UE may be configured with the plurality of configured grants via the signal and/or the configuration). Alternatively and/or additionally, the UE may receive the signal and/or the configuration (and/or a second signal and/or a second configuration) to configure the UE with a parameter (e.g., one parameter), such as dg-minDFI-Delay-r16, for configuring and/or setting a first minimum DFI time delay (for one or more dynamic grant scheduled uplink transmissions, for example). Alternatively and/or additionally, the UE may receive the signal and/or the configuration (and/or a third signal and/or a third configuration) to configure the UE with a parameter (e.g., one parameter), such as cg-minDFI-Delay-r16, for configuring and/or setting a second minimum DFI time delay for one or more configured grant associated uplink transmissions and/or for each configured grant (e.g., the network may configure the UE with a parameter, such as cg-minDFI-Delay-r16, for each configured grant, of the plurality of configured grants, respectively). The UE transmits a first uplink transmission with a HARQ process number/ID, x to the network. The UE receives a first PDCCH comprising a first DFI. The UE determines (and/or selects) a minimum DFI time delay based on whether or not the first uplink transmission is scheduled by a first dynamic grant. For example, the minimum DFI time delay may be the first minimum DFI time delay or the second minimum DFI time delay. For example, the UE may select the first minimum DFI time delay (and/or the minimum DFI time delay determined by the UE may be the first minimum DFI time delay) if the first uplink transmission is scheduled by the first dynamic grant. Alternatively and/or additionally, the UE may select the second minimum DFI time delay (and/or the minimum DFI time delay determined by the UE may be the second minimum DFI time delay) if the first uplink transmission is not scheduled by the first dynamic grant (and/or if the first uplink transmission is associated with a configured grant). The UE determines whether or not the first DFI comprises and/or provides a valid HARQ information for the HARQ process number/ID, x in response to the first uplink transmission based on an interval (e.g., an interval, such as a time length and/or a distance, between the first DFI and the first resource), and based on the minimum DFI time delay (determined by the UE).

If the signal does not configure a parameter (e.g., one parameter), such as dg-minDFI-Delay-r16, for configuring and/or setting the first minimum DFI time delay for one or more dynamic grant scheduled uplink transmissions, the UE and/or the network may determine the first minimum DFI time delay based on a default value. In some examples, the default value is pre-defined. In some examples, the second minimum DFI time delay is used (such as for comparison with the interval to determine whether or not the first DCI comprises and/or provides a valid HARQ information for the HARQ process number/ID, x in response to the first uplink transmission) if the first uplink transmission is associated with and/or corresponds to a configured grant (e.g., one configured grant) among the plurality of configured grants. Alternatively and/or additionally, the first minimum DFI time delay may be used (such as for comparison with the interval to determine whether or not the first DCI comprises and/or provides a valid HARQ information for the HARQ process number/ID, x in response to the first uplink transmission) if the first uplink transmission is scheduled by a dynamic grant. In some examples, the first minimum DFI time delay is configured per BWP and/or for each BWP (of a plurality of BWPs, for example) on the carrier and/or the cell, respectively. Alternatively and/or additionally, the first minimum DFI time delay may be configured per carrier and/or for each carrier with shared spectrum channel access, respectively. Alternatively and/or additionally, the first minimum DFI time delay may be configured per cell and/or for each cell with shared spectrum channel access, respectively. The network may configure the UE with a set of HARQ process numbers/IDs (e.g., one set of HARQ process numbers/IDs) for each configured grant on each BWP (of the plurality of BWPs, for example), wherein the set of HARQ process numbers/IDs may comprise one or more HARQ process numbers/IDs. One or more HARQ process number/IDs may be shared among different configured grants on a BWP. In some examples, one or more sets of HARQ process numbers/IDs for the plurality of configured grants do not comprise the HARQ process number, x. In some examples, if the first uplink transmission is scheduled by the first dynamic grant, the network determines whether or not the first DFI comprises a valid HARQ information for the HARQ process number/ID, x based on an interval (e.g., an interval, such as a time length and/or a distance, between the first DFI and the first resource), wherein the determination of whether or not the first DFI comprises and/or provides a valid HARQ information for the HARQ process number/ID, x may not be based on the first minimum DFI time delay. In some examples, if the first uplink transmission is associated with a configured grant (e.g., one configured grant) among the plurality of configured grants, the network determines whether or not the first DFI comprises and/or provides a valid HARQ information for the HARQ process number/ID, x based on an interval (e.g., an interval, such as a time length and/or a distance, between the first DFI and the first resource), wherein the determination of whether or not the first DFI comprises and/or provides a valid HARQ information for the HARQ process number/ID, x may not be based on the second minimum DFI time delay for the configured grant. In some examples, if the first uplink transmission is associated with a configured grant (e.g., one configured grant) among the plurality of configured grants, the network determines whether or not the first DFI comprises and/or provides a valid HARQ information for the HARQ process number/ID, x based on an interval (e.g., an interval, such as a time length and/or a distance, between the first DFI and the first resource), and not based on the second minimum DFI time delay for one or more configured grants (e.g., all configured grants) on a BWP, a cell and/or a carrier. In some examples, the parameter (e.g., dg-minDFI-Delay-r16) for configuring and/or setting the first minimum DFI time delay is for one or more dynamic grant scheduled uplink transmissions with one or more first HARQ process numbers/IDs, such as one or more specific and/or particular HARQ process numbers/IDs. In some examples, the first minimum DFI time delay is used for and/or associated with one or more dynamic grant scheduled uplink transmissions with the one or more first HARQ process numbers/IDs. In some examples, the one or more first HARQ process numbers/IDs are configured for and/or included for use in the plurality of configured grants (i.e., the one or more first HARQ process numbers/IDs may correspond to one or more dynamic grant and configured grant-shared HARQ processes). Alternatively and/or additionally, the one or more first HARQ process numbers/IDs may not be configured for and/or may not be included for use in the plurality of configured grants (i.e., the one or more first HARQ process numbers/IDs may correspond to one or more dynamic grant-only HARQ processes). In some examples, the one or more first HARQ process numbers/IDs are configured for and/or included for use for one or more uplink transmissions on the carrier and/or the cell (e.g., the one or more first HARQ process numbers/IDs may correspond to HARQ processes, such as all HARQ processes, in an unlicensed cell). In some examples, the UE receives the signal and/or the configuration (from the network, for example) to configure the UE with a parameter (e.g., one parameter), such as dg2-minDFI-Delay-r16, for configuring and/or setting a third minimum DFI time delay (for one or more dynamic grant scheduled uplink transmissions, for example). In some examples, the network configures the UE with the parameter (e.g., one parameter), such as dg2-minDFI-Delay-r16, for configuring and/or setting the third minimum DFI time delay (for one or more dynamic grant scheduled uplink transmissions, for example). The parameter (e.g., dg2-minDFI-Delay-r16) for configuring and/or setting the third minimum DFI time delay may be for one or more dynamic grant scheduled uplink transmissions with one or more second HARQ process numbers/IDs, such as one or more specific and/or particular HARQ process numbers/IDs. In some examples, the third minimum DFI time delay is used for and/or associated with one or more dynamic grant scheduled uplink transmissions with the one or more second HARQ process numbers/IDs. In some examples, the one or more second HARQ process numbers/IDs are configured for and/or included for use in the plurality of configured grants (i.e., the one or more second HARQ process numbers/IDs may correspond to one or more dynamic grant and configured grant-shared HARQ processes). Alternatively and/or additionally, the one or more second HARQ process numbers/IDs may not be configured for and/or may not be included for use in the plurality of configured grants (e.g., the one or more second HARQ process numbers/IDs may correspond to one or more dynamic grant-only HARQ process). In some examples, the one or more second HARQ process numbers/IDs are configured for and/or included for use for one or more uplink transmissions on the carrier (e.g., the one or more second HARQ process numbers/IDs may correspond to HARQ processes, such as all HARQ processes, in an unlicensed cell). In some examples, the first minimum DFI time delay value is the same as the third minimum DFI time delay value. Alternatively and/or additionally, the first minimum DFI time delay value may be different than the third minimum DFI time delay value.

Figure 12:
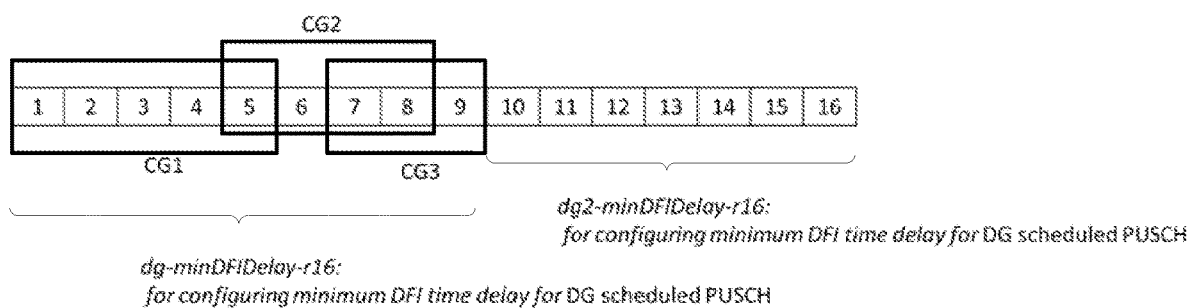
FIG. 12 is a diagram illustrating an exemplary configuration of configured grants and/or HARQ processes associated with the configured grants according to one exemplary embodiment.

In an example shown in FIG. 12, a UE has 16 uplink HARQ process number/IDs for an unlicensed cell. In some examples, the UE is configured with configured grants associated with HARQ processes {1~9}. The configured grants may comprise CG1 with HARQ processes {1~5}, CG2 with HARQ processes {5~8}, and CG3 with HARQ processes {7~9}. In some examples, the UE is configured by a first parameter (e.g., dg-minDFIDelay-r16) for configuring and/or setting a minimum DFI time delay for one or more uplink transmissions with one or more HARQ processes of the HARQ processes {1~9}, wherein the HARQ processes {1~9} are configured and/or associated with the configured grants CG1~CG 3, and wherein the one or more uplink transmissions comprise an initial and/or new uplink transmission and/or an uplink retransmission scheduled by a dynamic grant. In some examples, the UE is configured by a second parameter (e.g., dg-minDFIDelay-r16) for configuring and/or setting a minimum DFI time delay for one or more uplink transmissions with one or more HARQ processes of HARQ processes {10~16}, wherein the HARQ processes {10~16} are not configured with the configured grants CG1~CG3 and/or are not associated with the configured grants CG1~CG3, and/or wherein the one or more uplink transmissions comprise an initial and/or new uplink transmission and/or an uplink retransmission scheduled by a dynamic grant. In some examples, the first parameter (e.g., dg-minDFIDelay-r16) and the second parameter (e.g., dg2-minDFIDelay-r16) may configure the same value (e.g., the same minimum DFI time delay) or different values (e.g., different minimum DFI time delays).

Figure 13A:
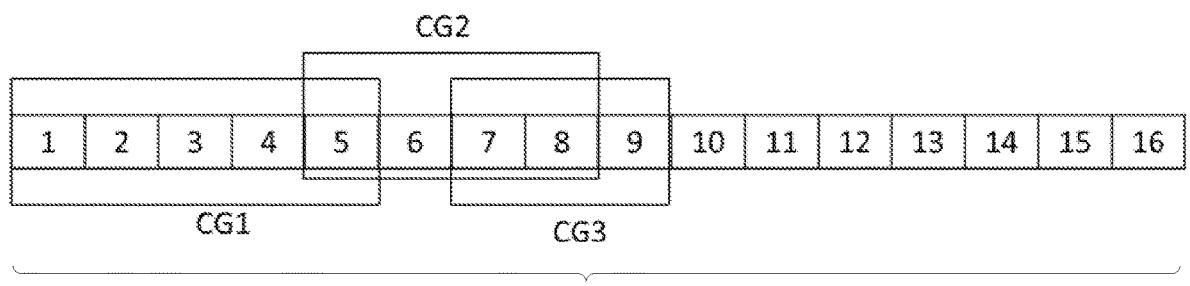
FIG. 13A is a diagram illustrating an exemplary configuration of configured grants and/or HARQ processes associated with the configured grants according to one exemplary embodiment.

In an example shown in FIG. 13A, a UE has 16 uplink HARQ process number/IDs for an unlicensed cell. The UE may be configured with CG1 with HARQ processes {1~5}, CG2 with HARQ processes {5~8}, and CG3 with HARQ processes {7~9}. In some examples, the UE is configured by a parameter (e.g., dg-minDFIDelay-r16) for configuring and/or setting a minimum DFI time delay for one or more uplink transmissions with one or more HARQ processes of HARQ processes{1~16}, wherein the one or more uplink transmissions comprise an initial and/or new uplink transmission and/or an uplink retransmission scheduled by a dynamic grant.

Figure 13B:
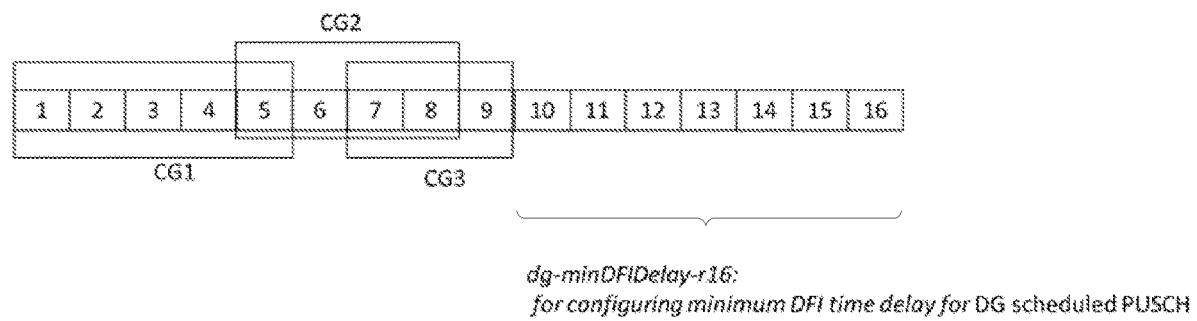
FIG. 13B is a diagram illustrating an exemplary configuration of configured grants and/or HARQ processes associated with the configured grants according to one exemplary embodiment.

In an example shown in FIG. 13B, a UE has 16 uplink HARQ process number/IDs for an unlicensed cell. The UE may be configured with CG1 with HARQ processes {1~5}, CG2 with HARQ processes {5~8}, and CG3 with HARQ processes {7~9}. The UE may be configured by a parameter (e.g., dg-minDFIDelay-r16) for configuring and/or setting a minimum DFI time delay for one or more uplink transmissions with one or more HARQ processes HARQ processes {10~16} for the unlicensed cell, wherein the one or more uplink transmissions comprise an initial and/or new uplink transmission and/or an uplink retransmission scheduled by a dynamic grant. In some examples, for dynamic grant scheduled transmission (e.g., an initial and/or new transmission and/or a retransmission) with HARQ processes {1~9} (shared with at least one of CG1~CG3, for example), the UE may determine (and/or consider) a minimum DFI time delay (associated with the dynamic grant scheduled transmission, for example) based on a default value and/or a pre-defined value (e.g., 4 ms, or 4 slots, or 4 time units, etc.). Alternatively and/or additionally, for dynamic grant scheduled transmission (e.g., an initial and/or new transmission and/or a retransmission) with HARQ processes {1~9} (shared with at least one of CG1~CG3, for example), the UE may determine (and/or consider) a minimum DFI time delay (associated with the dynamic grant scheduled transmission, for example) based on one or more minimum DFI time delays (e.g., cg-minDFIDelay-r16) associated with at least one of CG1~CG3.

Figure 14:
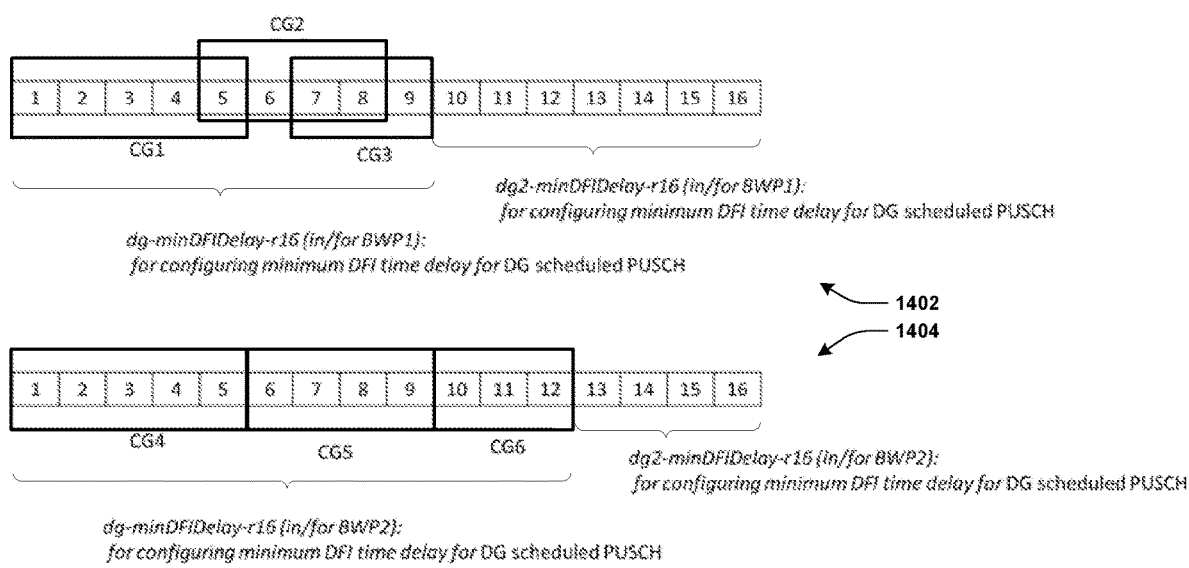
FIG. 14 is a diagram illustrating an exemplary configuration of configured grants and/or HARQ processes associated with the configured grants according to one exemplary embodiment.

In an example shown in FIG. 14, a UE is configured with one or more BWPs in an unlicensed cell. The one or more BWPs may comprise BWP1 and BWP2. As shown by a first diagram 1402 associated with BWP1, the UE may be configured with CG1~CG3 in BWP1. Alternatively and/or additionally, as shown by a second diagram 1404 associated with BWP2, the UE may be configured with CG4~6 in BWP2. In some examples, the UE has one active BWP (e.g., only one active BWP) in a same time (e.g., only one of the one or more BWPs may be active at a time). The UE may be configured with a first parameter (e.g., dg-minDFIDelay-r16) for configuring and/or setting a first minimum DFI time delay for one or more dynamic grant scheduled uplink transmissions on BWP1 and/or may be configured with a second parameter (e.g., dg-minDFIDelay-r16) for configuring and/or setting a second minimum DFI time delay for one or more dynamic grant scheduled uplink transmissions on BWP2 (e.g., the UE may be configured with the first parameter (e.g., dg-minDFIDelay-r16) for configuring and/or setting the first minimum DFI time delay for one or more dynamic grant scheduled uplink transmissions on BWP1 while being configured with the second parameter (e.g., dg-minDFIDelay-r16) for configuring and/or setting a second minimum DFI time delay for one or more dynamic grant scheduled uplink transmissions on BWP2). In some examples, the first parameter (e.g., dg-minDFIDelay-r16) for BWP1 is used for HARQ processes {1~9} (based on HARQ processes associated with CG1~CG3 in BWP1, for example). Alternatively and/or additionally, the second parameter (e.g., dg-minDFIDelay-r16) for BWP2 may be used for HARQ processes {1~12} (based on HARQ processes associated with CG4~6 in BWP2, for example). Alternatively and/or additionally, the UE may be not configured with the second parameter (e.g., dg-minDFIDelay-r16) for BWP2 since there is no overlapped HARQ process between CG4~6 in BWP2. In some examples, if the UE is not configured with the second parameter (e.g., dg-minDFIDelay-r16) (for BWP2, for example), the UE may determine (and/or consider) a minimum DFI time delay for dynamic grant scheduled uplink transmission to be a default value and/or a pre-defined value (e.g., 4 ms or 4 slots or 4 time units, etc.). Alternatively and/or additionally, the UE may determine a minimum DFI time delay for dynamic grant scheduled uplink transmission based on one or more minimum DFI time delays (e.g., cg-minDFIDelay-r16) associated with one or more configured grants. In an example, for an uplink transmission scheduled by a dynamic grant with HARQ process 4 (on BWP2, for example), the UE may determine a minimum DFI time delay (for the uplink transmission) to be the same as a minimum DFI time delay (e.g., cg-minDFIDelay-r16) configured for CG4 (associated with HARQ process 4).

In an example shown in FIG. 15, Row 1 of table 1500 corresponds to timing in units of at least one of slots, subframes, symbols, time, etc. In some examples, as shown in Row 3 of table 1500, a UE is configured with CG1 with HARQ process numbers/IDs {1,2,3} and/or minimum DFI time delay_1=2. In some examples, as shown in Row 3 of table 1500, the UE is configured with CG2 with HARQ process numbers/IDs {2,3,4} and/or minimum DFI time delay_2=4. In some examples, as shown in Row 3 of table 1500, the UE is configured with minimum DFI time delay_dg=1 (by dg-minDFIDelay-r16, for example). The UE may perform an uplink transmission (shown as "UL HarqID=2 on CG1 (new)" in Row 2 of table 1500) on a configured resource of CG1 with HARQ process 2 in timing 1. The UE may receive a DFI (shown as "DL DFI Valid (NACK for HarqID=2)" in Row 2 of table 1500) in timing 3, and/or the UE may consider the DFI for HARQ process 2 to be valid (since an interval between the uplink transmission in timing 1 and the DFI in timing 3 may be equal to 2 which is larger than or equal to minimum DFI time delay_1=2). Accordingly, HARQ feedback information for HARQ process 2 may be valid. In an example, the HARQ feedback information for HARQ process 2 is NACK. The UE may perform a retransmission (in response to the HARQ feedback information being NACK, for example) on a configured resource of CG2 with HARQ process 2 in timing 5 (the retransmission is shown as "UL HarqID=2 on CG2 (ReTX)" in Row 2 of table 1500). The UE may receive a second DFI in timing 8, and/or the UE may consider the second DFI to not be valid (since an interval between the retransmission in timing 5 and the second DFI in timing 8 may be equal to 3, which is smaller than the minimum DFI time delay_2=4). In some examples, the UE receives a dynamic grant (shown as "Dynamic grant HarqID=2 (ReTx)" in Row 2 of table 1500) in timing 8 indicating HARQ process 2 (wherein the dynamic grant may be used for retransmission for HARQ process 2). The dynamic grant may be scrambled by CS-RNTI. In some examples, the UE performs a second uplink transmission (e.g., a retransmission) (shown as "UL HarqID=2 on scheduled resource (ReTx)" in Row 2 of table 1500) scheduled by the dynamic grant in timing 11. The UE may receive a third DFI (shown as "DL DFI valid" in Row 2 of table 1500) in timing 13 and/or may consider the third DFI for HARQ process 2 to be valid (since an interval between the second uplink transmission in timing 11 and the third DFI in timing 13 may be equal to 2, which is larger than or equal to minimum DFI time delay_dg=1 which may be derived from dg-minDFIDelay-r16=1).

In an example shown in FIG. 16, Row 1 of table 1600 corresponds to timing in units of at least one of slots, subframes, symbols, time, etc. In some examples, as shown in Row 3 of table 1600, a UE receives a dynamic grant in timing 12 (shown as "Dynamic grant HarqID=2 (new)" in Row 2 of table 1600). The dynamic grant is scrambled by a Cell-RNTI (C-RNTI). The dynamic grant indicates HARQ process 2. The dynamic grant schedules a new and/or initial uplink transmission. The UE performs an uplink transmission (shown as "UL HarqID=2 on scheduled resource (ReTx)" in Row 2 of table 1600) with HARQ process 2 in timing 15 based on the dynamic grant. The UE receives a DFI (shown as "DL DFI valid" in Row 2 of table 1600) in timing 17. The UE is configured with dg-minDFIDelay-r16 (e.g., 1) for one or more HARQ processes belonging to CG1 and CG2 (as shown in Row 3 of table 1600). The UE considers the DFI for HARQ process 2 to be valid (since an interval between the uplink transmission in timing 15 and the DFI in timing 17 may be equal to 2, which is larger than or equal to the minimum DFI time delay from dg-minDFI-Delay-r16=1). In some examples, if the UE is not configured with dg-minDFIDelay-r16, the UE may consider the DFI for HARQ process 2 to be invalid (since an interval between the uplink transmission in timing 15 and the DFI in timing 17 may be equal to 2, which is smaller than a default minimum DFI time delay=4). In an example where HARQ process 2 is replaced by HARQ process 10, the UE may be configured with dg2-minDFIDelay-r16 (e.g., 5 as shown in Row 3 of table 1600) for one or more HARQ processes not belonging to CG1 and CG2. In the example where HARQ process 2 is replaced by HARQ process 10, the UE may consider DFI for HARQ process 10 to be invalid (since an interval between the uplink transmission in timing 15 and the DFI in timing 17 may be equal to 2, which is smaller than minimum DFI time delay from dg2-minDFIDelay-r16=5).

Fifth Concept

In the fifth concept, a network may operate with shared spectrum channel access on a carrier and/or a cell. In some examples, the network configures a UE with a parameter (e.g., one parameter), such as HP-minDFI-Delay-r16, for each HARQ process number/ID, wherein the parameter is used for configuring and/or setting a minimum DFI time delay for each HARQ process number/ID. Alternatively and/or additionally, the network may configure the UE with one or more parameters (e.g., HP-minDFI-Delay-r16) for one or more HARQ process number/IDs of the UE, wherein each parameter of the one or more parameters is used for configuring and/or setting a minimum DFI time delay for a HARQ process number/ID of the one or more HARQ process number/IDs of the UE. Alternatively and/or additionally, the network may configure a UE with a parameter (e.g., one parameter), such as HPG-minDFI-Delay-r16, for each HARQ process number/ID group, wherein the parameter is used for configuring and/or setting a minimum DFI time delay for each HARQ process number/ID group. Alternatively and/or additionally, the network may configure the UE with one or more parameters (e.g., HPG-minDFI-Delay-r16) for one or more HARQ process number/ID groups of the UE, wherein each parameter of the one or more parameters is used for configuring and/or setting a minimum DFI time delay for a HARQ process number/ID group of the one or more HARQ process number/ID groups of the UE. In some examples, the network receives a first uplink transmission on a first resource with a HARQ process number, x. The network transmits a first PDCCH comprising a first DFI in a first slot. In some examples, the network determines whether or not the first DFI comprises and/or provides HARQ information in response to the first uplink transmission based on an interval (e.g., an interval, such as a time length and/or a distance, between the first DFI and the first resource), and based on a minimum DFI time delay for the HARQ process number, x. Alternatively and/or additionally, the network may determine whether or not the first DFI comprises and/or provides HARQ information in response to the first uplink transmission based on an interval (e.g., an interval, such as a time length and/or a distance, between the first DFI and the first resource), and based on a minimum DFI time delay for a HARQ process number/ID group comprising the HARQ process number, x.

In some examples, a UE operates with shared spectrum channel access on a carrier and/or a cell. In some examples, the UE is configured, by a network, with (and/or the UE receives a signal, from the network, for configuring) a parameter (e.g., one parameter) for each HARQ process number/ID, wherein the parameter is used for configuring and/or setting a minimum DFI time delay for each HARQ process number/ID. Alternatively and/or additionally, the UE may be configured, by a network, with (and/or the UE may receive a signal, from the network, for configuring) one or more parameters for one or more HARQ process number/IDs of the UE, wherein each parameter of the one or more parameters is used for configuring and/or setting a minimum DFI time delay for a HARQ process number/ID of the one or more HARQ process number/IDs of the UE. Alternatively and/or additionally, the UE may be configured, by a network, with (and/or the UE may receive a signal, from the network, for configuring) a parameter (e.g., one parameter) for each HARQ process number/ID group, wherein the parameter is used for configuring and/or setting a minimum DFI time delay for each HARQ process number/ID group. Alternatively and/or additionally, the UE may be configured, by a network, with (and/or the UE may receive a signal, from the network, for configuring) one or more parameters for one or more HARQ process number/ID groups of the UE, wherein each parameter of the one or more parameters is used for configuring and/or setting a minimum DFI time delay for a HARQ process number/ID group of the one or more HARQ process number/ID groups of the UE. The UE transmits a first uplink transmission on a first resource with a HARQ process number, x. The UE receives a first PDCCH comprising a first DFI in a first slot. In some examples, the UE determines whether or not the first DFI comprises and/or provides HARQ information in response to the first uplink transmission based on an interval (e.g., an interval, such as a time length and/or a distance, between the first DFI and the first resource), and based on a minimum DFI time delay for the HARQ process number, x. Alternatively and/or additionally, the UE may determine whether or not the first DFI comprises and/or provides HARQ information in response to the first uplink transmission based on an interval (e.g., an interval, such as a time length and/or a distance, between the first DFI and the first resource), and based on a minimum DFI time delay for a HARQ process number/ID group comprising the HARQ process number, x.

In some examples, the network configures the UE with a plurality of configured grants for one or more uplink transmissions on the carrier. The plurality of configured grants comprises a first configured grant and a second configured grant (and/or one or more other configured grants in addition to the first configured grant and the second configured grant). For example, the UE may be configured with (and/or may receive a signal for configuring) the plurality of configured grants for one or more uplink transmissions on the carrier. In some examples, the HARQ process number/ID group comprises one or more HARQ process number/IDs. In some examples, the one or more HARQ process number/

IDs are associated with and/or use a parameter for the HARQ process number/group (e.g., the parameter may be used for configuring and/or setting a minimum DFI time delay for the one or more HARQ process number/IDs of the HARQ process number/ID group). In some examples, the HARQ process number/ID group comprises consecutive HARQ process number/IDs. In some examples, different HARQ process number/ID groups comprise non-overlapped HARQ process number/ID. For example, a second HARQ process number/ID group, different than the HARQ process number/ID group, may comprise one or more second HARQ process number/IDs that do not overlap with the one or more HARQ process number/IDs.

In some examples, the UE is configured with a first HARQ process number/ID group and/or a second HARQ process number/ID group (e.g., the network may configure the UE with the first HARQ process number/ID group and/or the second HARQ process number/ID group). In some examples, a HARQ process number/ID of the first HARQ process number/ID group (e.g., a HARQ process number/ID belonging to and/or in the first HARQ process number/ID group) does not belong to and/or is not in one or more other HARQ process number/ID groups (of the UE, for example), such as the second HARQ process number/ID group.

In some examples, the UE is configured with a set of HARQ process numbers/IDs (e.g., one set of HARQ process numbers/IDs) for each configured grant of one or more configured grants (e.g., the plurality of configured grants), wherein the set of HARQ process numbers/IDs (e.g., the one set of HARQ process numbers/IDs) comprises one or more HARQ process number/IDs. In some examples, the network configures the UE with a set of HARQ process numbers/IDs (e.g., one set of HARQ process numbers/IDs) for each configured grant of one or more configured grants (e.g., the plurality of configured grants), wherein the set of HARQ process numbers/IDs (e.g., the one set of HARQ process numbers/IDs) comprises one or more HARQ process number/IDs.

In some examples, the UE is configured with a first set of HARQ process numbers/IDs for the first configured grant, and/or the UE is configured with a second set of HARQ process numbers/IDs for the second configured grant. The first set of HARQ process numbers/IDs comprises the HARQ process number, x, and/or the second set of HARQ process numbers/IDs comprises the HARQ process number, x. In some examples, the UE is configured by the network with one or more HARQ process numbers/IDs for the plurality of configured grants. In some examples, the one or more HARQ process numbers/IDs is common for the plurality of configured grants. In some examples, the HARQ process number, x is included in the one or more HARQ process numbers/IDs.

Figure 17:
FIG. 17 is a table associated with a plurality of entries associated with HARQ process groups according to one exemplary embodiment.

In an example shown in table 1700 of FIG. 17, a UE is configured with a list with a plurality of entries comprising entries 1~X. Each entry is associated with a HARQ process group (e.g., entry 1 is associated with HPG1, entry 2 is associated with HPG2, etc.). In some examples, each entry of the plurality of entries is indicative of one or more HARQ processes (wherein the one or more HARQ processes of the entry may be consecutive HARQ processes). In some examples, each entry of the plurality of entries comprises a parameter (e.g., hpg-minDFIDelay-r16) for configuring and/or setting a minimum DFI time delay for each HARQ process group. In an example, entry 1 may comprise a first parameter (e.g., hpg-minDFIDelay-r16) for configuring a first minimum DFI time delay (e.g., 1) for HPG1, entry 2 may comprise a second parameter (e.g., hpg-minDFIDelay-r16) for configuring a second minimum DFI time delay (e.g., 2) for HPG2, etc. In an example shown in FIG. 15, the UE may perform uplink transmission (shown as "HarqID=2 on CG1 (new)" in Row 2 of table 1500) on a configured resource of CG1 with HARQ process 2 in timing 1. The UE may receive a DFI (shown as "DL DFI Valid (NACK for HarqID=2)" in Row 2 of table 1500) in timing 3. The UE may consider the DFI for HARQ process 2 to be valid (since an interval between the uplink transmission in timing 1 and the DFI in timing 3 may be equal to 2, which is larger than or equal to minimum DFI time delay=1, wherein minimum DFI time delay=1 is derived from HPG1 and/or the first minimum DFI time delay associated with HPG1). In some examples, HARQ feedback information for HARQ process 2 is valid and is NACK. The UE may perform a retransmission on a configured resource of CG2 with HARQ process 2 in timing 5. The UE receives a dynamic grant indicating HARQ process 2 (which may be used for retransmission for HARQ process 2). The dynamic grant is scrambled by CS-RNTI. The UE may perform a second uplink transmission (shown as "UL HarqID=2 on scheduled resource (ReTx)" in Row 2 of table 1500) scheduled by the dynamic grant in timing 11. The UE receives a second DFI (shown as "DL DFI valid" in Row 2 of table 1500) in timing 13 and considers DFI for HARQ process 2 to be valid (since an interval between the second uplink transmission in timing 11 and the second DFI in timing 13 may be equal to 2, which is larger than or equal to minimum DFI time delay=1, wherein minimum DFI time delay=1 is derived from HPG1 and/or the first minimum DFI time delay associated with HPG1).

Alternatively and/or additionally, in some examples, DG scheduled (dynamic grant-scheduled) uplink transmission (e.g., new and/or initial transmission and/or retransmission) may be associated with minimum DFI time delay for HARQ process group and/or for HARQ process (e.g., only DG scheduled uplink transmission may be associated with minimum DFI time delay for HARQ process group and/or for HARQ process). For example, a minimum DFI time delay for the second DFI received in timing 13 with respect to table 1500 of FIG. 15 and/or a minimum DFI time delay for the DFI received in timing 17 with respect to table 1600 of FIG. 16 may be determined based on a minimum DFI time delay for a HARQ process group comprising HARQ process 2. In another example, a minimum DFI time delay for the DFI received in timing 3 with respect to table 1500 of FIG. 15 and/or a minimum DFI time delay for a DFI received in timing 6 with respect to table 1600 of FIG. 16 may be determined based on minimum DFI time delay_1.

Alternatively and/or additionally, in some examples, DG scheduled uplink new and/or initial transmission (e.g., only DG scheduled uplink new and/or initial transmission, such as only new and/or initial transmissions scheduled by a dynamic grant) may be associated with minimum DFI time delay for HARQ process group and/or for HARQ process. For example, a minimum DFI time delay for DFI received in timing 17 with respect to table 1600 of FIG. 16 may be determined based on a minimum DFI time delay for HARQ process group comprising HARQ process 2, wherein a minimum DFI time delay for the second DFI received in timing 13 with respect to table 1500 of FIG. 15 may be determined based on minimum DFI time delay_1 or minimum DFI time delay_2. In another example, a minimum DFI time delay for the DFI received in timing 3 with respect to table 1500 of FIG. 15 and/or the minimum DFI time delay for the DFI received in timing 6 with respect to table 1600 of FIG. 16 may be determined based on minimum DFI time delay_1.

To enhance wireless communication and/or specifications (e.g., 3GPP specifications) for wireless communication in accordance with some embodiments herein, Enhancements 1-3 are provided herein. Enhancements 1-3 are reflective of implementation in accordance with some embodiments herein. According to some embodiments, one, some and/or all of Enhancements 1-3 and/or a portion of one, some and/or all of Enhancements 1-3 may be implemented.

Enhancement 1 comprises sections 1-3, wherein one, some and/or all of sections 1-3 and/or a portion of one, some and/or all of sections 1-3 may be implemented according to some embodiments. Section 1 of Enhancement 1 is in bold, and is preceded by the term "SECTION 1 STARTS:" and followed by the term "SECTION 1 ENDS". Section 2 of Enhancement 1 is in bold, and is preceded by the term "SECTION 2 STARTS:" and followed by the term "SECTION 2 ENDS". Section 3 of Enhancement 1 is in bold, and is preceded by the term "SECTION 3 STARTS:" and followed by the term "SECTION 3 ENDS".

Enhancement 1:

| ConfiguredGrantConfig field descriptions |
|---|
| ... |
| cg-minDFI-Delay |
| Indicates the minimum duration (in unit of symbols) from the ending symbol of the PUSCH to the starting symbol of the PDCCH containing the downlink feedback indication (DFI) carrying HARQ-ACK for this PUSCH. The HARQ-ACK received before this minimum duration is not considered as valid for this PUSCH (see TS 38.213 [13], clause 10.3). SECTION 1 STARTS: If HARQ processes are shared among different configured grants on the same BWP, cg-minDFI-Delay is set to the same value for all of configurations on this BWP. SECTION 1 ENDS . . . |
| cg-minDFI-Delay |
| Indicates the minimum duration (in unit of symbols) from the ending symbol of the PUSCH to the starting symbol of the PDCCH containing the downlink feedback indication (DFI) carrying HARQ-ACK for this PUSCH. The HARQ-ACK received before this minimum duration is not considered as valid for this PUSCH (see TS 38.213 [13], clause 10.3). SECTION 2 STARTS: If this field is absent and HARQ processes are shared among different configured grants on the same BWP, cg-minDFI-Delay is set to the [same/smallest/largest] value of [other/all] configurations on this BWP. SECTION 2 ENDS . . . |
| cg-minDFI-Delay |
| Indicates the minimum duration (in unit of symbols) from the ending symbol of the PUSCH to the starting symbol of the PDCCH containing the downlink feedback indication (DFI) carrying HARQ-ACK for this PUSCH. The HARQ-ACK received before this minimum duration is not considered as valid for this PUSCH (see TS 38.213 [13], clause 10.3). SECTION 3 STARTS: If this field is absent, cg-minDFI-Delay is set to the [same/smallest/largest] value of [other/all] configurations on this BWP. SECTION 3 ENDS . . . |

Enhancement 2 comprises sections 4-6, wherein one, some and/or all of sections 4-6 and/or a portion of one, some and/or all of sections 4-6 may be implemented according to some embodiments. Section 4 of Enhancement 2 is in bold, and is preceded by the term "SECTION 4 STARTS:" and followed by the term "SECTION 4 ENDS". Section 5 of Enhancement 2 is in bold, and is preceded by the term "SECTION 5 STARTS:" and followed by the term "SECTION 5 ENDS". Section 6 of Enhancement 2 is in bold, and is preceded by the term "SECTION 6 STARTS:" and followed by the term "SECTION 6 ENDS".

Enhancement 2:

For a PUSCH transmission configured by ConfiguredGrantConfig or for activated PUSCH transmissions configured by semiPersistentOnPUSCH, HARQ-ACK information for a transport block of a corresponding HARQ process number is valid if a first symbol of the PDCCH reception is after a last symbol of the PUSCH transmission, or of any repetition of the PUSCH transmission, by a number of symbols provided by cg-minDFIDelay-r16 SECTION 4 STARTS: associated to the latest PUSCH transmission configured by ConfiguredGrantConfig for the transport block of the corresponding HARQ process number, or associated to the activated PUSCH transmissions configured by semiPersistentOnPUSCH for the transport block of the corresponding HARQ process number. SECTION 4 ENDS For a PUSCH transmission scheduled by a DCI format, HARQ-ACK information for a transport block of a corresponding HARQ process number is valid if a first symbol of the PDCCH reception is after a last symbol of the PUSCH transmission or, if the PUSCH transmission is over multiple slots, after a last symbol of the PUSCH transmission in a first slot from the multiple slots by a number of symbols provided by cg-minDFIDelay-r16, SECTION 5 STARTS: associated to the latest PUSCH transmission configured by ConfiguredGrantConfig for the transport block of the corresponding HARQ process number, SECTION 5 ENDS if a value of the HARQ-ACK information is ACK.

after a last symbol of the PUSCH transmission in a last slot from the multiple slots by a number of symbols provided by cg-minDFIDelay-r16, SECTION 6 STARTS: associated to the latest PUSCH transmission configured by ConfiguredGrantConfig for the transport block of the corresponding HARQ process number, SECTION 6 ENDS if a value of the HARQ-ACK information is NACK.

Enhancement 3 comprises sections 7-9, wherein one, some and/or all of sections 7-9 and/or a portion of one, some and/or all of sections 7-9 may be implemented according to some embodiments. Section 7 of Enhancement 3 is in bold, and is preceded by the term "SECTION 7 STARTS:" and followed by the term "SECTION 7 ENDS". Section 8 of Enhancement 3 is in bold, and is preceded by the term "SECTION 8 STARTS:" and followed by the term "SECTION 8 ENDS". Section 9 of Enhancement 3 is in bold, and is preceded by the term "SECTION 9 STARTS:" and followed by the term "SECTION 9 ENDS".

Enhancement 3:

```
-   PUSCH-Config
PUSCH-Config ::=                        SEQUENCE {
...
SECTION 7 STARTS:
dg-minDFI-Delay-r16                     ENUMERATED
                                                        {sym7, sym1x14,
sym2x14, sym3x14, sym4x14, sym5x14, sym6x14, sym7x14, sym8x14,
                                                                sym9x14,
sym10x14, sym11x14, sym12x14, sym13x14, sym14x14,sym15x14, sym16x14
                                                        }
                                        OPTIONAL,    -- Need R
SECTION 7 ENDS
SECTION 8 STARTS:
DFI-HPG-List-r16                        SEQUENCE (SIZE (1.. maxNrofHARQ-
process-group)) OF HPG-minDFI-Delay-r16 OPTIONAL,       -- Need R
HPG-minDFI-Delay-r16                    ENUMERATED
                                                        {sym7, sym1x14,
sym2x14, sym3x14, sym4x14, sym5x14, sym6x14, sym7x14, sym8x14,
                                                                sym9x14,
sym10x14, sym11x14, sym12x14, sym13x14, sym14x14,sym15x14, sym16x14
                                                        }
                                        OPTIONAL,    -- Need R
SECTION 8 ENDS
SECTION 9 STARTS:
DFI-HP-List-r16                         SEQUENCE (SIZE (1.. maxNrofHARQ-
proces)) OF HP-minDFI-Delay-r16         OPTIONAL,    -- Need R
HP-minDFI-Delay-r16                     ENUMERATED
                                                        {sym7, sym1x14,
sym2x14, sym3x14, sym4x14, sym5x14, sym6x14, sym7x14, sym8x14,
                                                                sym9x14,
sym10x14, sym11x14, sym12x14, sym13x14, sym14x14,sym15x14, sym16x14
                                                        }
                                        OPTIONAL, -- Need R
SECTION 9 ENDS
...
}
``` dg-minDFI-Delay
Indicates the minimum duration (in unit of symbols) from the ending symbol of the scheduled PUSCH to the starting symbol of the PDCCH containing the downlink feedback indication (DFI) carrying HARQ-ACK for this PUSCH. The HARQ-ACK received before this minimum duration is not considered as valid for this PUSCH (see TS 38.213 [13], clause 10.3). . . .
HPG-minDFI-Delay
Indicates the minimum duration (in unit of symbols) from the ending symbol of the scheduled PUSCH to the starting symbol of the PDCCH containing the downlink feedback indication (DFI) carrying HARQ-ACK for this PUSCH. The HARQ-ACK received before this minimum duration is not considered as valid for this PUSCH (see TS 38.213 [13], clause 10.3). . . .
HP-minDFI-Delay
Indicates the minimum duration (in unit of symbols) from the ending symbol of the PUSCH to the starting symbol of the PDCCH containing the downlink feedback indication (DFI) carrying HARQ-ACK for this PUSCH. The HARQ-ACK received before this minimum duration is not considered as valid for this PUSCH (see TS 38.213 [13], clause 10.3). . . .

With respect to one or more embodiments herein, such as one or more techniques, devices, concepts, methods and/or alternatives described above, a CG configuration may be associated with a type-1 configured grant or a type-2 configured grant (e.g., one CG configuration may be associated with one type-1 configured grant or one type-2 configured grant).

With respect to one or more embodiments herein, a type-1 configured grant (e.g., one type-1 configured grant) is without active command (e.g., DCI and/or MAC CE indicating activation).

With respect to one or more embodiments herein, a type-2 configured grant (e.g., one type-2 configured grant) is used after and/or in response to receiving an active command (e.g., DCI and/or MAC CE indicating activation).

With respect to one or more embodiments herein, a type-2 configured grant (e.g., one type-2 configured grant) is used before receiving a de-active command (e.g., DCI or MAC CE indicating deactivation).

With respect to one or more embodiments herein, a type-2 configured grant (e.g., one type-2 configured grant) is used within a period, wherein the period is in response to and/or after receiving an active command and before receiving a de-active command.

With respect to one or more embodiments herein, one or more configured grant configurations may have a same type (e.g., same type-1 or same type-2).

With respect to one or more embodiments herein, one or more configured grant configurations may be mixed type (e.g., the one or more configured grant configurations may comprise one or more configured grant configurations of type-1 and one or more configured grant configurations of type-2).

With respect to one or more embodiments herein, different configured grants may be associated with different slot offsets, different periodicities and/or different HARQ process number/ID ranges.

With respect to one or more embodiments herein, for uplink resources or uplink occasions associated with a type-1 configured grant (e.g., one type-1 configured grant), the uplink resources or uplink occasions are in a periodic manner in time domain.

Figure 18:
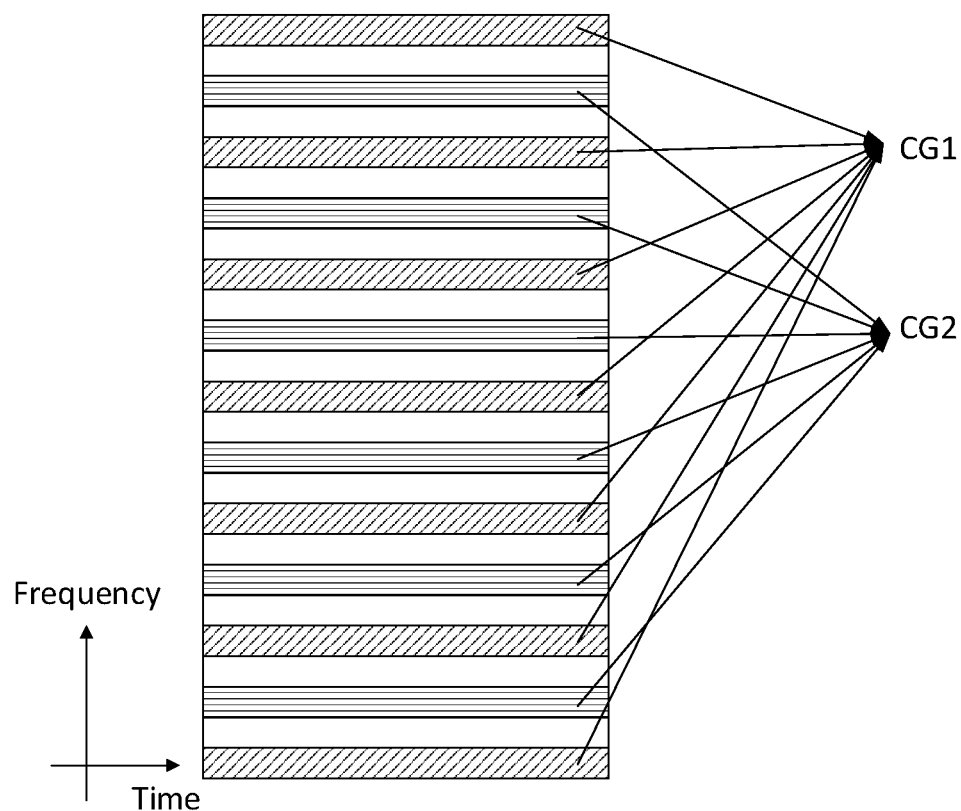
FIG. 18 is a diagram of frequency resources and/or Physical Resource Blocks (PRBs) according to one exemplary embodiment.

With respect to one or more embodiments herein, for uplink resources or uplink occasions associated with a type-1 configured grant (e.g., one type-1 configured grant), the uplink resources or uplink occasions are in a same frequency resource and/or occupy a same frequency range. In some examples, each uplink resource or each uplink occasion associated with the type-1 configured grant occupies a set of Physical Resource Blocks (PRBs). In some examples, the set of PRBs may be PRB x~PRB y or PRBs with interlaced structure (e.g., PRB 1, 11, 21, 31 . . . 101). A diagram of frequency resources and/or PRBs associated with CG1 and CG2 is illustrated in FIG. 18.

With respect to one or more embodiments herein, for uplink resources or uplink occasions associated with a type-2 configured grant (e.g., one type-2 configured grant) during a period (e.g., a period in which the type-2 configured grant is used, wherein the period may be in response to and/or after receiving an active command and before receiving a de-active command), the uplink resources or uplink occasions are in a periodic manner in time domain.

With respect to one or more embodiments herein, for uplink resources or uplink occasions associated with a type-2 configured grant (e.g., one type-2 configured grant) during a period (e.g., a period in which the type-2 configured grant is used, wherein the period may be in response to and/or after receiving an active command and before receiving a de-active command), the uplink resources or uplink occasions are in a same frequency resource and/or occupy a same frequency range. In some examples, each uplink resource or each uplink occasion associated with the type-2 configured grant occupies a set of PRBs. In some examples, the set of PRBs may be PRB x~PRB y or PRBs with interlaced structure (e.g., PRB 1, 11, 21, 31 . . . 101).

With respect to one or more embodiments herein, for an uplink transmission in unlicensed spectrum, the uplink transmission may comprise, deliver and/or carry an Uplink Control Information (UCI).

With respect to one or more embodiments herein, the UCI may indicate a New Data Indicator (NDI), a HARQ process number/ID and/or a Redundancy Version (RV) index associated with the uplink transmission.

Figure 19:
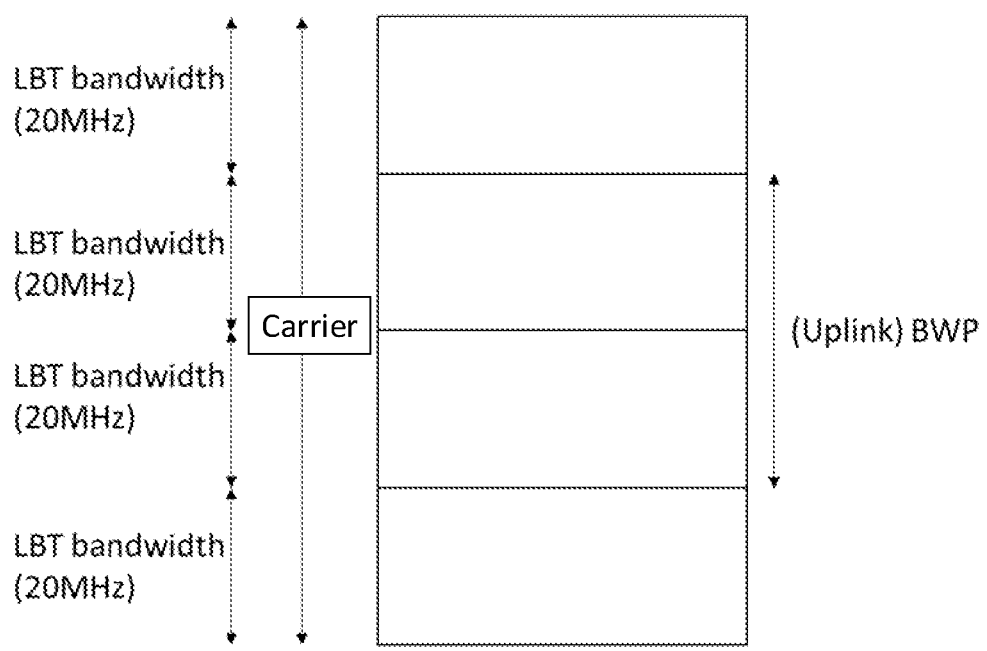
FIG. 19 is a diagram of an uplink bandwidth part (BWP) and/or a Listen Before Talk (LBT) bandwidth in a carrier and/or a cell operating with shared spectrum channel access according to one exemplary embodiment.

With respect to one or more embodiments herein, FIG. 19 illustrates an uplink BWP and/or a LBT bandwidth in a carrier and/or a cell operating with shared spectrum channel access.

With respect to one or more embodiments herein, the network indicates part of the occupancy time to one or more UEs such that the one or more UEs performs uplink transmission during the part of the occupancy time.

With respect to one or more embodiments herein, the plurality of configured grants are configured in a same BWP and/or in a same LBT bandwidth on the carrier.

With respect to one or more embodiments herein, a BWP on the carrier comprises one or more consecutive LBT bandwidth on the carrier.

With respect to one or more embodiments herein, a LBT bandwidth (e.g., one LBT bandwidth) is 20 MHz.

With respect to one or more embodiments herein, a configured grant (e.g., one configured grant) and/or a configured grant configuration (e.g., one configured grant configuration) may be associated with a set of HARQ process numbers/IDs and/or a range of HARQ process numbers/IDs.

With respect to one or more embodiments herein, each configured grant and/or each configured grant configuration may be associated with each set of HARQ process number/ID and/or each range of HARQ process numbers/IDs.

With respect to one or more embodiments herein, the set of HARQ process numbers/IDs and/or the range of HARQ process numbers/IDs for a configured grant (e.g., each configured grant) is configured by a starting HARQ process number/ID and an amount of HARQ process numbers/IDs for the configured grant.

With respect to one or more embodiments herein, the starting HARQ process number/ID is an offset (e.g., harqProcID-Offset-r16).

With respect to one or more embodiments herein, the amount of HARQ process numbers/IDs is an amount (i.e., nrofHARQ-Processes).

With respect to one or more embodiments herein, a value of minimum DFI time delay is in units of symbols.

With respect to one or more embodiments herein, the parameter (if present for setting minimum DIF time delay) for a configured grant is via cg-minDFI-Delay.

With respect to one or more embodiments herein, a configured grant configuration (e.g., one configured grant configuration) is via and/or is associated with a ConfiguredGrantConfig (e.g., one ConfiguredGrantConfig).

With respect to one or more embodiments herein, a configured grant (e.g., one configured grant) is associated with a ConfiguredGrantConfig (e.g., one ConfiguredGrantConfig).

One, some and/or all of the foregoing techniques and/or embodiments can be formed to a new embodiment.

In some examples, embodiments disclosed herein, such as embodiments described with respect to the first concept, the second concept, the third concept, the fourth concept and the fifth concept, may be implemented independently and/or separately. Alternatively and/or additionally, a combination of embodiments described herein, such as embodiments described with respect to the first concept, the second concept, the third concept, the fourth concept and/or the fifth concept, may be implemented. Alternatively and/or additionally, a combination of embodiments described herein, such as embodiments described with respect to the first concept, the second concept, the third concept, the fourth concept and/or the fifth concept, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 20:
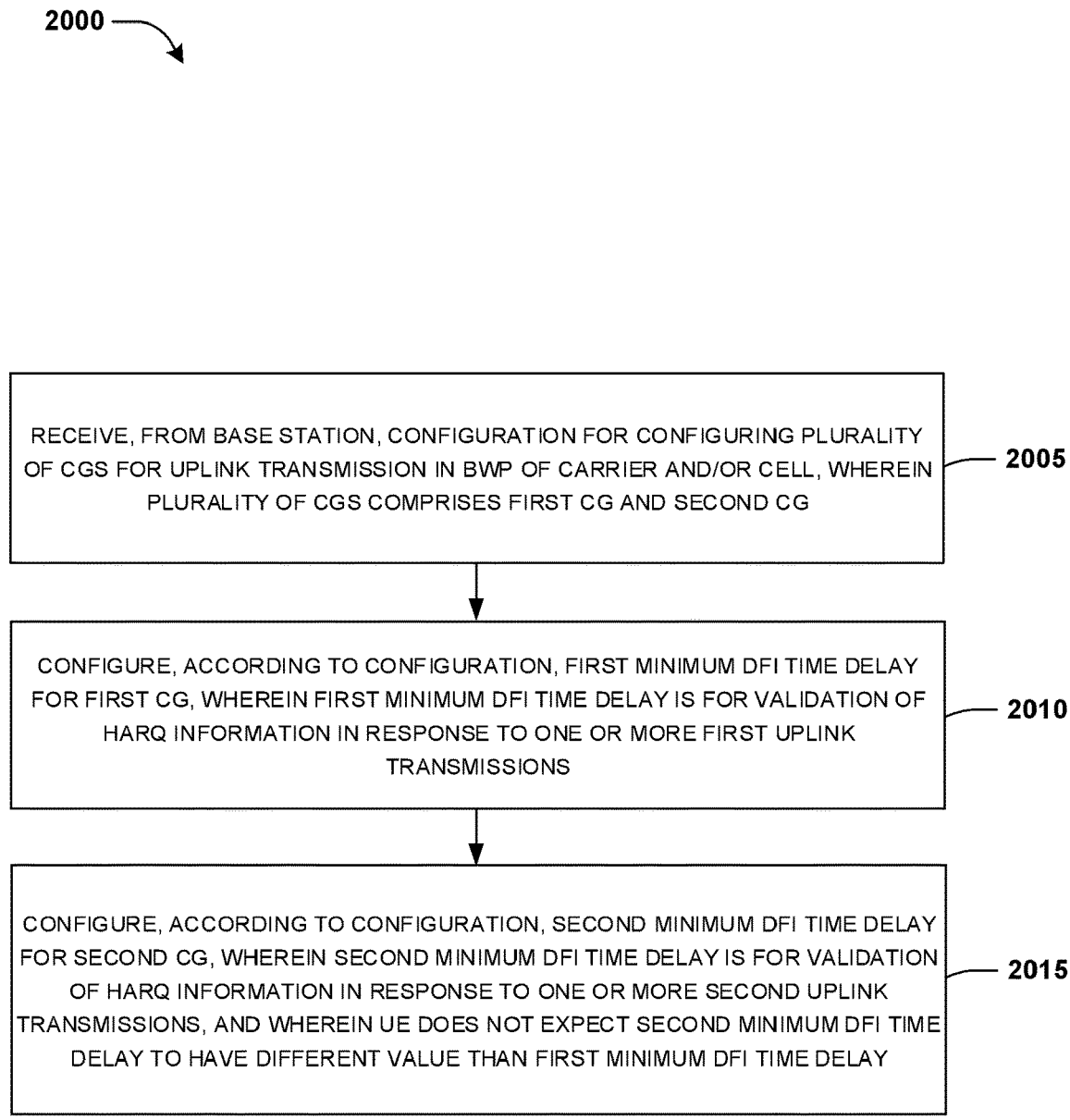
FIG. 20 is a flow chart according to one exemplary embodiment.

FIG. 20 is a flow chart 2000 according to one exemplary embodiment from the perspective of a UE operating with shared spectrum channel access on a carrier and/or a cell. In step 2005, the UE receives, from a base station, a configuration for configuring a plurality of CGs for uplink transmission in a BWP of the carrier and/or the cell. In an example, the UE may be configured with the plurality of CGs using the configuration and/or the UE may use the plurality of CGs for uplink transmission in the BWP of the carrier and/or the cell. The plurality of CGs comprises a first CG and a second CG (and/or one or more other CGs in addition to the first CG and the second CG). In step 2010, the UE configures a first minimum DFI time delay for the first CG according to the configuration, wherein the first minimum DFI time delay is for validation of HARQ information in response to one or more first uplink transmissions (e.g., the first minimum DFI time delay is used to validate one or more sets of HARQ information in response to the one or more first uplink transmissions). The one or more first uplink transmissions may comprise one or more uplink transmissions performed by the UE. In step 2015, the UE configures a second minimum DFI time delay for the second CG according to the configuration, wherein the second minimum DFI time delay is for validation of HARQ information in response to one or more second uplink transmissions (e.g., the second minimum DFI time delay is used to validate one or more sets of HARQ information in response to the one or more second uplink transmissions). The one or more second uplink transmissions may comprise one or more uplink transmissions performed by the UE. The UE does not expect the second minimum DFI time delay to have a different value than the first minimum DFI time delay. For example, the UE may not expect to be configured with different values between the first minimum DFI time delay and the second minimum DFI time delay, and/or the UE may expect the first minimum DFI time delay and the second minimum DFI time delay to correspond to the same value.

In one embodiment, the UE configures (and/or associates) a first set of one or more HARQ processes for the first CG according to the configuration. The UE configures (and/or associates) a second set of one or more HARQ processes for the second CG according to the configuration. In one embodiment, the one or more first uplink transmissions are associated with the first CG. In one embodiment, the one or more second uplink transmissions are associated with the second CG.

In one embodiment, a first value of the first minimum DFI time delay is the same as a second value of the second minimum DFI time delay based on each set of HARQ processes, of the first set of one or more HARQ processes and the second set of one or more HARQ processes, comprising a same (e.g., shared) HARQ process. For example, the first value is the same as the second value if each set of HARQ processes, of the first set of one or more HARQ processes and the second set of one or more HARQ processes, comprise the same (e.g., shared) HARQ process.

In one embodiment, the UE does not expect the second minimum DFI time delay to have a different value than the first minimum DFI time delay (and/or the UE may not expect to be configured with different values between the first minimum DFI time delay and the second minimum DFI time delay) based on each set of HARQ processes, of the first set of one or more HARQ processes and the second set of one or more HARQ processes, comprising a same (e.g., shared) HARQ process. For example, the UE does not expect the second minimum DFI time delay to have a different value than the first minimum DFI time delay (e.g., the UE may not expect to be configured with different values between the first minimum DFI time delay and the second minimum DFI time delay) if each set of HARQ processes, of the first set of one or more HARQ processes and the second set of one or more HARQ processes, comprise the same (e.g., shared) HARQ process.

In one embodiment, a first value of the first minimum DFI time delay is the same as a second value of the second minimum DFI time delay based on no HARQ processes being shared between the first set of one or more HARQ processes and the second set of one or more HARQ processes (such as when the first set of one or more HARQ processes does not comprise any HARQ process of the second set of one or more HARQ processes and when the second set of one or more HARQ processes does not comprise any HARQ process of the first set of one or more HARQ processes). For example, the first value is the same as the second value if no HARQ processes are shared between the first set of one or more HARQ processes and the second set of one or more HARQ processes.

In one embodiment, the UE does not expect the second minimum DFI time delay to have a different value than the first minimum DFI time delay (and/or the UE may not expect to be configured with different values between the first minimum DFI time delay and the second minimum DFI time delay) based on no HARQ processes being shared between the first set of one or more HARQ processes and the second set of one or more HARQ processes. For example, the UE does not expect the second minimum DFI time delay to have a different value than the first minimum DFI time delay (and/or the UE may not expect to be configured with different values between the first minimum DFI time delay and the second minimum DFI time delay) if no HARQ processes are shared between the first set of one or more HARQ processes and the second set of one or more HARQ processes.

In one embodiment, a first value of the first minimum DFI time delay is the same as a second value of the second minimum DFI time delay regardless of whether or not each set of HARQ processes, of the first set of one or more HARQ processes and the second set of one or more HARQ processes, comprise a same HARQ process (e.g., at least one same HARQ process).

In one embodiment, the UE does not expect the second minimum DFI time delay to have a different value than the first minimum DFI time delay (and/or the UE may not expect to be configured with different values between the first minimum DFI time delay and the second minimum DFI time delay) regardless of whether or not each set of HARQ processes, of the first set of one or more HARQ processes and the second set of one or more HARQ processes, comprise a same HARQ process (e.g., at least one same HARQ process).

In one embodiment, the UE transmits a third uplink transmission on a first resource. Alternatively and/or additionally, the UE transmits a fourth uplink transmission on a second resource. Alternatively and/or additionally, the one or more first uplink transmissions comprise the third uplink transmission (e.g., the third uplink transmission is one of the one or more first uplink transmissions). Alternatively and/or additionally, the one or more second uplink transmissions comprise the fourth uplink transmission (e.g., the fourth uplink transmission is one of the one or more second uplink transmissions). Alternatively and/or additionally, the third uplink transmission and/or the first resource are associated with and/or determined based on the first CG. Alternatively and/or additionally, the fourth uplink transmission and/or the second resource are associated with and/or determined based on the second CG. Alternatively and/or additionally, the fourth uplink transmission and/or the second resource are associated with, determined based on and/or scheduled by a dynamic grant (e.g., a dynamic scheduling grant). Alternatively and/or additionally, each uplink transmission, of the third uplink transmission and the fourth uplink transmission, carries (and/or delivers) a same TB. Alternatively and/or additionally, each uplink transmission, of the third uplink transmission and the fourth uplink transmission, is with a same HARQ process number. Alternatively and/or additionally, the third uplink transmission is earlier than the fourth uplink transmission (in time domain). Alternatively and/or additionally, the third uplink transmission is an initial transmission of the TB and the fourth uplink transmission is a retransmission of the TB.

In one embodiment, the UE receives a first PDCCH in a first slot. Alternatively and/or additionally, the UE receives a second PDCCH in a second slot. Alternatively and/or additionally, the first slot and/or the first PDCCH (and/or reception of the first PDCCH) are later than (and/or after) the third uplink transmission (e.g., a time of the first slot and/or a time of reception of the first PDCCH are later than a time of the third uplink transmission). Alternatively and/or additionally, the second slot and/or the second PDCCH (and/or reception of the second PDCCH) are later than (and/or after) the fourth uplink transmission (e.g., a time of the second slot and/or a time of reception of the second PDCCH are later than a time of the fourth uplink transmission). Alternatively and/or additionally, the first PDCCH comprises and/or indicates a first DFI. Alternatively and/or additionally, the second PDCCH comprises and/or indicates a second DFI.

In one embodiment, the UE determines whether or not the first DFI comprises and/or provides HARQ information (and/or valid HARQ information) in response to the third uplink transmission based on a first interval between the first DFI and the first resource and based on the first minimum DFI time delay or the second minimum DFI time delay. The first interval may correspond to a time length and/or a distance between the first DFI and the first resource, such as a time length and/or a distance between reception of the first DFI (and/or the first PDCCH) and the first resource. HARQ information (and/or valid HARQ information) in response to the third uplink transmission may correspond to an indication (e.g., HARQ feedback, such as ACK or NACK) of whether the third uplink transmission is successfully received and/or decoded by the base station.

In one embodiment, the UE determines whether or not the second DFI comprises and/or provides HARQ information (and/or valid HARQ information) in response to the fourth uplink transmission based on a second interval between the second DFI and the second resource and based on the first minimum DFI time delay or the second minimum DFI time delay. The second interval may correspond to a time length and/or a distance between the second DFI and the second resource, such as a time length and/or a distance between reception of the second DFI (and/or the second PDCCH) and the second resource. HARQ information (and/or valid HARQ information) in response to the fourth uplink transmission may correspond to an indication (e.g., HARQ feedback, such as ACK or NACK) of whether the fourth uplink transmission is successfully received and/or decoded by the base station.

In one embodiment, the UE determines that the first DFI comprises and/or provides first HARQ information (e.g., first valid HARQ information) in response to the third uplink transmission (and/or in response to the first resource) based on the first interval being larger than or equal to the first minimum DFI time delay or based on the first interval being larger than or equal to the second minimum DFI time delay. For example, if the first interval is larger than or equal to the first minimum DFI time delay and/or if the first interval is larger than or equal to the second minimum DFI time delay, the UE may determine that the first DFI comprises and/or provides the first HARQ information. Alternatively and/or additionally, if the first interval is larger than or equal to the first minimum DFI time delay and/or if the first interval is larger than or equal to the second minimum DFI time delay, the first DFI may comprise and/or provide the first HARQ information (and/or the first DFI may comprise and/or provide other information in addition to the first HARQ information). The first HARQ information in response to the third uplink transmission (and/or in response to the first resource) may correspond to an indication (e.g., HARQ feedback, such as ACK or NACK) of whether the third uplink transmission is successfully received and/or decoded by the base station).

In one embodiment, the UE determines that the first DFI does not comprise and/or provide HARQ information (and/or valid HARQ information) in response to the third uplink transmission (and/or in response to the first resource) based on the first interval being smaller than the first minimum DFI time delay or based on the first interval being smaller than the second minimum DFI time delay. For example, if the first interval is smaller than the first minimum DFI time delay and/or if the first interval is smaller than the second minimum DFI time delay, the UE may determine that the first DFI does not comprise and/or provide HARQ information (and/or valid HARQ information) in response to the third uplink transmission (and/or in response to the first resource). HARQ information (and/or valid HARQ information) in response to the third uplink transmission (and/or in response to the first resource) may correspond to an indication (e.g., HARQ feedback, such as ACK or NACK) of whether the third uplink transmission is successfully received and/or decoded by the base station.

In one embodiment, the UE determines that the second DFI comprises and/or provides second HARQ information (e.g., second valid HARQ information) in response to the fourth uplink transmission (and/or in response to the second resource) based on the second interval being larger than or equal to the first minimum DFI time delay or based on the second interval being larger than or equal to the second minimum DFI time delay. For example, if the second interval is larger than or equal to the first minimum DFI time delay and/or if the second interval is larger than or equal to the second minimum DFI time delay, the UE may determine that the second DFI comprises and/or provides the second HARQ information. Alternatively and/or additionally, if the second interval is larger than or equal to the first minimum DFI time delay and/or if the second interval is larger than or equal to the second minimum DFI time delay, the second DFI may comprise and/or provide the second HARQ information (and/or the second DFI may comprise and/or provide other information in addition to the second HARQ information). The second HARQ information in response to the fourth uplink transmission (and/or in response to the second resource) may correspond to an indication (e.g., HARQ feedback, such as ACK or NACK) of whether the second uplink transmission is successfully received and/or decoded by the base station).

In one embodiment, the UE determines that the second DFI does not comprise and/or provide HARQ information (and/or valid HARQ information) in response to the fourth uplink transmission (and/or in response to the second resource) based on the second interval being smaller than the first minimum DFI time delay or based on the second interval being smaller than the second minimum DFI time delay. For example, if the second interval is smaller than the first minimum DFI time delay and/or if the second interval is smaller than the second minimum DFI time delay, the UE may determine that the second DFI does not comprise and/or provide HARQ information (and/or valid HARQ information) in response to the fourth uplink transmission (and/or in response to the second resource). HARQ information (and/or valid HARQ information) in response to the fourth uplink transmission (and/or in response to the second resource) may correspond to an indication (e.g., HARQ feedback, such as ACK or NACK) of whether the fourth uplink transmission is successfully received and/or decoded by the base station.

In one embodiment, the UE determines whether or not first HARQ information provided by the first DFI in response to the third uplink transmission (and/or in response to the first resource) is valid based on a first interval between the first DFI and the first resource and based on the first minimum DFI time delay or the second minimum DFI time delay. The first HARQ information may correspond to an indication (e.g., HARQ feedback, such as ACK or NACK) of whether the third uplink transmission is successfully received and/or decoded by the base station.

In one embodiment, the UE determines whether or not second HARQ information provided by the second DFI in response to the fourth uplink transmission (and/or in response to the second resource) is valid based on a second interval between the second DFI and the second resource and based on the first minimum DFI time delay or the second minimum DFI time delay. The second HARQ information may correspond to an indication (e.g., HARQ feedback, such as ACK or NACK) of whether the fourth uplink transmission is successfully received and/or decoded by the base station.

In one embodiment, the UE determines that the first HARQ information is valid based on the first interval being larger than or equal to the first minimum DFI time delay or based on the first interval being larger than or equal to the second minimum DFI time delay. For example, if the first interval is larger than or equal to the first minimum DFI time delay and/or if the first interval is larger than or equal to the second minimum DFI time delay, the UE may determine that the first HARQ information is valid.

In one embodiment, the UE determines that the first HARQ information is not valid based on the first interval being smaller than the first minimum DFI time delay or based on the first interval being smaller than the second minimum DFI time delay. For example, if the first interval is smaller than the first minimum DFI time delay and/or if the first interval is smaller than the second minimum DFI time delay, the UE may determine that the first HARQ information is not valid.

In one embodiment, the UE determines that the second HARQ information is valid based on the second interval being larger than or equal to the first minimum DFI time delay or based on the second interval being larger than or equal to the second minimum DFI time delay. For example, if the second interval is larger than or equal to the first minimum DFI time delay and/or if the second interval is larger than or equal to the second minimum DFI time delay, the UE may determine that the second HARQ information is valid.

In one embodiment, the UE determines that the second HARQ information is not valid based on the second interval being smaller than the first minimum DFI time delay or based on the second interval being smaller than the second minimum DFI time delay. For example, if the second interval is smaller than the first minimum DFI time delay and/or if the second interval is smaller than the second minimum DFI time delay, the UE may determine that the second HARQ information is not valid.

Referring back to FIGS. 3 and 4, in one exemplary embodiment of a UE operating with shared spectrum channel access on a carrier and/or a cell, the device 300 includes a program code 312 stored in the memory 310. The CPU 308 may execute program code 312 to enable the UE (i) to receive, from a base station, a configuration for configuring a CGs for uplink transmission in a BWP of the carrier and/or the cell, wherein the plurality of CGs comprises a first CG and a second CG, (ii) to configure, according to the configuration, a first minimum DFI time delay for the first CG, wherein the first minimum DFI time delay is for validation of HARQ information in response to one or more first uplink transmissions, and (iii) to configure, according to the configuration, a second minimum DFI time delay for the second CG, wherein the second minimum DFI time delay is for validation of HARQ information in response to one or more second uplink transmissions and the UE does not expect the second minimum DFI time delay to have a different value than the first minimum DFI time delay. Furthermore, the CPU 308 can execute the program code 312 to perform one, some and/or all of the above-described actions and steps and/or others described herein.

Figure 21:
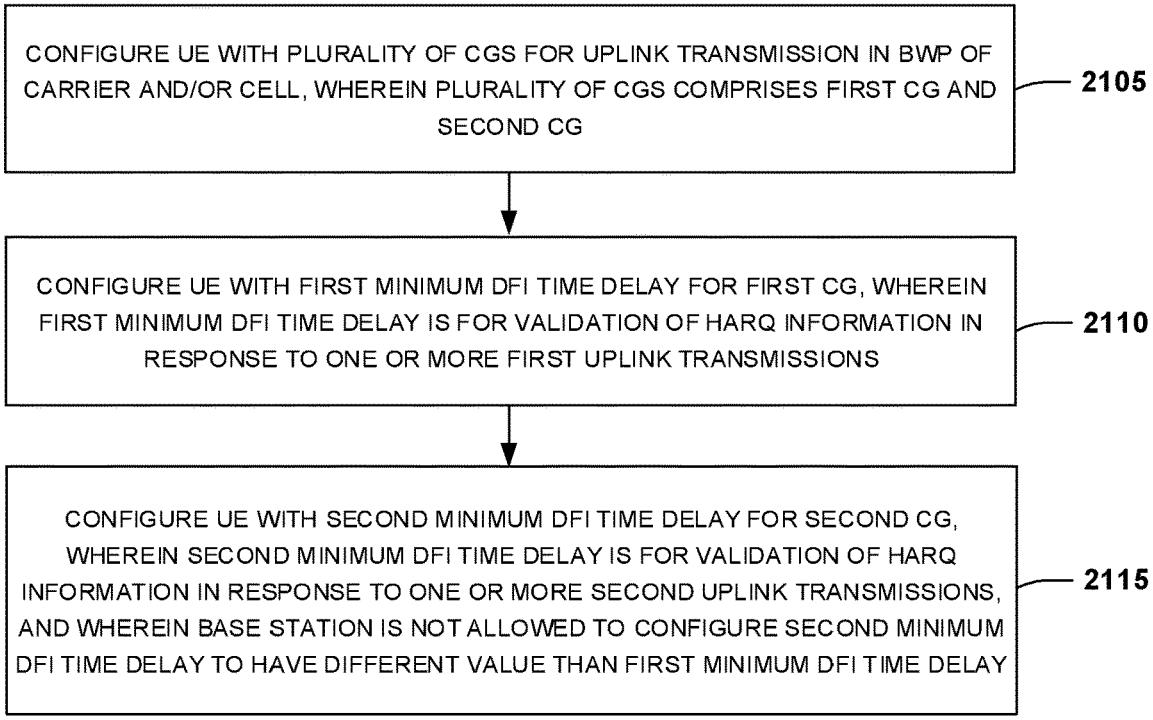
FIG. 21 is a flow chart according to one exemplary embodiment.

FIG. 21 is a flow chart 2100 according to one exemplary embodiment from the perspective of a base station operating with shared spectrum channel access on a carrier and/or a cell. In step 2105, the base station configures a UE with a plurality of CGs for uplink transmission in a BWP of the carrier and/or the cell, wherein the plurality of CGs comprises a first CG and a second CG (and/or one or more other CGs in addition to the first CG and the second CG). In step 2110, the base station configures the UE with a first minimum DFI time delay for the first CG, wherein the first minimum DFI time delay is for validation of HARQ information in response to one or more first uplink transmissions (e.g., the first minimum DFI time delay is used to validate one or more sets of HARQ information in response to the one or more first uplink transmissions). The one or more first uplink transmissions may comprise one or more uplink transmissions performed by the UE. In step 2115, the base station configures the UE with a second minimum DFI time delay for the second CG, wherein the second minimum DFI time delay is for validation of HARQ information in response to one or more second uplink transmissions (e.g., the second minimum DFI time delay is used to validate one or more sets of HARQ information in response to the one or more second uplink transmissions). The one or more second uplink transmissions may comprise one or more uplink transmissions performed by the UE. The base station is not allowed (and/or is not configured) to configure the second minimum DFI time delay to have a different value than the first minimum DFI time delay. Alternatively and/or additionally, it is not allowed for the second minimum DFI time delay to be configured with a different value than the first minimum DFI time delay.

In one embodiment, the base station configures the UE with a first set of one or more HARQ processes for the first CG. The base station configures the UE with a second set of one or more HARQ processes for the second CG. In one embodiment, the one or more first uplink transmissions are associated with the first CG. In one embodiment, the one or more second uplink transmissions are associated with the second CG.

In one embodiment, a first value of the first minimum DFI time delay is the same as a second value of the second minimum DFI time delay based on each set of HARQ processes, of the first set of one or more HARQ processes and the second set of one or more HARQ processes, comprising a same (e.g., shared) HARQ process. For example, the first value is the same as the second value if each set of HARQ processes, of the first set of one or more HARQ processes and the second set of one or more HARQ processes, comprise the same (e.g., shared) HARQ process.

In one embodiment, the base station is not allowed (and/or is not configured) to configure the second minimum DFI time delay to have a different value than the first minimum DFI time delay (and/or it may not be allowed for the second minimum DFI time delay to be configured with a different value than the first minimum DFI time delay) based on each set of HARQ processes, of the first set of one or more HARQ processes and the second set of one or more HARQ processes, comprising a same (e.g., shared) HARQ process. For example, the base station is not allowed (and/or is not configured) to configure the second minimum DFI time delay to have a different value than the first minimum DFI time delay (and/or it may not be allowed for the second minimum DFI time delay to be configured with a different value than the first minimum DFI time delay) if each set of HARQ processes, of the first set of one or more HARQ processes and the second set of one or more HARQ processes, comprise the same (e.g., shared) HARQ process.

In one embodiment, a first value of the first minimum DFI time delay is the same as a second value of the second minimum DFI time delay based on no HARQ processes being shared between the first set of one or more HARQ processes and the second set of one or more HARQ processes (such as when the first set of one or more HARQ processes does not comprise any HARQ process of the second set of one or more HARQ processes and when the second set of one or more HARQ processes does not comprise any HARQ process of the first set of one or more HARQ processes). For example, the first value is the same as the second value if no HARQ processes are shared between the first set of one or more HARQ processes and the second set of one or more HARQ processes.

In one embodiment, the base station is not allowed (and/or is not configured) to configure the second minimum DFI time delay to have a different value than the first minimum DFI time delay (and/or it may not be allowed for the second minimum DFI time delay to be configured with a different value than the first minimum DFI time delay) based on no HARQ processes being shared between the first set of one or more HARQ processes and the second set of one or more HARQ processes. For example, the base station is not allowed (and/or is not configured) to configure the second minimum DFI time delay to have a different value than the first minimum DFI time delay (and/or it may not be allowed for the second minimum DFI time delay to be configured with a different value than the first minimum DFI time delay) if no HARQ processes are shared between the first set of one or more HARQ processes and the second set of one or more HARQ processes.

In one embodiment, a first value of the first minimum DFI time delay is the same as a second value of the second minimum DFI time delay regardless of whether or not each set of HARQ processes, of the first set of one or more HARQ processes and the second set of one or more HARQ processes, comprise a same HARQ process (e.g., at least one same HARQ process).

In one embodiment, the base station is not allowed (and/or is not configured) to configure the second minimum DFI time delay to have a different value than the first minimum DFI time delay (and/or it may not be allowed for the second minimum DFI time delay to be configured with a different value than the first minimum DFI time delay) regardless of whether or not each set of HARQ processes, of the first set of one or more HARQ processes and the second set of one or more HARQ processes, comprise a same HARQ process (e.g., at least one same HARQ process).

In one embodiment, the base station receives a third uplink transmission on a first resource. Alternatively and/or additionally, the base station receives a fourth uplink transmission on a second resource. Alternatively and/or additionally, the one or more first uplink transmissions comprise the third uplink transmission (e.g., the third uplink transmission is one of the one or more first uplink transmissions). Alternatively and/or additionally, the one or more second uplink transmissions comprise the fourth uplink transmission (e.g., the fourth uplink transmission is one of the one or more second uplink transmissions). Alternatively and/or additionally, the third uplink transmission and/or the first resource are associated with and/or determined based on the first CG. Alternatively and/or additionally, the fourth uplink transmission and/or the second resource are associated with and/or determined based on the second CG. Alternatively and/or additionally, the fourth uplink transmission and/or the second resource are associated with, determined based on and/or scheduled by a dynamic grant (e.g., a dynamic scheduling grant). Alternatively and/or additionally, each uplink transmission, of the third uplink transmission and the fourth uplink transmission, carries (and/or delivers) a same TB. Alternatively and/or additionally, each uplink transmission, of the third uplink transmission and the fourth uplink transmission, is with a same HARQ process number. Alternatively and/or additionally, the third uplink transmission is earlier than the fourth uplink transmission (in time domain). Alternatively and/or additionally, the third uplink transmission is an initial transmission of the TB and the fourth uplink transmission is a retransmission of the TB.

In one embodiment, the base station transmits a first PDCCH in a first slot. Alternatively and/or additionally, the base station transmits a second PDCCH in a second slot. Alternatively and/or additionally, the first slot and/or the first PDCCH (and/or transmission of the first PDCCH) are later than (and/or after) the third uplink transmission (e.g., a time of the first slot and/or a time of transmission of the first PDCCH are later than a time of the third uplink transmission). Alternatively and/or additionally, the second slot and/or the second PDCCH (and/or transmission of the second PDCCH) are later than (and/or after) the fourth uplink transmission (e.g., a time of the second slot and/or a time of transmission of the second PDCCH are later than a time of the fourth uplink transmission). Alternatively and/or additionally, the first PDCCH comprises and/or indicates a first DFI. Alternatively and/or additionally, the second PDCCH comprises and/or indicates a second DFI.

In one embodiment, the base station determines whether or not the first DFI comprises or provides HARQ information (and/or valid HARQ information) in response to the third uplink transmission based on a first interval between the first PDCCH and the first resource and based on the first minimum DFI time delay or the second minimum DFI time delay. The first interval may correspond to a time length and/or a distance between the first PDCCH and the first resource, such as a time length and/or a distance between transmission of the first PDCCH and the first resource. HARQ information (and/or valid HARQ information) in response to the third uplink transmission may correspond to an indication (e.g., HARQ feedback, such as ACK or NACK) of whether the third uplink transmission is successfully received and/or decoded by the base station.

In one embodiment, the base station determines whether or not the second DFI comprises or provides HARQ information (and/or valid HARQ information) in response to the fourth uplink transmission based on a second interval between the second PDCCH and the second resource and based on the first minimum DFI time delay or the second minimum DFI time delay. The second interval may correspond to a time length and/or a distance between the second PDCCH and the second resource, such as a time length and/or a distance between transmission of the second PDCCH and the second resource. HARQ information (and/or valid HARQ information) in response to the fourth uplink transmission may correspond to an indication (e.g., HARQ feedback, such as ACK or NACK) of whether the fourth uplink transmission is successfully received and/or decoded by the base station.

In one embodiment, the base station determines that the first DFI comprises or provides first HARQ information (e.g., first valid HARQ information) in response to the third uplink transmission (and/or in response to the first resource) based on the first interval being larger than or equal to the first minimum DFI time delay or based on the first interval being larger than or equal to the second minimum DFI time delay. For example, if the first interval is larger than or equal to the first minimum DFI time delay and/or if the first interval is larger than or equal to the second minimum DFI time delay, the base station may determine that the first DFI comprises or provides the first HARQ information. Alternatively and/or additionally, if the first interval is larger than or equal to the first minimum DFI time delay and/or if the first interval is larger than or equal to the second minimum DFI time delay, the first DFI may comprise or provides the first HARQ information (and/or the first DFI may comprise or provide other information in addition to the first HARQ information). The first HARQ information in response to the third uplink transmission (and/or in response to the first resource) may correspond to an indication (e.g., HARQ feedback, such as ACK or NACK) of whether the third uplink transmission is successfully received and/or decoded by the base station).

In one embodiment, the base station determines that the first DFI does not comprise or provides HARQ information (and/or valid HARQ information) in response to the third uplink transmission (and/or in response to the first resource) based on the first interval being smaller than the first minimum DFI time delay or based on the first interval being smaller than the second minimum DFI time delay. For example, if the first interval is smaller than the first minimum DFI time delay and/or if the first interval is smaller than the second minimum DFI time delay, the base station may determine that the first DFI does not comprise or provide HARQ information (and/or valid HARQ information) in response to the third uplink transmission (and/or in response to the first resource). HARQ information (and/or valid HARQ information) in response to the third uplink transmission (and/or in response to the first resource) may correspond to an indication (e.g., HARQ feedback, such as ACK or NACK) of whether the third uplink transmission is successfully received and/or decoded by the base station.

In one embodiment, the base station determines that the second DFI comprises or provides second HARQ information (e.g., second valid HARQ information) in response to the fourth uplink transmission (and/or in response to the second resource) based on the second interval being larger than or equal to the first minimum DFI time delay or based on the second interval being larger than or equal to the second minimum DFI time delay. For example, if the second interval is larger than or equal to the first minimum DFI time delay and/or if the second interval is larger than or equal to the second minimum DFI time delay, the base station may determine that the second DFI comprises or provides the second HARQ information. Alternatively and/or additionally, if the second interval is larger than or equal to the first minimum DFI time delay and/or if the second interval is larger than or equal to the second minimum DFI time delay, the second DFI may comprise or provide the second HARQ information (and/or the second DFI may comprise or provide other information in addition to the second HARQ information). The second HARQ information in response to the fourth uplink transmission (and/or in response to the second resource) may correspond to an indication (e.g., HARQ feedback, such as ACK or NACK) of whether the second uplink transmission is successfully received and/or decoded by the base station).

In one embodiment, the base station determines that the second DFI does not comprise or provide HARQ information (and/or valid HARQ information) in response to the fourth uplink transmission (and/or in response to the second resource) based on the second interval being smaller than the first minimum DFI time delay or based on the second interval being smaller than the second minimum DFI time delay. For example, if the second interval is smaller than the first minimum DFI time delay and/or if the second interval is smaller than the second minimum DFI time delay, the base station may determine that the second DFI does not comprise or provide HARQ information (and/or valid HARQ information) in response to the fourth uplink transmission (and/or in response to the second resource). HARQ information (and/or valid HARQ information) in response to the fourth uplink transmission (and/or in response to the second resource) may correspond to an indication (e.g., HARQ feedback, such as ACK or NACK) of whether the fourth uplink transmission is successfully received and/or decoded by the base station.

In one embodiment, the base station determines whether or not first HARQ information provided by the first DFI in response to the third uplink transmission (and/or in response to the first resource) is valid based on a first interval between the first PDCCH and the first resource and based on the first minimum DFI time delay or the second minimum DFI time delay. The first HARQ information may correspond to an indication (e.g., HARQ feedback, such as ACK or NACK) of whether the third uplink transmission is successfully received and/or decoded by the base station.

In one embodiment, the base station determines whether or not second HARQ information provided by the second DFI in response to the fourth uplink transmission (and/or in response to the second resource) is valid based on a second interval between the second PDCCH and the second resource and based on the first minimum DFI time delay or the second minimum DFI time delay. The second HARQ information may correspond to an indication (e.g., HARQ feedback, such as ACK or NACK) of whether the fourth uplink transmission is successfully received and/or decoded by the base station.

In one embodiment, the base station determines that the first HARQ information is valid based on the first interval being larger than or equal to the first minimum DFI time delay or based on the first interval being larger than or equal to the second minimum DFI time delay. For example, if the first interval is larger than or equal to the first minimum DFI time delay and/or if the first interval is larger than or equal to the second minimum DFI time delay, the base station may determine that the first HARQ information is valid.

In one embodiment, the base station determines that the first HARQ information is not valid based on the first interval being smaller than the first minimum DFI time delay or based on the first interval being smaller than the second minimum DFI time delay. For example, if the first interval is smaller than the first minimum DFI time delay and/or if the first interval is smaller than the second minimum DFI time delay, the base station may determine that the first HARQ information is not valid.

In one embodiment, the base station determines that the second HARQ information is valid based on the second interval being larger than or equal to the first minimum DFI time delay or based on the second interval being larger than or equal to the second minimum DFI time delay. For example, if the second interval is larger than or equal to the first minimum DFI time delay and/or if the second interval is larger than or equal to the second minimum DFI time delay, the base station may determine that the second HARQ information is valid.

In one embodiment, the base station determines that the second HARQ information is not valid based on the second interval being smaller than the first minimum DFI time delay or based on the second interval being smaller than the second minimum DFI time delay. For example, if the second interval is smaller than the first minimum DFI time delay and/or if the second interval is smaller than the second minimum DFI time delay, the base station may determine that the second HARQ information is not valid.

In one embodiment, HARQ information, that is in response to the third uplink transmission (and/or in response to the first resource), provided by the first DFI may be valid based on a determination that an interval, between a time unit in which the first PDCCH is to be transmitted and the first resource, is larger than or equal to the first minimum DFI time delay or based on a determination that the interval is larger than or equal to the second minimum DFI time delay. The HARQ information in response to the third uplink transmission (and/or in response to the first resource) may correspond to an indication (e.g., HARQ feedback, such as ACK or NACK) of whether the third uplink transmission is successfully received and/or decoded by the base station).

In one embodiment, HARQ information, that is in response to the third uplink transmission (and/or in response to the first resource), provided by the first DFI may not be valid (e.g., may be invalid) based on a determination that an interval, between a time unit in which the first PDCCH is to be transmitted and the first resource, is smaller than the first minimum DFI time delay or based on a determination that the interval is smaller than the second minimum DFI time delay. The HARQ information in response to the third uplink transmission (and/or in response to the first resource) may correspond to an indication (e.g., HARQ feedback, such as ACK or NACK) of whether the third uplink transmission is successfully received and/or decoded by the base station.

In one embodiment, HARQ information, that is in response to the fourth uplink transmission (and/or in response to the second resource), provided by the second DFI may be valid based on a determination that an interval, between a time unit in which the second PDCCH is to be transmitted and the second resource, is larger than or equal to the first minimum DFI time delay or based on a determination that the interval is larger than or equal to the second minimum DFI time delay. The HARQ information in response to the fourth uplink transmission (and/or in response to the second resource) may correspond to an indication (e.g., HARQ feedback, such as ACK or NACK) of whether the fourth uplink transmission is successfully received and/or decoded by the base station).

In one embodiment, HARQ information, that is in response to the fourth uplink transmission (and/or in response to the second resource), provided by the second DFI may not be valid (e.g., may be invalid) based on a determination that an interval, between a time unit in which the second PDCCH is to be transmitted and the second resource, is smaller than the first minimum DFI time delay or based on a determination that the interval is smaller than the second minimum DFI time delay. The HARQ information in response to the fourth uplink transmission (and/or in response to the second resource) may correspond to an indication (e.g., HARQ feedback, such as ACK or NACK) of whether the fourth uplink transmission is successfully received and/or decoded by the base station.

Referring back to FIGS. 3 and 4, in one exemplary embodiment of a base station operating with shared spectrum channel access on a carrier and/or a cell, the device 300 includes a program code 312 stored in the memory 310. The CPU 308 may execute program code 312 to enable the base station (i) to configure a UE with a plurality of CGs for uplink transmission in a BWP of the carrier and/or the cell, wherein the plurality of CGs comprises a first CG and a second CG, (ii) to configure the UE with a first minimum DFI time delay for the first CG, wherein the first minimum DFI time delay is for validation of HARQ information in response to one or more first uplink transmissions, and (iii) to configure the UE with a second minimum DFI time delay for the second CG, wherein the second minimum DFI time delay is for validation of HARQ information in response to one or more second uplink transmissions and the base station is not allowed to configure the second minimum DFI time delay to have a different value than the first minimum DFI time delay. Furthermore, the CPU 308 can execute the program code 312 to perform one, some and/or all of the above-described actions and steps and/or others described herein.

Figure 22:
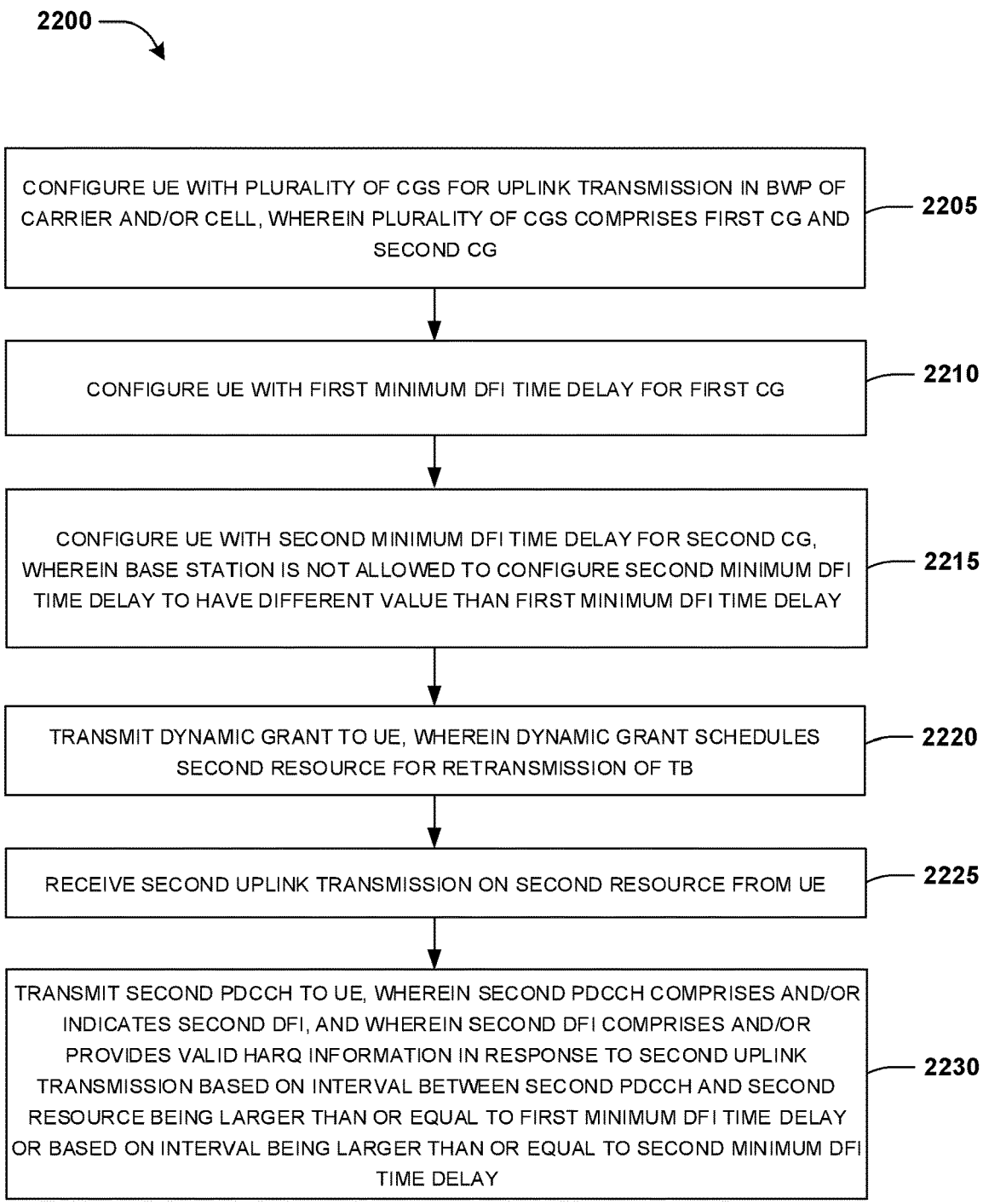
FIG. 22 is a flow chart according to one exemplary embodiment.

FIG. 22 is a flow chart 2200 according to one exemplary embodiment from the perspective of a base station operating with shared spectrum channel access on a carrier and/or a cell. In step 2205, the base station configures a UE with a plurality of CGs for uplink transmission in a BWP of the carrier and/or the cell, wherein the plurality of CGs comprise a first CG and a second CG. In step 2210, the base station configures the UE with a first minimum DFI time delay for the first CG. In step 2215, the base station configures the UE with a second minimum DFI time delay for the second CG, wherein the base station is not allowed to configure the second minimum DFI time delay to have a different value than the first minimum DFI time delay (and/or wherein it is not allowed for the second minimum DFI time delay to be configured with a different value than the first minimum DFI time delay). In step 2220, the base station transmits a dynamic grant to the UE, wherein the dynamic grant schedules a second resource for retransmission of a TB. In step 2225, the base station receives a second uplink transmission on the second resource from the UE. In step 2230, the base station transmits a second PDCCH to the UE, wherein the second PDCCH comprises and/or indicates a second DFI. The second DFI comprises and/or provides a valid HARQ information in response to the second uplink transmission based on an interval between the second PDCCH and the second resource being larger than or equal to the first minimum DFI time delay or based on the interval being larger than or equal to the second minimum DFI time delay.

For example, the second DFI comprises and/or provides the valid HARQ information in response to the second uplink transmission if the interval is larger than or equal to the first minimum DFI time delay or if the interval is larger than or equal to the second minimum DFI time delay. The interval may correspond to a time length and/or a distance between the second PDCCH and the second resource, such as a time length and/or a distance between transmission of the second PDCCH and the second resource. The valid HARQ information may correspond to an indication (e.g., HARQ feedback, such as ACK or NACK) of whether the second uplink transmission is successfully received and/or decoded by the base station.

In one embodiment, the second DFI comprises and/or provides a plurality of HARQ information, wherein one or more HARQ information of the plurality of HARQ information is valid HARQ information.

In one embodiment, the valid HARQ information provided by the second DFI in response to the second uplink transmission is valid based on a determination that an interval, between a time unit in which the second PDCCH is to be transmitted and the second resource, is larger than or equal to the first minimum DFI time delay or based on a determination that the interval is larger than or equal to the second minimum DFI time delay.

Referring back to FIGS. 3 and 4, in one exemplary embodiment of a base station operating with shared spectrum channel access on a carrier and/or a cell, the device 300 includes a program code 312 stored in the memory 310. The CPU 308 may execute program code 312 to enable the base station (i) to configure a UE with a plurality of CGs for uplink transmission in a BWP of the carrier and/or the cell, wherein the plurality of CGs comprises a first CG and a second CG, (ii) to configure the UE with a first minimum DFI time delay for the first CG, (iii) to configure the UE with a second minimum DFI time delay for the second CG, wherein the base station is not allowed to configure the second minimum DFI time delay to have a different value than the first minimum DFI time delay, (iv) to transmit a dynamic grant to the UE, wherein the dynamic grant schedules a second resource for retransmission of a TB, (v) to receive a second uplink transmission on the second resource from the UE, and (vi) to transmit a second PDCCH to the UE, wherein the second PDCCH comprises and/or indicates a second DFI and wherein the second DFI comprises and/or provides a valid HARQ information in response to the second uplink transmission based on an interval between the second PDCCH and the second resource being larger than or equal to the first minimum DFI time delay or based on the interval being larger than or equal to the second minimum DFI time delay. Furthermore, the CPU 308 can execute the program code 312 to perform one, some and/or all of the above-described actions and steps and/or others described herein.

A communication device (e.g., a UE, a base station, a network, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 20-22. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 20-22, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network), such as where the UE and/or the network operate in shared spectrum. The increased efficiency may be a result of enabling the UE to correctly interpret minimum DFI time delay and/or correctly determine whether a DFI comprises and/or provides HARQ information (e.g., valid HARQ information) associated with an uplink transmission. By correctly determining whether the DFI comprises and/or provides HARQ information, the UE may not mistakenly determine that the network successfully received the uplink transmission or that the network did not successfully receive the uplink transmission (and thus, the UE may not incorrectly perform a retransmission and/or incorrectly not perform a retransmission).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) operating with shared spectrum channel access on at least one of a carrier or a cell, the method comprising:
    receiving, from a base station, a configuration for configuring a plurality of configured grants for uplink transmission in a bandwidth part (BWP) of at least one of the carrier or the cell, wherein the plurality of configured grants comprises a first configured grant and a second configured grant;
    configuring, according to the configuration, a first minimum Downlink Feedback Indication (DFI) time delay and a first set of one or more Hybrid Automatic Repeat Request (HARQ) processes for the first configured grant, wherein the first minimum DFI time delay is for validation of HARQ information in response to one or more first uplink transmissions;
    configuring, according to the configuration, a second minimum DFI time delay and a second set of one or more HARQ processes for the second configured grant, wherein:
        the first set of one or more HARQ processes comprises at least one same HARQ process as the second set of one or more HARQ processes;
        the second minimum DFI time delay is for validation of HARQ information in response to one or more second uplink transmissions; and
        the UE does not expect the second minimum DFI time delay to have a different value than the first minimum DFI time delay;
    transmitting a third uplink transmission on a first resource associated with the first configured grant;
    receiving a first Physical Downlink Control Channel (PDCCH), wherein the first PDCCH at least one of comprises or indicates a first DFI; and
    determining that first HARQ information provided by the first DFI in response to the third uplink transmission is valid based on a first interval, between the first PDCCH and the first resource, being larger than or equal to the first minimum DFI time delay or based on the first interval being larger than or equal to the second minimum DFI time delay.

2. The method of claim 1, wherein at least one of:
    a first value of the first minimum DFI time delay is the same as a second value of the second minimum DFI time delay based on each set of HARQ processes, of the first set of one or more HARQ processes and the second set of one or more HARQ processes, comprising at least a same HARQ process; or
    the UE does not expect the second minimum DFI time delay to have a different value than the first minimum DFI time delay based on each set of HARQ processes, of the first set of one or more HARQ processes and the second set of one or more HARQ processes, comprising at least the same HARQ process.

3. The method of claim 1, wherein at least one of:
a first value of the first minimum DFI time delay is the same as a second value of the second minimum DFI time delay regardless of whether or not each set of HARQ processes, of the first set of one or more HARQ processes and the second set of one or more HARQ processes, comprise at least a same HARQ process; or
the UE does not expect the second minimum DFI time delay to have a different value than the first minimum DFI time delay regardless of whether or not each set of HARQ processes, of the first set of one or more HARQ processes and the second set of one or more HARQ processes, comprise at least a same HARQ process.

4. The method of claim 1, wherein at least one of:
the method comprises transmitting a fourth uplink transmission on a second resource;
the one or more first uplink transmissions comprise the third uplink transmission;
the one or more second uplink transmissions comprise the fourth uplink transmission;
at least one of the fourth uplink transmission or the second resource are:
  at least one of associated with or determined based on the second configured grant; or
  at least one of associated with, determined based on or scheduled by a dynamic grant;
each uplink transmission, of the third uplink transmission and the fourth uplink transmission, carries a same Transport Block (TB);
each uplink transmission, of the third uplink transmission and the fourth uplink transmission, is with a same HARQ process number;
the third uplink transmission is earlier than the fourth uplink transmission; or
the third uplink transmission is an initial transmission of the TB and the fourth uplink transmission is a retransmission of the TB.

5. The method of claim 4, wherein at least one of:
the PDCCH is received in a first slot;
the method comprises receiving a second PDCCH in a second slot;
at least one of the first slot or the first PDCCH are later than the third uplink transmission;
at least one of the second slot or the second PDCCH are later than the fourth uplink transmission; or
the second PDCCH at least one of comprises or indicates a second DFI.

6. The method of claim 5, comprising:
determining whether or not second HARQ information provided by the second DFI in response to the fourth uplink transmission is valid based on a second interval between the second DFI and the second resource and based on the first minimum DFI time delay or the second minimum DFI time delay.

7. The method of claim 6, wherein at least one of:
the determining whether or not the first HARQ information provided by the first DFI in response to the third uplink transmission is valid comprises determining that the first HARQ information provided by the first DFI in response to the third uplink transmission is not valid based on the first interval being smaller than the first minimum DFI time delay or based on the first interval being smaller than the second minimum DFI time delay;
the determining whether or not the second HARQ information provided by the second DFI in response to the fourth uplink transmission is valid comprises determining that the second HARQ information provided by the second DFI in response to the fourth uplink transmission is valid based on the second interval being larger than or equal to the first minimum DFI time delay or based on the second interval being larger than or equal to the second minimum DFI time delay; or
the determining whether or not the second HARQ information provided by the second DFI in response to the fourth uplink transmission is valid comprises determining that the second HARQ information provided by the second DFI in response to the fourth uplink transmission is not valid based on the second interval being smaller than the first minimum DFI time delay or based on the second interval being smaller than the second minimum DFI time delay.

8. A method for a base station operating with shared spectrum channel access on at least one of a carrier or a cell, the method comprising:
configuring a User Equipment (UE) with a plurality of configured grants for uplink transmission in a bandwidth part (BWP) of at least one of the carrier or the cell, wherein the plurality of configured grants comprises a first configured grant and a second configured grant;
configuring the UE with a first minimum Downlink Feedback Indication (DFI) time delay and a first set of one or more Hybrid Automatic Repeat Request (HARQ) processes for the first configured grant, wherein the first minimum DFI time delay is for validation of HARQ information in response to one or more first uplink transmissions;
configuring the UE with a second minimum DFI time delay and a second set of one or more HARQ processes for the second configured grant, wherein:
  the first set of one or more HARQ processes comprises at least one same HARQ process as the second set of one or more HARQ processes;
  the second minimum DFI time delay is for validation of HARQ information in response to one or more second uplink transmissions; and
  the base station is not allowed to configure the second minimum DFI time delay to have a different value than the first minimum DFI time delay;
receiving a third uplink transmission on a first resource associated with the first configured grant;
transmitting a first Physical Downlink Control Channel (PDCCH), wherein the first PDCCH at least one of comprises or indicates a first DFI; and
determining that first HARQ information set in the first DFI in response to the third uplink transmission is valid based on a first interval, between the first PDCCH and the first resource, being larger than or equal to the first minimum DFI time delay or based on the first interval being larger than or equal to the second minimum DFI time delay.

9. The method of claim 8, wherein at least one of:
a first value of the first minimum DFI time delay is the same as a second value of the second minimum DFI time delay based on each set of HARQ processes, of the first set of one or more HARQ processes and the second set of one or more HARQ processes, comprising at least a same HARQ process; or
the base station is not allowed to configure the second minimum DFI time delay to have a different value than the first minimum DFI time delay based on each set of HARQ processes, of the first set of one or more HARQ processes and the second set of one or more HARQ processes, comprising at least the same HARQ process.

10. The method of claim 8, wherein at least one of:
a first value of the first minimum DFI time delay is the same as a second value of the second minimum DFI time delay regardless of whether or not each set of HARQ processes, of the first set of one or more HARQ processes and the second set of one or more HARQ processes, comprise at least a same HARQ process; or
the base station is not allowed to configure the second minimum DFI time delay to have a different value than the first minimum DFI time delay regardless of whether or not each set of HARQ processes, of the first set of one or more HARQ processes and the second set of one or more HARQ processes, comprise at least a same HARQ process.

11. The method of claim 8, wherein at least one of:
the method comprises receiving a fourth uplink transmission on a second resource;
the one or more first uplink transmissions comprise the third uplink transmission;
the one or more second uplink transmissions comprise the fourth uplink transmission;
at least one of the fourth uplink transmission or the second resource are:
  at least one of associated with or determined based on the second configured grant; or
  at least one of associated with, determined based on or scheduled by a dynamic grant;
each uplink transmission, of the third uplink transmission and the fourth uplink transmission, carries a same Transport Block (TB);
each uplink transmission, of the third uplink transmission and the fourth uplink transmission, is with a same HARQ process number;
the third uplink transmission is earlier than the fourth uplink transmission; or
the third uplink transmission is an initial transmission of the TB and the fourth uplink transmission is a retransmission of the TB.

12. The method of claim 11, wherein at least one of:
the first PDCCH is transmitted in a first slot;
the method comprises transmitting a second PDCCH in a second slot;
at least one of the first slot or the first PDCCH are later than the third uplink transmission;
at least one of the second slot or the second PDCCH are later than the fourth uplink transmission;
or
the second PDCCH at least one of comprises or indicates a second DFI.

13. The method of claim 12, comprising:
determining whether or not second HARQ information set in the second DFI in response to the fourth uplink transmission is valid based on a second interval between the second PDCCH and the second resource and based on the first minimum DFI time delay or the second minimum DFI time delay.

14. The method of claim 13, wherein at least one of:
the determining whether or not the first HARQ information set in the first DFI in response to the third uplink transmission is valid comprises determining that the first HARQ information set in the first DFI in response to the third uplink transmission is not valid based on the first interval being smaller than the first minimum DFI time delay or based on the first interval being smaller than the second minimum DFI time delay;
the determining whether or not the second HARQ information set in the second DFI in response to the fourth uplink transmission is valid comprises determining that the second HARQ information set in the second DFI in response to the fourth uplink transmission is valid based on the second interval being larger than or equal to the first minimum DFI time delay or based on the second interval being larger than or equal to the second minimum DFI time delay; or
the determining whether or not the second HARQ information set in the second DFI in response to the fourth uplink transmission is valid comprises determining that the second HARQ information set in the second DFI in response to the fourth uplink transmission is not valid based on the second interval being smaller than the first minimum DFI time delay or based on the second interval being smaller than the second minimum DFI time delay.

15. A User Equipment (UE) operating with shared spectrum channel access on at least one of a carrier or a cell, the UE comprising:
a control circuit;
a processor installed in the control circuit; and
a memory installed in the control circuit and operatively coupled to the processor, wherein the processor is configured to execute a program code stored in the memory to perform operations, the operations comprising:
  receiving, from a base station, a configuration for configuring a plurality of configured grants for uplink transmission in a bandwidth part (BWP) of at least one of the carrier or the cell, wherein the plurality of configured grants comprises a first configured grant and a second configured grant;
  configuring, according to the configuration, a first minimum Downlink Feedback Indication (DFI) time delay and a first set of one or more Hybrid Automatic Repeat Request (HARQ) processes for the first configured grant, wherein the first minimum DFI time delay is for validation of HARQ information in response to one or more first uplink transmissions;
  configuring, according to the configuration, a second minimum DFI time delay and a second set of one or more HARQ processes for the second configured grant, wherein:
    the first set of one or more HARQ processes comprises at least one same HARQ process as the second set of one or more HARQ processes;
    the second minimum DFI time delay is for validation of HARQ information in response to one or more second uplink transmissions; and
    the UE does not expect the second minimum DFI time delay to have a different value than the first minimum DFI time delay;
  transmitting a third uplink transmission on a first resource associated with the first configured grant;
  receiving a first Physical Downlink Control Channel (PDCCH), wherein the first PDCCH at least one of comprises or indicates a first DFI; and
  determining that first HARQ information provided by the first DFI in response to the third uplink transmission is valid based on a first interval, between the first PDCCH and the first resource, being larger than or equal to the first minimum DFI time delay or based on the first interval being larger than or equal to the second minimum DFI time delay.

16. A base station operating with shared spectrum channel access on at least one of a carrier or a cell, the base station comprising:
- a control circuit;
- a processor installed in the control circuit; and
- a memory installed in the control circuit and operatively coupled to the processor, wherein the processor is configured to execute a program code stored in the memory to perform operations, the operations comprising:
  - configuring a User Equipment (UE) with a plurality of configured grants for uplink transmission in a bandwidth part (BWP) of at least one of the carrier or the cell, wherein the plurality of configured grants comprises a first configured grant and a second configured grant;
  - configuring the UE with a first minimum Downlink Feedback Indication (DFI) time delay and a first set of one or more Hybrid Automatic Repeat Request (HARQ) processes for the first configured grant, wherein the first minimum DFI time delay is for validation of HARQ information in response to one or more first uplink transmissions;
  - configuring the UE with a second minimum DFI time delay and a second set of one or more HARQ processes for the second configured grant, wherein:
    - the first set of one or more HARQ processes comprises at least one same HARQ process as the second set of one or more HARQ processes;
    - the second minimum DFI time delay is for validation of HARQ information in response to one or more second uplink transmissions; and
    - the base station is not allowed to configure the second minimum DFI time delay to have a different value than the first minimum DFI time delay;
  - receiving a third uplink transmission on a first resource associated with the first configured grant;
  - transmitting a first Physical Downlink Control Channel (PDCCH), wherein the first PDCCH at least one of comprises or indicates a first DFI; and
  - determining that first HARQ information set in the first DFI in response to the third uplink transmission is valid based on a first interval, between the first PDCCH and the first resource, being larger than or equal to the first minimum DFI time delay or based on the first interval being larger than or equal to the second minimum DFI time delay.

* * * * *